US 8,943,933 B2

(12) United States Patent
Nagaya et al.

(10) Patent No.: US 8,943,933 B2
(45) Date of Patent: Feb. 3, 2015

(54) CUTTING EDGE REPLACEMENT TYPE GROOVE FORMING TOOL AND END FACE GROOVE FORMING METHOD

(75) Inventors: Hidehiko Nagaya, Schaumburg, IL (US); Norio Aso, Sashima-gun (JP); Yasuharu Imai, Shimotsuma (JP); Shoichiro Watanabe, Shimotsuma (JP); Kenji Ishizawa, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 354 days.

(21) Appl. No.: 13/577,225

(22) PCT Filed: Feb. 4, 2011

(86) PCT No.: PCT/JP2011/052353
§ 371 (c)(1),
(2), (4) Date: Sep. 14, 2012

(87) PCT Pub. No.: WO2011/096511
PCT Pub. Date: Aug. 11, 2011

(65) Prior Publication Data
US 2012/0328379 A1    Dec. 27, 2012

(30) Foreign Application Priority Data

Feb. 5, 2010    (JP) .................................. 2010-024708
Feb. 5, 2010    (JP) .................................. 2010-024710

(51) Int. Cl.
*B23B 27/16*    (2006.01)
*B23B 27/04*    (2006.01)
(Continued)

(52) U.S. Cl.
CPC .............. *B23B 27/04* (2013.01); *B23B 29/043* (2013.01); *B23B 2200/201* (2013.01); *B23B 2205/02* (2013.01); *B23B 2220/126* (2013.01)

USPC ............. 82/1.11; 407/107; 407/110; 407/115

(58) Field of Classification Search
USPC ............ 407/100, 101, 107, 110, 115; 82/1.11
See application file for complete search history.

(56) References Cited

U.S. PATENT DOCUMENTS 6,428,247 B1 *  8/2002  Friedman ....................... 407/110
7,384,218 B2 *  6/2008  Nagaya et al. ................. 407/110
(Continued)

FOREIGN PATENT DOCUMENTS

JP    62-144102 A    6/1987
JP    02-106204 A    4/1990
(Continued)

OTHER PUBLICATIONS

International Search Report dated Mar. 29, 2011, issued for PCT/JP2011/052353.

*Primary Examiner* — Will Fridie, Jr.
(74) *Attorney, Agent, or Firm* — Edwards Wildman Palmer LLP

(57) ABSTRACT

A cutting insert (130) is formed to be rotationally symmetric with respect to an axis line (C3) of a height direction and to be planarly symmetric with respect to a virtual plane of the insert (VS1), an axis line (C2) of a traverse direction is gradually inclined toward the front of a rotational direction around which a workpiece (W) rotates moving toward a first traverse direction (C2A), an axis line (C1) of a longitudinal direction extends toward a lower surface side of an insert body (131) so as to approach a virtual plane of the tool moving toward a first longitudinal direction (C1A), and one corner portion (143C) in the other cutting edge (132B) is disposed further toward a first traverse direction (C2A) than one corner portion (143A) in one cutting edge (132A).

24 Claims, 48 Drawing Sheets

(51) Int. Cl.
*B23B 29/04* (2006.01)
*B23B 1/00* (2006.01)

(56) References Cited

U.S. PATENT DOCUMENTS 7,896,585 B2 * 3/2011 Hecht .......................... 407/110
8,388,268 B2 * 3/2013 Henry et al. .................... 407/11
8,647,029 B2 * 2/2014 Hecht .......................... 407/110
8,696,259 B2 * 4/2014 Hecht .......................... 407/101

FOREIGN PATENT DOCUMENTS

| JP | 07-115251 | 12/1995 |
| JP | 2002-200504 A | 7/2002 |
| JP | 2007-168044 A | 7/2007 |
| WO | WO-2008/133199 A1 | 11/2008 |

* cited by examiner

CUTTING EDGE REPLACEMENT TYPE GROOVE FORMING TOOL AND END FACE GROOVE FORMING METHOD

TECHNICAL FIELD

The present invention relates to an insert-replaceable grooving tool and an end face grooving method with the grooving tool.

Priority is claimed on Japanese Patent Application No. 2010-24710, filed Feb. 5, 2010 and Japanese Patent Application No. 2010-24708, filed Feb. 5, 2010, the content of which is incorporated herein by reference.

BACKGROUND ART

In the related art, an insert-replaceable grooving tool is known. When it is used, a workpiece formed of a metal material or the like is rotated around a rotation axis line and a grooving is performed by a cutting edge of a cutting insert. The insert-replaceable grooving tool performs the grooving with respect to an inner face (end face) of a machined hole which is formed about a rotation axis line of a workpiece or to an end face facing a rotation axis line direction in a step portion which is formed on an outer circumferential surface of the workpiece. For example, in the conventional insert-replaceable grooving tool 1100 shown in FIG. 23, a cutting insert 130 which is formed in a bar shape having a rectangular cross-section is detachably mounted to a tip of a tool body 11 having a shaft shape. The cutting insert 130 includes a pair of cutting edges 132 at both ends in a longitudinal direction (in left and right directions in FIG. 23 (X direction)) of the insert body 131 having a bar shape. Moreover, one cutting edge 132A which protrudes from a tip end face of the tool body 11 in the cutting edges 132 performs the grooving (an end face grooving of an inner diameter side) with respect to an inner face (end face) B of a machined hole H of a workpiece W. In the example of FIG. 23, the inner face B of the workpiece W is perpendicular to a rotation axis line WO and is formed so as to be adjacent to an inner circumferential surface (circumferential surface) S of the machined hole H. The one cutting edge 132A moves in the X direction parallel to the rotation axis line WO along the inner circumferential surface S, and therefore, performs the grooving with respect to the inner face B. Moreover, the cutting insert 130 is rotationally symmetric with respect to an insert height axis line C3 which passes through centers of the longitudinal direction and the traverse direction of the insert body 131 and extends in a height direction perpendicular to the longitudinal direction and the traverse direction. Moreover, the cutting insert 130 is formed to be planarly symmetric with respect to a virtual plane of the insert (not shown) which includes the insert height axis line C3 and is perpendicular to the longitudinal direction. The cutting insert 130 can use both cutting edges 132A and 132B regardless of whether specification of the tool body 11 is for a left hand or a right hand.

In addition, in FIG. 23, the other cutting edge 132B in the pair of cutting edges 132 is not used for cuffing, and when the one cutting edge 132A is not suitable for use due to wear, damage, or the like, the mounting direction of the insert body 131 is inverted in the longitudinal direction. Thereby, the cutting edge 132B protrudes from the tip end face of the tool body 11 and is used in the grooving.

In this way, with respect to the inner face (end face of inner diameter side) B which is disposed inside a radial direction of the inner circumferential surface S in the machined hole H of the workpiece W and faces the direction of the rotation axis line WO, the end face grooving of the inner diameter side is performed using the insert-replaceable grooving tool 1100.

Moreover, M an example of FIG. 24, the above-described cutting insert 130 is detachably mounted to the tip of the insert-replaceable grooving tool 1105 having a shaft shape. Moreover, the one cutting edge 132A which protrudes from the tip end face of the tool body 11 moves in the X direction parallel to the rotation axis line WO toward an end face E facing the direction of the rotation axis line WO in a step portion U of the workpiece W formed in a multistage cylindrical shape, and therefore, the grooving (an end face grooving of an outer diameter side) is performed with the end face E. In this example, the end face E of the workpiece W is perpendicular to the rotation axis line WO and is formed so as to be adjacent to a small diameter portion of an outer circumferential surface (circumferential surface) R. The one cutting edge 132A moves along the smaller diameter portion, and therefore, the grooving with respect to the end face E is performed.

In this way, with respect to the end face (end face of outer diameter side) E which is disposed outside a radial direction of the outer circumferential surface R in the small diameter portion of the workpiece W and faces the direction of the rotation axis line WO, the end face grooving of the outer diameter side is performed using the insert-replaceable grooving tool 1105.

Moreover, as other cutting inserts which are used in the grooving, for example, one described in PTL 1 is known.

CITATION LIST

Patent Literature

[PTL 1] JP-B-7-115251

SUMMARY OF INVENTION

Technical Problem

However, in the above-described insert-replaceable grooving tools 1100 and 1105, there are the following problems.

In the cutting insert 130, the longitudinal direction (the longitudinal axis line C1 of the insert shown in FIGS. 23 and 24) of the insert body 131 is parallel with respect to the rotation axis line WO of the workpiece W. In addition, the longitudinal axis line C1 of the insert is disposed so as to extend in parallel with respect to the circumferential surfaces S and R of the workpiece W, and distances of the pair of cutting edges 132 from the circumferential surfaces S and R are the same as each other. In the disposition state of the cutting insert 130 described above, when the one cutting edge 132A is separated from the circumferential surfaces S and R of the workpiece W and performs the grooving with respect to the end faces B and E, particularly, there is no problem. However, when the cutting edge 132A perform the grooving with respect to the end faces B and E while moving along the circumferential surfaces S and R of the workpiece W, the other cutting edge 132B contacts the circumferential surfaces S and R and is damaged. Moreover, as shown in FIGS. 23 and 24, when a depth d1 from the end face F which is positioned on the most base end side of the tool body 11 in the workpiece W to the end face B of the machined hole H or the end face E of the step portion U is smaller than a distance L3 from the other cutting edge 132B to the end faces B and E, there is no contact. However, if d1 is equal to or more than L3, the contact is generated. This contact is not preferred because it affects the machining quality, and a shape of the workpiece W is limited in order to prevent the contact. Moreover, it is considered that the above-described contact occurs when the distance L3 is decreased during the machining. If the contact occurs, not only can the machining accuracy of the workpiece W not be secured, but also the unused other cutting edge 132B is damaged. Specifically, as shown in FIGS. 25 and 26, a corner portion 143C of the other cutting edge 132B which is positioned on the circumferential surfaces S and R side of the workpiece W contacts the circumferential surfaces S and R. Thereby, the end face grooving along the circumferential surfaces S and R of the workpiece W shown in FIGS. 23 and 24 cannot be performed.

In order to prevent the cutting edge 132B from contacting the circumferential surfaces S and R, for example, changing posture of the cutting insert 130 which is mounted to the tool body 11 is considered. That is, as shown in FIGS. 27 and 28, when viewed from a rake face 133 side of a cutting insert 130 (upper surface side of insert body 131), the longitudinal axis line C1 of the insert of the insert body 131 is disposed so as to be gradually separated from the circumferential surface S(R) of the workpiece W moving from the one cutting edge 132A side toward the other cutting edge 132B side. That is, the cutting insert 130 is inclined with respect to the X direction and may be mounted to the tool body 11. Thereby, since the corner portion 143C which is positioned on the circumferential surface S(R) side of the other cutting edge 132B in the cutting insert 130 is disposed so as to be separated from the circumferential surface S(R), the above-described contact is prevented.

However, in this case, if attention is focused on the one cutting edge 132A, as shown in FIG. 28, a front cutting edge 141 of the cutting edge 132A is inclined with respect to a virtual plane VS4 of the workpiece perpendicular to the rotation axis line WO by only an angle α. Substantially, a groove bottom D of the groove formed by the grooving needs to be perpendicular to the rotation axis line WO (that is, is parallel to the virtual plane VS4 of the workpiece). However, as described above, since the front cutting edge 141 is inclined, the groove bottom D of the cut groove is also inclined with respect to the virtual plane VS4 of the workpiece by only the angle α, and sufficient machining accuracy cannot be secured.

On the other hand, in the cutting insert described in PTL 1, the cutting insert is not planarly symmetric with respect to the insert virtual plane while being rotationally symmetric with respect to the insert height axis line, and the entire insert body is need to be twisted. Thereby, when the cutting insert is mounted to the tool body, the corner portion of the circumferential surface S(R) side in the other cutting edge is separated further from the circumferential surface S(R) than the corner portion of the circumferential surface S (R) side in the one cutting edge. However, in this case, the cutting inserts for the left hand and the right hand each must be prepared according to the specification of the tool body, and therefore, the number of parts increases, and management thereof becomes difficult.

The present invention is made with consideration of the above-described circumstances, and an object thereof is to provide an insert-replaceable grooving tool and an end face grooving method capable of sufficiently securing machining accuracy even when performing an end face grooving along the circumferential surface of the workpiece without increasing the number of parts of a cutting insert.

Solution to Problem

In order to achieve the object, the present invention suggests the following means.

That is, the present invention is an insert-replaceable grooving tool for grooving on an end face of a workpiece with an insert, including a cutting insert, a cutting edge of which protrudes toward the end face of the workpiece rotating around a rotation axis line, and a tool body which has a shaft shape, the cutting insert being detachably mounted on an end portion of the tool body. The cutting insert includes an insert body which has a bar shape, and a pair of cutting edges which is formed on an upper surface of the insert body in both ends of a longitudinal direction of the insert body. The cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing through the centers, at the centers, and the cutting insert is formed so as to be planarly symmetric with respect to a virtual plane of the insert which includes the axis line of the height direction and is perpendicular to the longitudinal direction. The cutting edge includes a front cutting edge which is formed on an end edge in the longitudinal direction of the insert body and extends along the traverse direction, a pair of corner portions which is disposed on both ends of the front cutting edge and is formed so as to protrude in the traverse direction, and a pair of side surface cutting edges which extends so as to gradually narrow the mutual gap moving from the corner portions toward the centers along the longitudinal direction. The cutting insert is disposed along one side surface of the tool body, and one cutting edge in the pair of cutting edges protrudes toward a grooving direction from an end face of the end portion. The axis line of the traverse direction is gradually inclined toward the front of a rotational direction around the workpiece rotates moving toward a first traverse direction which is a direction from one corner portion positioned on the one side surface side of the tool body in the pair of corner portions toward the other corner portion in the traverse direction. The axis line of the longitudinal direction is inclined with respect to a virtual plane of the tool including the other corner portion of the one cutting edge and the rotation axis line, and extends toward a lower surface side of the insert body so as to gradually approach the virtual plane of the tool moving toward a first longitudinal direction which is a direction from the other cutting edge toward the one cutting edge of the pair of cutting edges in the longitudinal direction. The one corner portion in the other cutting edge is disposed further toward the first traverse direction than the one corner portion in the one cutting edge.

In addition, the present invention is an end face grooving method for grooving on an end face of a workpiece with an insert of an insert-replaceable grooving tool including a cutting insert, a cutting edge of which protrudes toward the end face of the workpiece rotating around a rotation axis line, and a tool body which has a shaft shape, the cutting insert being detachably mounted on an end portion of the tool body. The cutting insert includes an insert body which has a bar shape and a pair of cutting edges which is formed on an upper surface of the insert body in both ends of a longitudinal direction of the insert body. The cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing through the centers, at the centers, and the cutting insert is formed so as to be planarly symmetric with respect to a virtual plane of the insert which includes the axis line of the height direction and is perpendicular to the longitudinal direction. The cutting edge includes a front cutting edge which is formed on an end edge in the longitudinal direction of the insert body and extends along the traverse direction, a pair of corner portions which is disposed on both ends of the front cutting edge and is formed so as to protrude in the traverse direction, and a pair of side surface cutting edges which extends so as to gradually narrow the mutual gap moving from the corner portions toward the centers along the longitudinal direction. A grooving is performed with respect to the end face by disposing the cutting insert along one side surface of the tool body, protruding one cutting edge in the pair of cutting edges in a grooving direction from an end face of the end portion, and moving the one cutting edge in the grooving direction. At the time of the grooving, the axis line of the traverse direction is gradually inclined toward the front of a rotational direction around which the workpiece rotates moving toward a first traverse direction which is a direction from one corner portion positioned on the one side surface side of the tool body in the pair of corner portions toward the other corner portion in the traverse direction. In addition, the axis line of the longitudinal direction is inclined with respect to a virtual plane of the tool including the other corner portion of the one cutting edge and the rotation axis line, and the axis line of the longitudinal direction extends toward a lower surface side of the insert body so as to gradually approach the virtual plane of the tool moving toward a first longitudinal direction which is a direction from the other cutting edge toward the one cutting edge of the pair of cutting edges in the longitudinal direction. Moreover, the one corner portion in the other cutting edge is disposed further toward the first traverse direction than the one corner portion in the one cutting edge.

According to the insert-replaceable grooving tool and the end face grooving method of the present invention, since the front cutting edge in the one cutting edge of the cutting insert protruding toward the end face of the workpiece from the tip of the tool body is gradually inclined toward the front of the rotational direction around which the workpiece rotates moving toward the first traverse direction so as to be parallel to the axis line of the traverse direction, the discharge performance of chips which are cut by the one cutting edge can be enhanced.

In addition, the axis line of the longitudinal direction of the cutting insert is inclined so as to gradually approach the virtual plane of the tool moving toward the first longitudinal direction and extends toward the lower surface side (lower surface side of tool body) of the insert body. That is, since the other cutting edge is separated toward the upper surface side of the insert body (upper surface side of tool body) with respect to the virtual plane of the tool, a wedge angle of the one cutting edge can be formed to be large. Thereby, cutting edge strength of the one cutting edge performing the grooving to the workpiece is sufficiently secured.

Moreover, the one corner portion, which is positioned on the side opposite to the first traverse direction in the other cutting edge, is positioned in the first traverse direction with respect to the one corner portion positioned on the opposite side in the one cutting edge. Thereby, for example, in the case where the grooving (end face grooving of inner diameter side) is performed to the inner face (end face) of a machined hole along the inner circumferential surface of the machined hole having a cylindrical hole shape which is formed with the rotation axis line of the workpiece as the center, the following effects are presented. That is, for example, when the one corner portion in the one cutting edge of the cutting insert is closely disposed so as to abut the inner circumferential surface of the workpiece, the cutting insert moves in the grooving direction along the inner circumferential surface, and the grooving is performed, the one corner portion in the other cutting edge is separated from the inner circumferential surface, and therefore, the corner portion contacting the inner circumferential surface and being damaged is reliably prevented. Moreover, for example, in a step portion of the workpiece having a multistage cylindrical shape, in the case where the grooving (the end face grooving of the outer diameter side) is performed to the end face of the workpiece along the small diameter portion having the outer circumferential surface parallel to the rotation axis line, effects similar to those above-described are obtained. That is, for example, when the one corner portion in the one cutting edge of the cutting insert is closely disposed so as to abut the outer circumferential surface of a small diameter portion of the workpiece, the cutting insert moves in the grooving direction along the small diameter portion, and the grooving is performed, the one corner portion in the other cutting edge is separated from the small diameter portion, and therefore, the corner portion contacting the small diameter portion and being damaged is prevented.

Moreover, the unused other cutting edge being damaged due to the above-described contacting is prevented.

In addition, the one corner portion of the other cutting edge is separated from the circumferential surface of the workpiece regardless of a depth d1 of end faces B and E of the workpiece W shown in FIGS. 23 and 24, and therefore, the corner portion contacting the circumferential surface and being damaged is reliably prevented.

Moreover, if attention is focused on a groove bottom of the workpiece which is cut by the one cutting edge, the axis line of the traverse direction of the cutting insert is gradually inclined toward the front of the rotational direction around which the workpiece rotates moving toward the first traverse direction, the axis line of the longitudinal direction is inclined toward the lower surface side of the insert body so as to approach with respect to the virtual plane of the tool moving toward the first longitudinal direction, and the one corner portion in the other cutting edge is disposed further toward the first traverse direction than the one corner portion in the one cutting edge. Therefore, the groove bottom is formed so as to include an inclination close to perpendicularity with respect to the rotation axis line of the workpiece. That is, an angle $\alpha$ of a groove bottom D described in FIG. 28 is significantly decreased, and the machining accuracy of the groove which is cut in the workpiece can be enhanced.

Moreover, the pair of side surface cutting edges which is included for each of the cutting edges is formed to be inclined to gradually narrow the mutual gap moving from the outer end edge in the longitudinal direction of the insert body toward the center, and therefore, machining accuracy of the groove wall is secured. That is, even though the mounting posture with respect to the tool body of the cutting insert is set as described above, the side surface cutting edge which is disposed on the side opposite to the circumferential surface of the workpiece in the one cutting edge (that is, the first traverse direction) does not contact the opening end edge of the groove wall of the opposite side of the groove formed in the workpiece.

In addition, in the insert-replaceable grooving tool of the present invention, when the cutting insert is viewed from the direction perpendicular to the virtual plane of the tool, an angle $\theta 1$ between the axis line of the traverse direction and the rotation axis line may be 90° or more and 90.5° or less.

According to the insert-replaceable grooving tool of the present invention, for example, in the case where the circumferential surface of the workpiece is formed so as to be parallel to the rotation axis line, when the cutting insert is viewed from the direction perpendicular to the virtual plane of the tool, the angle in which the axis line of the longitudinal direction of the insert body is inclined with respect to the circumferential surface becomes a value which is approximated to a value (that is, θ1–90°) and slightly greater than the value (θ1–90°) of 90° subtracted from the angle θ1 which is between the axis line of the traverse direction and the rotation axis line. That is, the cutting insert is mounted on the tool body so that the axis line of the longitudinal direction of the insert body is slightly inclined and is approximately parallel with respect to the circumferential surface of the workpiece. Thereby, as described above, the one corner portion of the other cutting edge is reliably separated from the circumferential surface. Therefore, the machining accuracy of the groove bottom in the groove formed on the end face of the workpiece can be secured while the machining accuracy of the circumferential surface is secured. Specifically, since the angle θ1 is set within the above-described range, the groove bottom of the workpiece which is subjected to the grooving is formed so as to approximately perpendicular to the rotation axis line, and therefore, the machining accuracy of the groove bottom is enhanced.

In addition, in the insert-replaceable grooving tool of the present invention, the end face may be an inner face facing a base end side of the tool body in a machined hole formed in the workpiece, and the one cutting edge may perform an end face grooving of an inner diameter side with respect to the inner face.

According to the insert-replaceable grooving tool of the present invention, for example, even when the inner circumferential surface which is adjacent to the inner face of the machined hole being formed in the workpiece and having a cylindrical hole shape and is parallel to the rotation axis line is formed, the end face grooving of the inner diameter side having high accuracy can be performed regardless of the position of the inner face to be subjected to the grooving.

Moreover, in the insert-replaceable grooving tool of the present invention, the end face may be an end face facing a base end side of the tool body in a step portion formed in an outer circumferential surface of the workpiece, and the one cutting edge may perform an end face grooving of an outer diameter side with respect to the end face.

According to the insert-replaceable grooving tool of the present invention, for example, even in the case where the small diameter portion which is adjacent to the end face facing the base end side of the tool body and has the outer circumferential surface parallel to the rotation axis line in the step portion of the workpiece having a multistage cylindrical shape is formed, the end face grooving of the outer diameter side having high accuracy can be performed regardless of the position of the end face to be subjected to the grooving.

In addition, in the insert-replaceable grooving tool of the present invention, the pair of corner portions in the one cutting edge may be disposed on a workpiece virtual plane perpendicular to the rotation axis line.

According to the insert-replaceable grooving tool of the present invention, since the pair of corner portions in the one cutting edge is disposed on the same workpiece virtual plane perpendicular to the rotation axis line of the workpiece, the groove bottom of the workpiece which is cut by the one cutting edge can be formed so as to be perpendicular with respect to the rotation axis line. Thereby, the finished accuracy of the groove of the workpiece is sufficiently secured.

Moreover, in the insert-replaceable grooving tool of the present invention, the corner portions may include a first corner edge having a convex curved line shape, and in the other corner portion of the one cutting edge, an intersection point of an extension line of the front cutting edge which is adjacent to the other corner portion and a vertical line which extends from the outer edge portion of the traverse direction in the first corner edge toward the extension line may be disposed on the virtual plane of the tool.

According to the insert-replaceable grooving tool of the present invention, since the corner portion of the cutting edge includes the first corner edge having a convex curved line shape, the cutting edge damage or the like in the corner portion is prevented.

Moreover, in the insert-replaceable grooving tool of the present invention, the corner portions may include a second linear corner edge which connects an end of the center side in the first corner edge and the side surface cutting edge, and the second corner edge may extend so as to be parallel with respect to the rotation axis line of the workpiece when the cutting insert is viewed from the direction perpendicular to the virtual plane of the tool.

According to the insert-replaceable grooving tool of the present invention, since the second corner edge which connects the end of the center side along the longitudinal direction of the insert body in the first corner edge and the side surface cutting edge extends so as to be parallel with respect to the rotation axis line of the workpiece in the corner portion of the cutting edge, the second corner edge dredges the groove wall of the workpiece which is cut by the front cutting edge and the first corner edge of the one cutting edge, and the finished accuracy of the groove wall can be enhanced.

The present invention is an insert-replaceable grooving tool for grooving on an end face of a workpiece with an insert, including a cutting insert, a cutting edge of which protrudes toward the end face of the workpiece rotating around a rotation axis line, and a tool body which has a shaft shape, the cutting insert being detachably mounted on an end portion of the tool body. The cutting insert includes an insert body which has a bar shape, and a pair of cutting edges which is formed on an upper surface of the insert body in both ends of a longitudinal direction of the insert body. The cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing through the centers, at the centers, and the cutting insert is formed so as to be planarly symmetric with respect to a virtual plane of the insert which includes the axis line of the height direction and is perpendicular to the longitudinal direction. The cutting edge includes a front cutting edge which is formed on an end edge in the longitudinal direction of the insert body and extends along the traverse direction, a pair of corner portions which is disposed on both ends of the front cutting edge and is formed so as to protrude in the traverse direction, and a pair of side surface cutting edges which extends so as to gradually narrow the mutual gap moving from the corner portions toward the centers along the longitudinal direction. The cutting insert is disposed along one side surface of the tool body, and one cutting edge in the pair of cutting edges protrudes toward a grooving direction from an end face of the end portion. The axis line of the traverse direction is gradually inclined toward the back of a rotational direction around which the workpiece rotates moving toward a first traverse direction which is a direction from one corner portion positioned on the one side surface side of the tool body in the pair of corner portions toward the other corner portion in the traverse direction. The axis line of the longitudinal direction is inclined with respect to a virtual plane of the tool including the other corner portion of the one cutting edge and the rotation axis line, and extends toward an upper surface side of the insert body so as to gradually approach the virtual plane of the tool moving toward a first longitudinal direction which is a direction from the other cutting edge toward the one cutting edge of the pair of cutting edges in the longitudinal direction. The one corner portion in the other cutting edge is disposed further toward the first traverse direction than the one corner portion in the one cutting edge.

In addition, the present invention is an end face grooving method for grooving on an end face of a workpiece with an insert of an insert-replaceable grooving tool including a cutting insert, a cutting edge of which protrudes toward the end face of the workpiece rotating around a rotation axis line, and a tool body which has a shaft shape, the cutting insert being detachably mounted on an end portion of the tool body. The cutting insert includes an insert body which has a bar shape and a pair of cutting edges which is formed on an upper surface of the insert body in both ends of a longitudinal direction of the insert body. The cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing through the centers, at the centers, and the cutting insert is formed so as to be planarly symmetric with respect to a virtual plane of the insert which includes the axis line of the height direction and is perpendicular to the longitudinal direction. The cutting edge includes a front cutting edge which is formed on an end edge in the longitudinal direction of the insert body and extends along the traverse direction, a pair of corner portions which is disposed on both ends of the front cutting edge and is formed so as to protrude in the traverse direction, and a pair of side surface cutting edges which extends so as to gradually narrow the mutual gap moving from the corner portions toward the centers along the longitudinal direction. A grooving is performed with respect to the end face by disposing the cutting insert along one side surface of the tool body, protruding one cutting edge in the pair of cutting edges in a grooving direction from an end face of the end portion, and moving the one cutting edge in the grooving direction. At the time of the grooving, the axis line of the traverse direction is gradually inclined toward the back of a rotational direction around which the workpiece rotates moving toward a first traverse direction which is a direction from one corner portion positioned on the one side surface side of the tool body in the pair of corner portions toward the other corner portion in the traverse direction. In addition, the axis line of the longitudinal direction is inclined with respect to a virtual plane of the tool including the other corner portion of the one cutting edge and the rotation axis line, and the axis line of the longitudinal direction extends toward an upper surface side of the insert body so as to gradually approach the virtual plane of the tool moving toward a first longitudinal direction which is a direction from the other cutting edge toward the one cutting edge of the pair of cutting edges in the longitudinal direction. Moreover, the one corner portion in the other cutting edge is disposed further toward the first traverse direction than the one corner portion in the one cutting edge.

According to the insert-replaceable grooving tool and the end face grooving method of the present invention, since the front cutting edge in the one cutting edge of the cutting insert protruding toward the end face of the workpiece from the tip of the tool body is gradually inclined toward the back of the rotational direction around which the workpiece rotates moving toward the first traverse direction so as to be parallel to the axis line of the traverse direction, the cutting resistance is decreased when the tool body is transversely fed.

That is, generally, when the tool body is transversely fed, in the case of the end face grooving of the inner diameter side, the tool body moves from the inner circumferential surface of the workpiece toward the rotation axis line, in the case of the end face grooving of the outer diameter side, the tool body moves toward the side opposite to the rotation axis line from the outer circumferential surface of the workpiece (direction which is separated from the outer circumferential surface). At this time, since the other side corner portion and the side surface cutting edge, which are positioned at the front of the movement direction in the one cutting edge of the cutting insert, sharply cut into with respect to the workpiece, the cutting resistance is decreased.

In addition, in the case where the end face grooving of the inner diameter side is performed, since component of the cutting resistance generated when the grooving is performed is operated from the one side surface in which the cutting insert is disposed in the tool body toward the center of the tool body, the cutting is stabilized, and the machining accuracy is secured.

In addition, in the case where the end face grooving of the outer diameter side is performed, since the front cutting edge of the one cutting edge is set as described above, the cutting can be stably performed with higher accuracy. Specifically, when the insert-replaceable grooving tool is mounted on a machine tool or the like, at least the other side surface facing the side of the side opposite to the one side surface of the tool body abuts the machine tool or the like. Since the front cutting edge of the one cutting edge of the cutting insert is gradually inclined toward the back side of the rotational direction in which the workpiece is rotated moving toward the first traverse direction, the component of the cutting resistance which is received by the cutting edge at the time of the grooving is operated so as to press the other side surface of the tool body on the machine tool or the like. Thereby, the position of the insert-replaceable grooving tool with respect to the machine tool or the like is stabilized at the time of the cutting, and the cutting having high accuracy can be stably performed.

In addition, the axis line of the longitudinal direction of the cutting insert is inclined so as to gradually approach the virtual plane of the tool moving toward the first longitudinal direction and extends toward the upper surface side (upper surface side of tool body) of the insert body. That is, since the other cutting edge is separated toward the lower surface side of the insert body (lower surface side of tool body) with respect to the virtual plane of the tool, the one cutting edge sharply cuts into the end face of the workpiece, and the sharpness can be sufficiently enhanced.

Moreover, the one corner portion, which is positioned on the side opposite to the first traverse direction in the other cutting edge, is positioned in the first traverse direction with respect to the one corner portion positioned on the opposite side in the one cutting edge. Thereby, for example, in the case where the grooving (end face grooving of inner diameter side) is performed to the inner face (end face) of the machined hole along the inner circumferential surface of the machined hole having a cylindrical hole shape which is formed with the rotation axis line of the workpiece as the center, the following effects are presented. That is, for example, when the one corner portion in the one cutting edge of the cutting insert is closely disposed so as to abut the inner circumferential surface of the workpiece, the cutting insert moves in the grooving direction along the inner circumferential surface, and the grooving is performed, the one corner portion in the other cutting edge is separated from the inner circumferential surface, and therefore, the corner portion contacting the inner circumferential surface and being damaged is reliably prevented. Moreover, for example, in a step portion of the workpiece having a multistage cylindrical shape, in the case where the grooving (the end face grooving of the outer diameter side) is performed to the end face of the workpiece along the small diameter portion having the outer circumferential surface parallel to the rotation axis line, effects similar to those above-described are obtained. That is, for example, when the one corner portion in the one cutting edge of the cutting insert is closely disposed so as to abut the outer circumferential surface of a small diameter portion of the workpiece, the cutting insert moves in the grooving direction along the small diameter portion, and the grooving is performed, the one corner portion in the other cutting edge is separated from the small diameter portion, and therefore, the corner portion contacting the small diameter portion and being damaged is prevented.

Moreover, the unused other cutting edge being damaged due to the described contacting above is prevented.

In addition, the one corner portion of the other cutting edge is separated from the circumferential surface of the workpiece regardless of a depth d1 of end faces B and E of the workpiece W shown in FIGS. 23 and 24, and therefore, the corner portion contacting the circumferential surface and being damaged is reliably prevented.

Moreover, if attention is focused on a groove bottom of the workpiece which is cut by the one cutting edge, the axis line of the traverse direction of the cutting insert is gradually inclined toward the back of the rotational direction around which the workpiece rotates moving toward the first traverse direction, the axis line of the longitudinal direction is inclined toward the upper surface side of the insert body so as to approach with respect to the virtual plane of the tool moving toward the first longitudinal direction, and the one corner portion in the other cutting edge is disposed further toward the first traverse direction than the one corner portion in the one cutting edge. Therefore, the groove bottom is formed so as to include an inclination close to perpendicularity with respect to the rotation axis line of the workpiece. That is, the angle α of the groove bottom D described in FIG. 28 is significantly decreased, and the machining accuracy of the groove which is cut in the workpiece can be enhanced.

Moreover, the pair of side surface cutting edges which is included for each of the cutting edges is formed to be inclined to gradually narrow the mutual gap moving from the outer end edge in the longitudinal direction of the insert body toward the center, and therefore, machining accuracy of the groove wall is secured. That is, even though the mounting posture with respect to the tool body of the cutting insert is set as described above, the side surface cutting edge which is disposed on the side opposite to the circumferential surface of the workpiece in the one cutting edge (that is, the first traverse direction) does not contact the opening end edge of the groove wall of the opposite side of the groove formed in the workpiece.

In addition, in the insert-replaceable grooving tool of the present invention, when the cutting insert is viewed from the direction perpendicular to the virtual plane of the tool, the angle $\theta 1$ between the axis line of the traverse direction and the rotation axis line may be 90° or more and 90.5° or less.

According to the insert-replaceable grooving tool of the present invention, for example, in the case where the circumferential surface of the workpiece is formed so as to be parallel to the rotation axis line, when the cutting insert is viewed from the direction perpendicular to the virtual plane of the tool, the angle in which the axis line of the longitudinal direction of the insert body is inclined with respect to the circumferential surface becomes a value which is approximated to a value (that is, $\theta 1-90$) and slightly greater than the value ($\theta 1-90°$) of 90° subtracted from the angle $\theta 1$ which is between the axis line of the traverse direction and the rotation axis line. That is, the cutting insert is mounted on the tool body so that the axis line of the longitudinal direction of the insert body is slightly inclined and is approximately parallel with respect to the circumferential surface of the workpiece. Thereby, as described above, the one corner portion of the other cutting edge is reliably separated from the circumferential surface. Therefore, the machining accuracy of the groove bottom in the groove formed on the end face of the workpiece can be secured while the machining accuracy of the circumferential surface is secured. Specifically, since the angle $\theta 1$ is set within the above-described range, the groove bottom of the workpiece which is subjected to the grooving is formed so as to approximately perpendicular to the rotation axis line, and therefore, the machining accuracy of the groove bottom is enhanced.

In addition, in the insert-replaceable grooving tool of the present invention, the end face may be an inner face facing a base end side of the tool body in a machined hole formed in the workpiece, and the one cutting edge may perform an end face grooving of an inner diameter side with respect to the inner face.

According to the insert-replaceable grooving tool of the present invention, for example, even when the inner circumferential surface which is adjacent to the inner face of the machined hole being formed in the workpiece and having a cylindrical hole shape and is parallel to the rotation axis line is formed, the end face grooving of the inner diameter side having high accuracy can be performed regardless of the position of the inner face to be subjected to the grooving.

Moreover, in the insert-replaceable grooving tool of the present invention, the end face may be an end face facing a base end side of the tool body in a step portion formed in an outer circumferential surface of the workpiece, and the one cutting edge may perform an end face grooving of an outer diameter side with respect to the end face.

According to the insert-replaceable grooving tool of the present invention, for example, even in the case where the small diameter portion which is adjacent to the end face facing the base end side of the tool body and has the outer circumferential surface parallel to the rotation axis line in the step portion of the workpiece having a multistage cylindrical shape is formed, the end face grooving of the outer diameter side having high accuracy can be performed regardless of the position of the end face to be subjected to the grooving.

In addition, in the insert-replaceable grooving tool of the present invention, the pair of corner portions in the one cutting edge may be disposed on a workpiece virtual plane perpendicular to the rotation axis line.

According to the insert-replaceable grooving tool of the present invention, since the pair of corner portions in the one cutting edge is disposed on the same workpiece virtual plane perpendicular to the rotation axis line of the workpiece, the groove bottom of the workpiece which is cut by the one cutting edge can be formed so as to be perpendicular with respect to the rotation axis line. Thereby, the finished accuracy of the groove of the workpiece is sufficiently secured.

Moreover, in the insert-replaceable grooving tool of the present invention, the corner portions may include a first corner edge having a convex curved line shape, and in the other corner portion of the one cutting edge, an intersection point of an extension line of the front cutting edge which is adjacent to the other corner portion and a vertical line which extends from the outer edge portion of the traverse direction in the first corner edge toward the extension line may be disposed on the virtual plane of the tool.

According to the insert-replaceable grooving tool of the present invention, since the corner portion of the cutting edge includes the first corner edge having a convex curved line shape, the cutting edge damage or the like in the corner portion is prevented.

Moreover, in the insert-replaceable grooving tool of the present invention, the corner portions may include a second linear corner edge which connects an end of the center side in the first corner edge and the side surface cutting edge, and the second corner edge may extend so as to be parallel with respect to the rotation axis line of the workpiece when the cutting insert is viewed from the direction perpendicular to the virtual plane of the tool.

According to the insert-replaceable grooving tool of the present invention, since the second corner edge which connects the end of the center side along the longitudinal direction of the insert body in the first corner edge and the side surface cutting edge extends so as to be parallel with respect to the rotation axis line of the workpiece in the corner portion of the cutting edge, the second corner edge dredges the groove wall of the workpiece which is cut by the front cutting edge and the first corner edge of the one cutting edge, and the finished accuracy of the groove wall can be enhanced.

Advantageous Effects of Invention

According to the insert-replaceable grooving tool and the end face grooving method of the present invention, it is possible to sufficiently secure the machining accuracy even when performing the end face grooving along the circumferential surface of the workpiece without increasing the number of parts of the cutting insert.

DESCRIPTION OF EMBODIMENTS

First Embodiment

Figure 1:
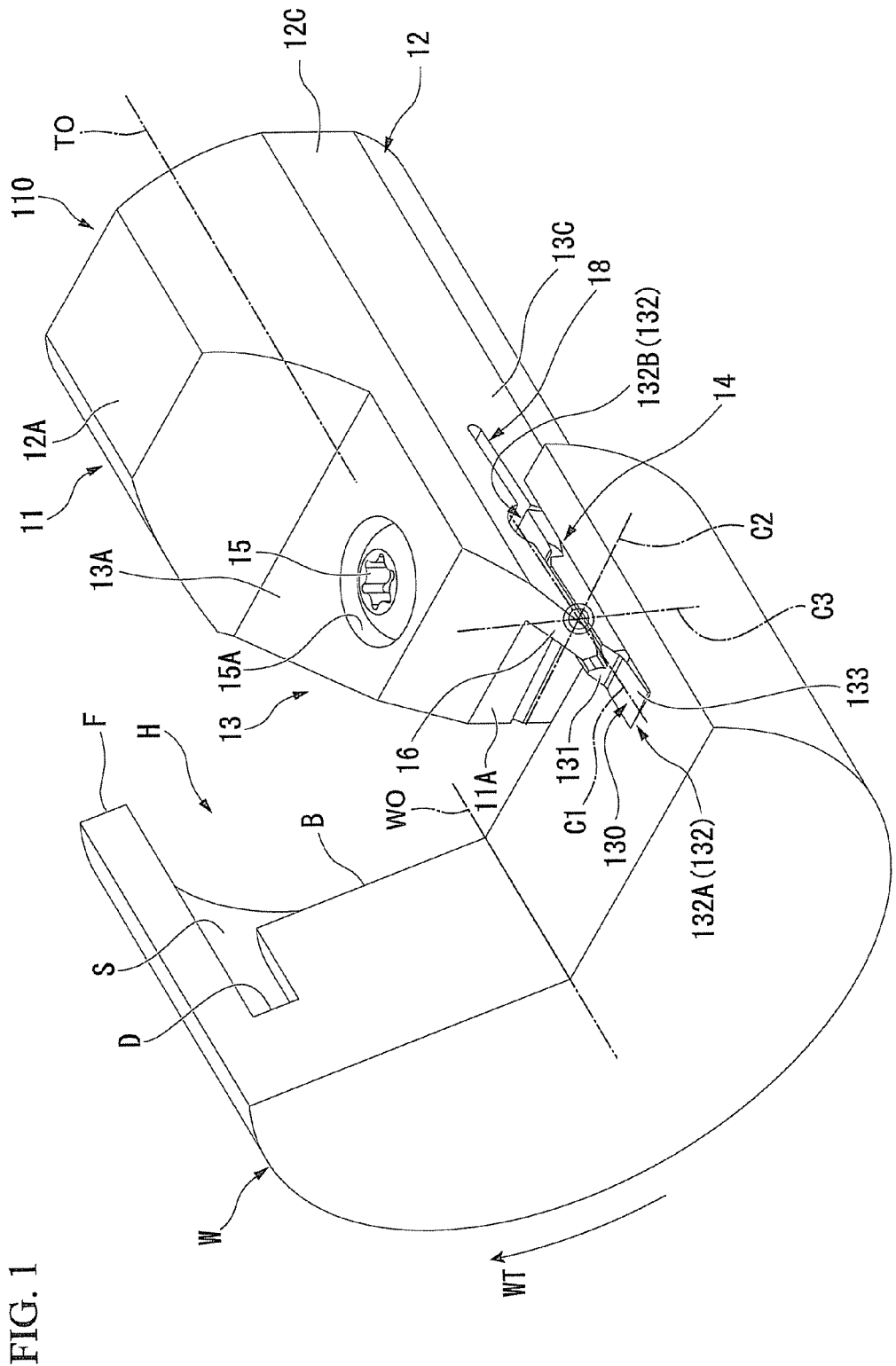
FIG. 1 is a schematic perspective view showing an insert-replaceable grooving tool of a first embodiment of the present invention and a workpiece to which a grooving is performed using the insert-replaceable grooving tool.
Figure 2:
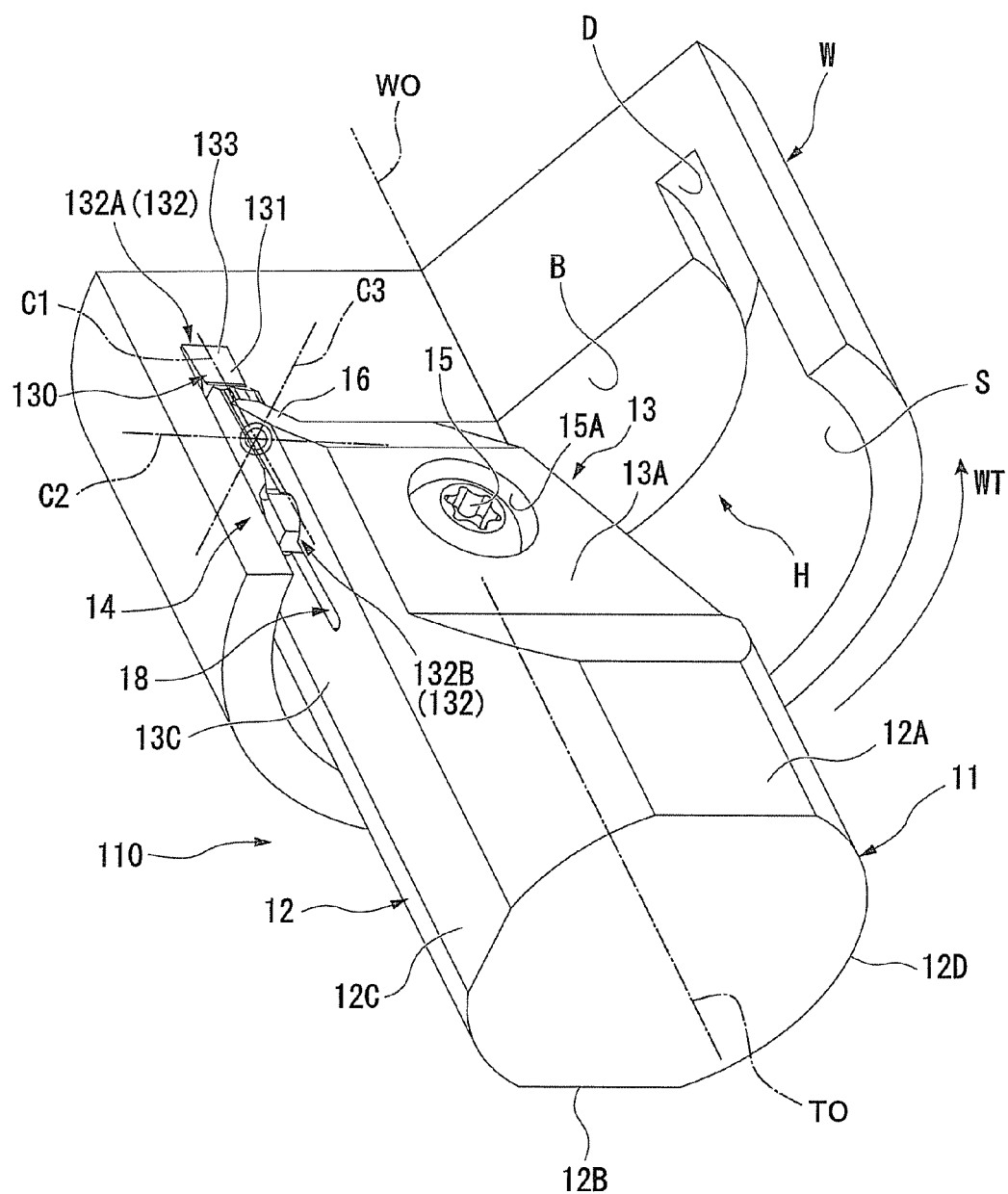
FIG. 2 is a schematic perspective view showing the insert-replaceable grooving tool of the first embodiment of the present invention and the workpiece to which the grooving is performed using the insert-replaceable grooving tool.

FIGS. 1 to 11 show an insert-replaceable grooving tool 110 of a first embodiment of the present invention and a cutting insert 130 which is used in the insert-replaceable grooving tool 110. The insert-replaceable grooving tool 110 of the present embodiment is formed in a shaft shape, and includes a tool body 11 which is perpendicular to a central axis line TO and has an approximately circular cross-section and a cutting insert 130 which is detachably mounted to an end (tip) 13 of a tip side along the central axis line TO of the tool body 11 and in which a cutting edge 132 protrudes from a tip end face 11A of the tool body 11 toward the tip side.

The insert-replaceable grooving tool 110 of the present embodiment performs an end face grooving of an inner diameter side with respect to a workpiece W having an approximately cylindrical shape. An inner circumferential surface (circumferential surface) S which is parallel to the rotation axis line WO toward the rotation axis line WO of the workpiece W is formed on a machined hole H having a cylindrical hole shape in the workpiece W. The inner circumferential surface S is positioned at the most inner portion of the machined hole H and is adjacent to an inner face (end face) B which is perpendicular to the rotation axis line WO and has a circular plane. In the insert-replaceable grooving tool 110, the central axis line TO of the tool body 11 is disposed so as to be substantially parallel to the rotation axis line WO of the workpiece W. In this state, in the workpiece W which is rotated in a rotational direction WT about the rotation axis line WO, the tip 13 of the tool body 11 is inserted to the machined hole H which is formed about the rotation axis line WO, the cutting edge 132 moves along the inner circumferential surface S, and the inner face B of the machined hole H is cut. Moreover, in the present embodiment, reference numerals X, Y, and Z indicating directions are used in a portion of the drawings. Here, the reference numerals X and Y each indicate a horizontal direction, and specifically, the X direction indicates a horizontal direction parallel to the rotation axis line WO of the workpiece W, and the Y direction indicates a horizontal direction perpendicular to the rotation axis line WO. In addition, the reference numeral Z indicates a vertical direction.

The tool body 11 is formed of a steel material or the like, and a center portion and a base end other than the tip 13 along the central axis line TO are formed by a shank portion 12 having an approximately constant outer diameter. On an area in which the shank portion 12 is positioned on the outer circumferential surface of the tool body 11, band shaped planes which extend so as to be parallel to the central axis line TO while interposing the central axis line TO up and down (Z direction) are formed, and an upper surface 12A and a lower surface 12B which are disposed so as to be opposite to each other are formed. The shank portion 12 is held in a state where rotation of the insert-replaceable grooving tool 110 is stopped by the upper surface 12A and the lower surface 12B, and therefore, the insert-replaceable grooving tool 110 is fixed and supported to a machine tool (not shown). Moreover, in the present embodiment, the central axis line TO extends in the X direction, and the upper surface 12A and the lower surfaces 12B are disposed within an X-Y horizontal plane. In descriptions below, the tip side (the left side in the left and right directions (X direction) in FIG. 3) of the tool body 11 may be referred to as one side, and the base end side (the right side in the X direction in FIG. 3) may be referred to as the other side.

Figure 3:
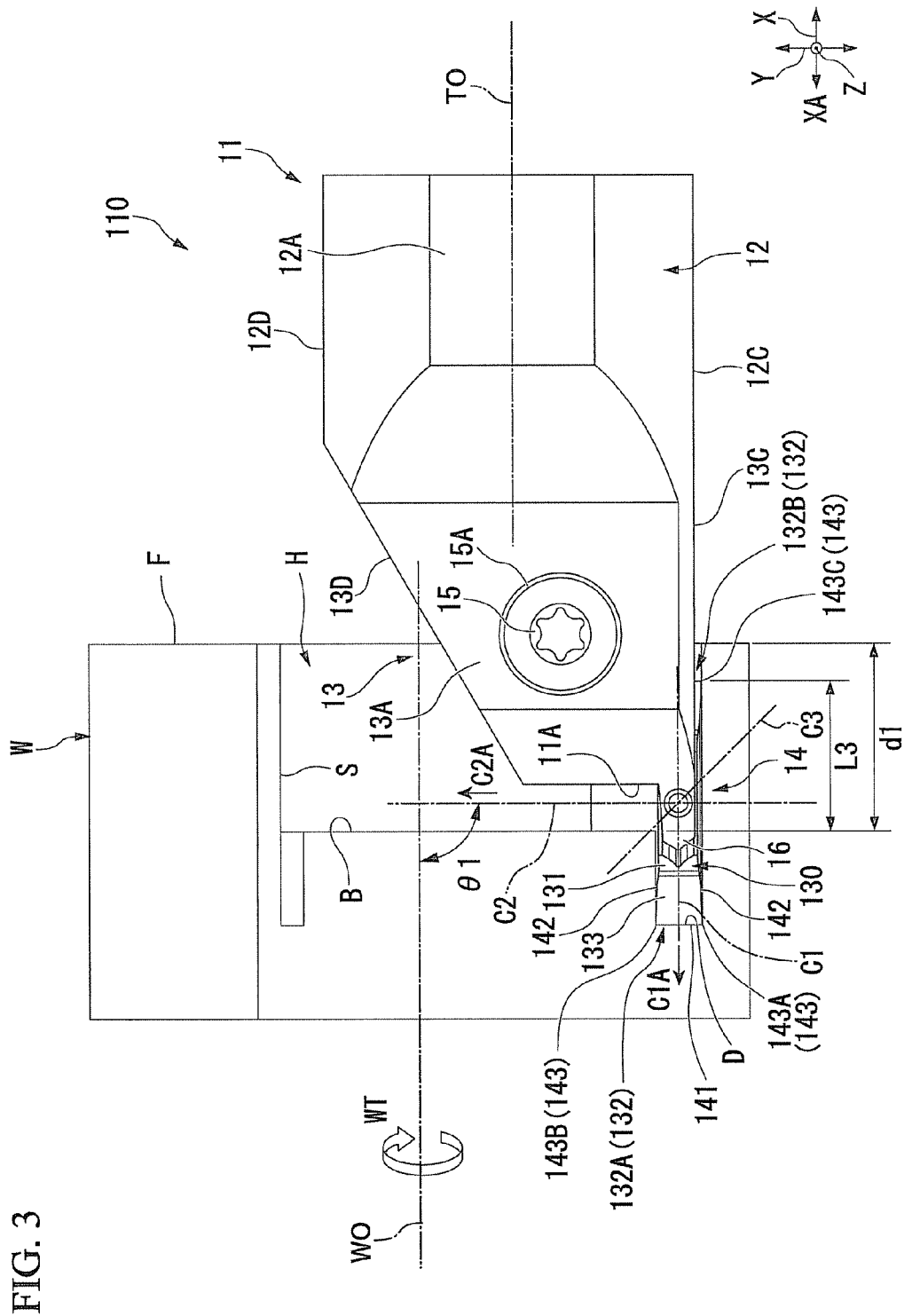
FIG. 3 is a plan view of the insert-replaceable grooving tool of the first embodiment of the present invention and the workpiece when viewed from a direction opposite to a rake face of a cutting insert, and a view when viewed from the upper surface of the cutting insert.
Figure 4:
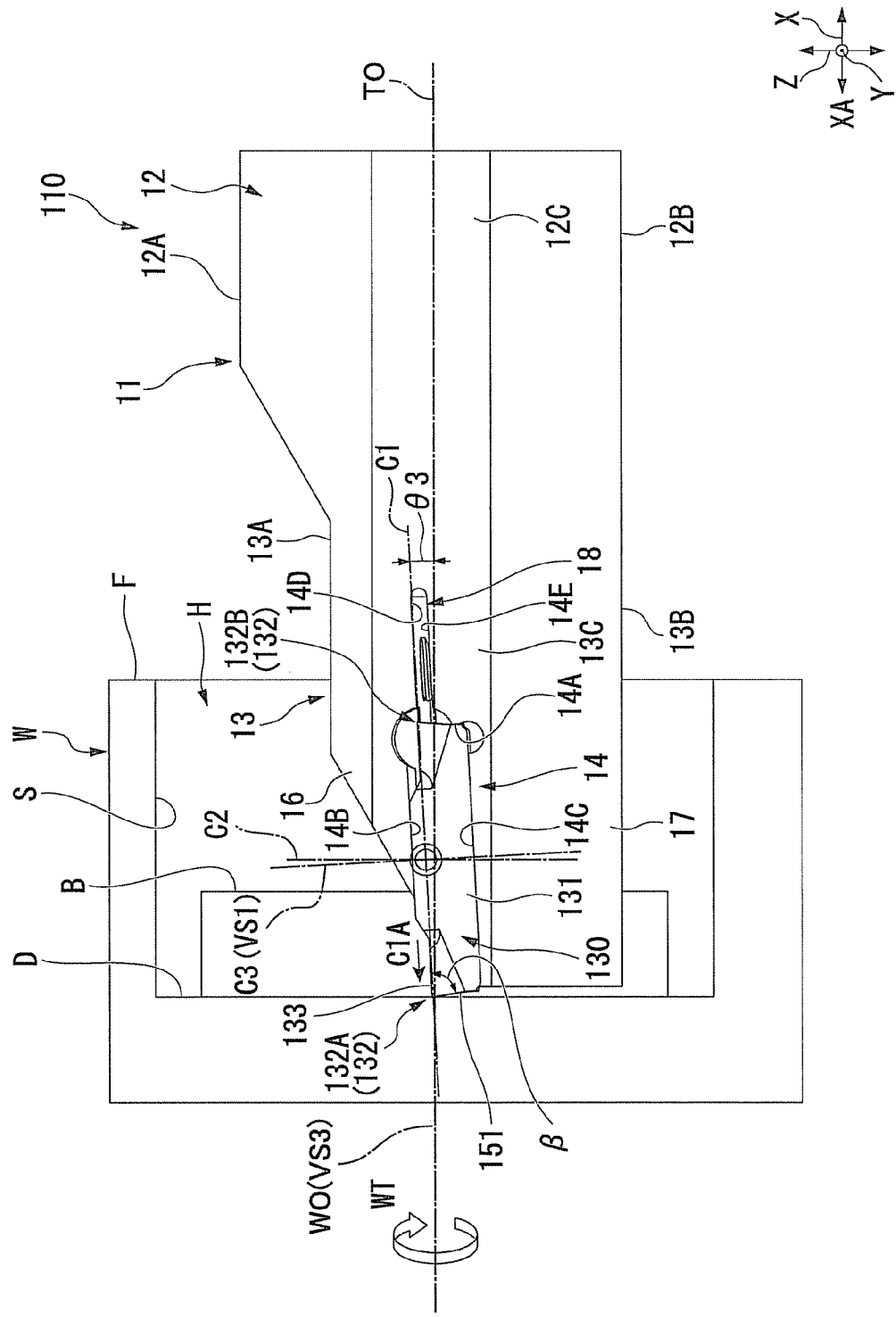
FIG. 4 is a schematic side view showing the insert-replaceable grooving tool of the first embodiment of the present invention and the workpiece.

The tip 13 of the tool body 11 has an approximately trapezoidal shape in a plan view of the tool body 11 shown in FIG. 3 and protrudes from the tip end face 11A to the tip side, and therefore, an upper jaw portion 16 and a lower jaw portion 17 are formed. The upper jaw portion 16 and the lower jaw portion 17 of the tip 13 are disposed so as to be opposite to each other in the up and down directions (Z direction), and are formed on an end of one side (the lower side in FIG. 3) in the directions (Y direction in FIG. 3) perpendicular to the rotation axis line WO in the tip end face 11A. In addition, as shown in FIG. 4, the upper surface 13A of the tip 13 is formed so as to be further recessed by a step than the upper surface 12A of the shank portion 12. Moreover, the lower surface 13B in the tip 13 of the tool body 11 is flush with the lower surface 12B in the shank portion 12.

Moreover, in both side surfaces which face the front (Y direction in FIG. 3) in the tip 13 of the tool body 11, one side surface 13C facing the one side is continuous so as to be flush with a side surface (one side surface) 12C facing the one side in the shank portion 12 and forms the side surface facing the one side of the upper jaw portion 16 and the lower jaw portion 17. A center portion in the Z direction in the one side surface 13C of the tip 13 and the one side surface 12C of the shank portion 12 is formed in a band shaped plane which is perpendicular to the upper surface 12A and the lower surface 12B and extends along the central axis line TO.

Moreover, in the tip 13, the other side surface 13D is formed so as to face the back of the one side surface 13C toward the other side (upper side in FIG. 3) in both side surfaces. The other side surface 13D of the tip 13 is gradually inclined toward the one side moving from the base end of the tool body 11 toward the tip side, and formed in a tapered shape. In addition, the base end of the other side surface 13D is continuous with a side surface (other side surface) 12D having a curved convex shaped cross-section which faces the other side in the shank portion 12. Moreover, the shapes of the shank portion 12 and the tip 13 of the above-described tool body 11 are an example and are not limited to the present embodiment. For example, the shape of the one side surfaces 13C and 12C is not limited to the above-described plane and may be a curved surface shape, an irregular shape, or the like in addition to the plane. Moreover, the one side surface 13C may not be continued to be flush with the one side surface 12C. For example, in a plan view of FIG. 3, the one side surface 12C of the shank portion 12 may protrude downward in the shown Y direction or may be recessed upward in the Y direction with respect to the one side surface 13C of the tip 13.

Figure 5:
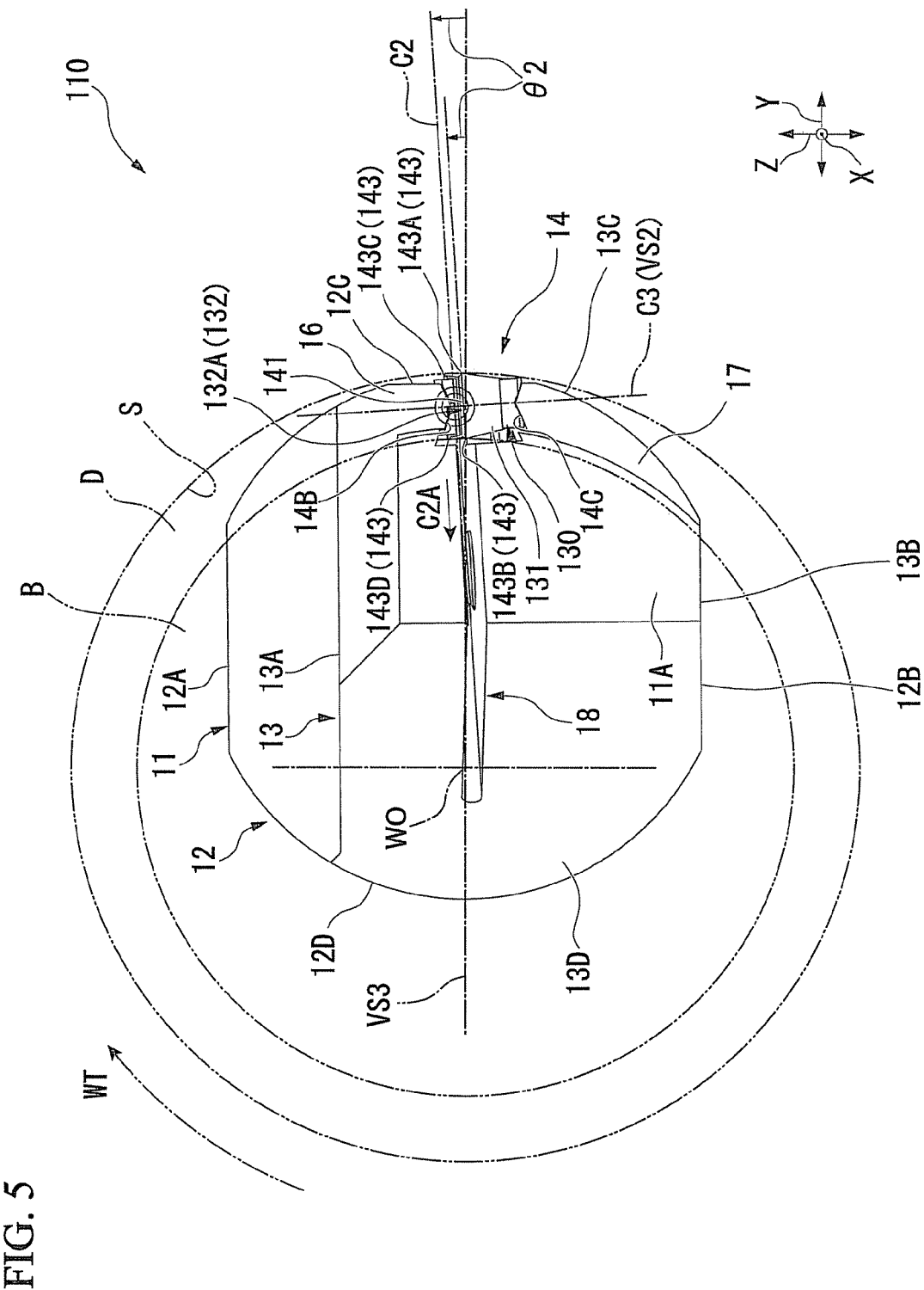
FIG. 5 is a front view of the insert-replaceable grooving tool of the first embodiment of the present invention when viewed from a tip of a tool body.

In a side view of the tool body 11 shown in FIG. 4, the upper jaw portion 16 has an approximately triangular shape, and the upper surface of the upper jaw portion 16 is formed so as to be gradually inclined toward the lower surface 13B side moving from the base end toward the tip side. In addition, in a front view of the tool body 11 shown in FIG. 5, the surface of the lower jaw portion 17 facing the rotation axis line WO has a curved concave shaped cross-section, the surface facing the side opposite to the rotation axis line WO has a curved convex shaped cross-section, and the entire lower jaw portion 17 is formed in an approximately arch shape. As shown in FIG. 5, the thickness of the lower jaw portion 17 is formed so as to be gradually thinned moving from the upper surface 13A side toward the lower surface 13B side. Specifically, in the front view, the lower jaw portion 17 is formed so as to correspond to the lower side portion in the Z direction in the one side surface 12C of the shank portion 12 and the one side surface 13C of the tip 13 and is gradually curved toward the other side surface 13D moving toward the lower side in the Z direction. Moreover, in the side view of FIG. 4, the lower jaw portion 17 has an approximately rectangular shape and protrudes further toward the tip side of the tool body 11 than the upper jaw portion 16.

In addition, a gap is provided between the upper jaw portion 16 and the lower jaw portion 17 and the gap becomes an insert mounting seat 14 to which the cutting insert 130 is detachably mounted. The tool body 11 mounts the cutting insert 130 on the insert mounting seat 14 and the cutting insert 130 is disposed along the one side surfaces 13C and 12C facing the side of the tool body 11. Specifically, in the plan view of FIG. 3, the cutting insert 130 extends so as to be approximately parallel with respect to the central axis line TO when being mounted on the insert mounting seat 14 which is opened to the one side surface 13C of the tip 13 of the tool body 11, and the cutting insert is disposed along the one side surface 13C in a state where a corner portion 143C of the cutting edge 132B described below slightly protrudes toward the lower side in the Y direction from the one side surface 13C.

The insert mounting seat 14 has an approximately rectangular parallelepiped hole shape, is positioned on the one side surface 13C side of the tip 13, and extends along the X direction. The tip and the center portion of the insert mounting seat 14 are disposed between the upper jaw portion 16 and the lower jaw portion 17 and are opened to both sides in the Y direction. In addition, the tip of the insert mounting seat 14 is also opened to a direction (grooving direction XA described below) which faces the tip side in the X direction. In addition, the base end of the insert mounting seat 14 is disposed between the upper surface 13A and the lower surface 13B and is opened to the one side surface 13C. In the side view of FIG. 4, the insert mounting seat 14 is formed so as to be gradually inclined from the upper surface 13A toward the lower surface 13B moving from the base end of the tool body 11 toward the tip side. Moreover, a step portion 14A facing the tip side of the tool body 11 is formed on the base end of the insert mounting seat 14.

Moreover, in the base end side of the insert mounting seat 14, a fastening portion 18, which has a narrower slit shape than the insert mounting seat 14 and is opened to the tip end face 11A, the one side surface 13C, and the other side surface 13D, is formed. The fastening portion 18 is formed so as to be gradually inclined from the upper surface 13A toward the lower surface 13B moving from the base end of the tool body 11 toward the tip side.

Figure 10:
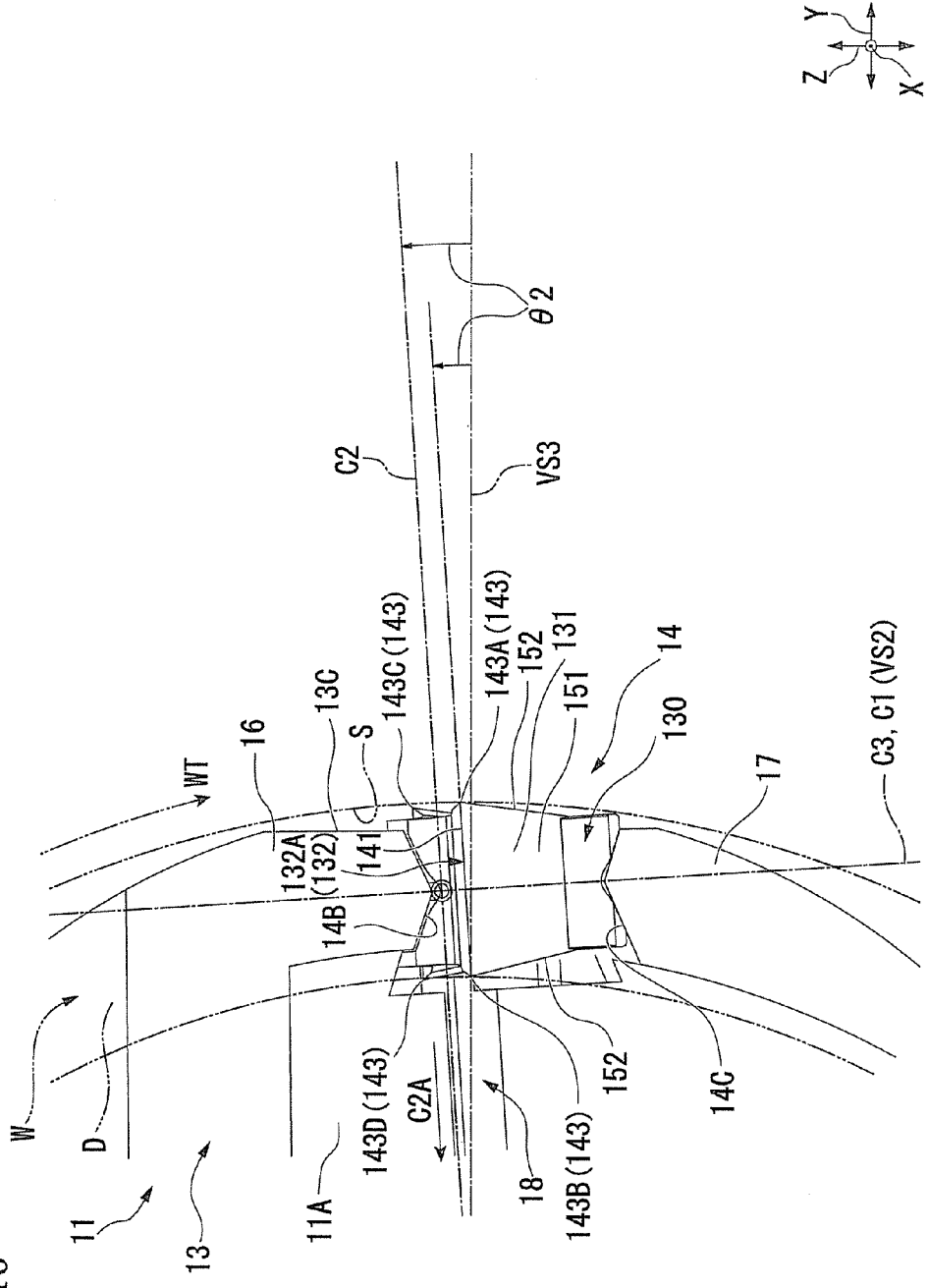
FIG. 10 is an enlarged view of the vicinity of the cutting insert 130 in FIG. 5.

Moreover, as shown in FIGS. 5 and 10, a top wall surface 14B and a bottom wall surface 14C which vertically face each other in the insert mounting seat 14 are formed in a convex V shape respectively when viewed from the tip end face 11A side (that is, when viewed from the front surface of the tip end face 11A). In addition, as shown in FIG. 4, in the fastening portion 18, a gap between the top wall surface 14D and the bottom wall surface 14E is formed so as to be narrow with respect to the insert mounting seat 14. A through hole 15A which is opened to the upper surface 13A of the tip 13 and to which a clamp screw 15 is inserted is formed on the top wall surface 14D of the fastening portion 18. Moreover, a screwed hole (not shown) which is coaxial with the through hole 15A and in which a female screw processing is performed on the inner circumferential surface is formed on the bottom wall surface 14E of the fastening portion 18.

In addition, the cutting insert 130 which is mounted to the insert-replaceable grooving tool 110 is formed of a hard material such as cemented carbide, and as shown in FIG. 4, includes an insert body 131 having a bar shape and a pair of cutting edges 132 which is formed on an upper surface (surface facing upward in the Z direction in FIG. 4) of the insert body 131 in both ends of a longitudinal direction (left and right directions in FIG. 4 (X direction)) of the insert body 131. The cutting insert 130 is a so-called dog bone type cutting insert.

Here, a reference numeral C1 shown in FIGS. 6 to 9 or the like indicates an axis line of the longitudinal direction along the longitudinal direction of the insert body 131, and the axis line C1 of the longitudinal direction passes through a center in a traverse direction perpendicular to the longitudinal direction in the insert body 131 and extends so as to pass through a center of each of front cutting edges 141 and 141 described below in the pair of cutting edges 132. That is, the axis line C1 of the longitudinal direction passes through the center of the pair of cutting edges 132 and extends in the longitudinal direction. Moreover, a reference numeral C2 indicates an axis line of the traverse direction along the traverse direction of the insert body 131, and the axis line C2 of the traverse direction passes through a center (which is a center between the pair of cutting edges 132 and is a portion shown by a double circle in the drawings) of the insert body 131 along the axis line C1 of the longitudinal direction, is perpendicular to the axis line C1 of the longitudinal direction, and extends so as to be parallel to the front cutting edge 141. In addition, a reference numeral C3 indicates an axis line of the height direction along the height direction of the insert body 131, and the axis line C3 of the height direction passes through the center of the insert body 131 and extends in a direction perpendicular to the axis line C1 of the longitudinal direction and the axis line C2 of the traverse direction.

In addition, the cutting insert 130 is formed so as to be symmetric (that is, to be planarly symmetric) with respect to a virtual plane of the insert VS1 which passes through the center of the insert body 131 along the axis line C1 of the longitudinal direction and is perpendicular to the axis line C1 of the longitudinal direction. Moreover, the cutting insert 130 is formed so as to be also symmetric (planarly symmetric) with respect to a virtual plane of the insert VS2 which includes the axis line C1 of the longitudinal direction and the axis line C3 of the height direction and passes through centers of each of an upper surface of the insert body 131 (a surface facing upward in the up and down directions (Z direction) in FIG. 5) and a lower surface (a surface facing downward in the Z direction in FIG. 5). That is, the cutting insert 130 is formed so as to be rotationally symmetric with respect to the axis line C3 of the height direction. In addition, the cutting insert 130 may be formed not to be planarly symmetric with respect to the insert virtual plane VS2.

Figure 6:
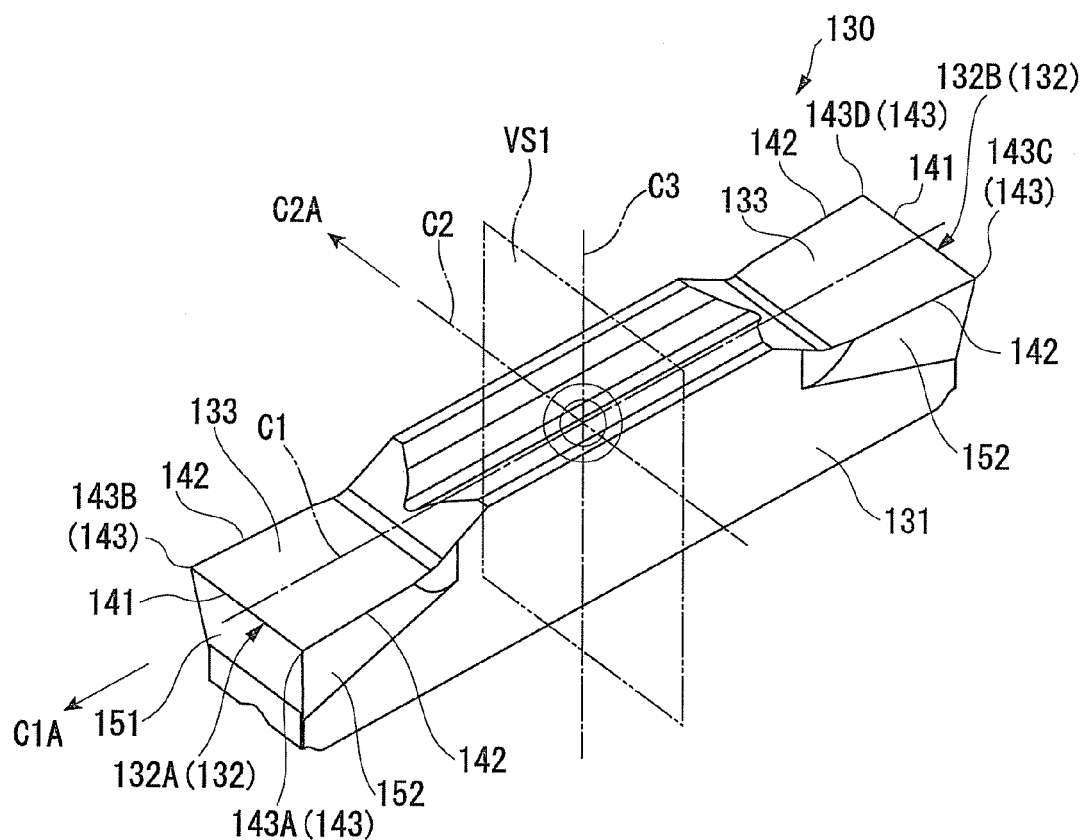
FIG. 6 is a perspective view showing the cutting insert.
Figure 7:
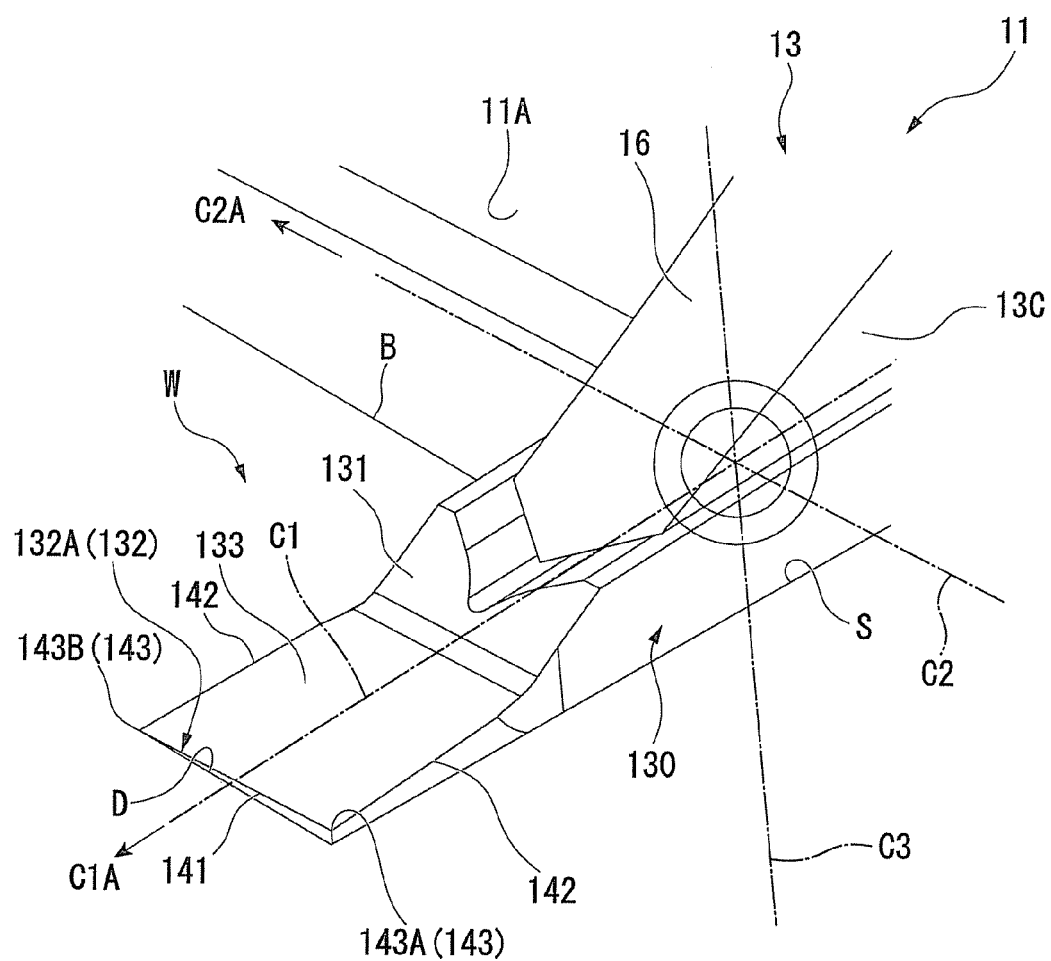
FIG. 7 is an enlarged view of one cutting edge 132A of the cutting insert in FIG. 1.

In addition, as shown in FIGS. 6 and 10, the cutting insert 130 is formed in a recessed V shape in each of a center portion in the longitudinal direction in the upper surface of the insert body 131 and a cross-section in which the lower surface is perpendicular to the axis line C1 of the longitudinal direction. According to the shape of the insert body 131, the cutting insert 130 is guided so as to slide on the top wall surface 14B and the bottom wall surface 14C in the portion which is opened to the tip side of the insert mounting seat 14, and is inserted to the other side (base end side of tool body 11).

As shown in FIG. 4, the end face of the other side of the insert body 131 abuts the step portion 14A, and therefore, the cutting insert 130 which is placed on the insert mounting seat 14 is positioned. In this state, by tightening the clamp screw 15, the top wall surface 14D of the fastening portion 18 approaches toward the bottom wall surface 14E while being elastically deformed, and the top wall surface 14B of the insert mounting seat 14 approaches toward the bottom wall surface 14C while being elastically deformed. In this way, the gaps between the top wall surfaces 14D and 14B and the bottom wall surfaces 14E and 14C are narrowed, and therefore, the cutting insert 130 is fixed and supported by the tip 13 of the tool body 11.

Figure 8:
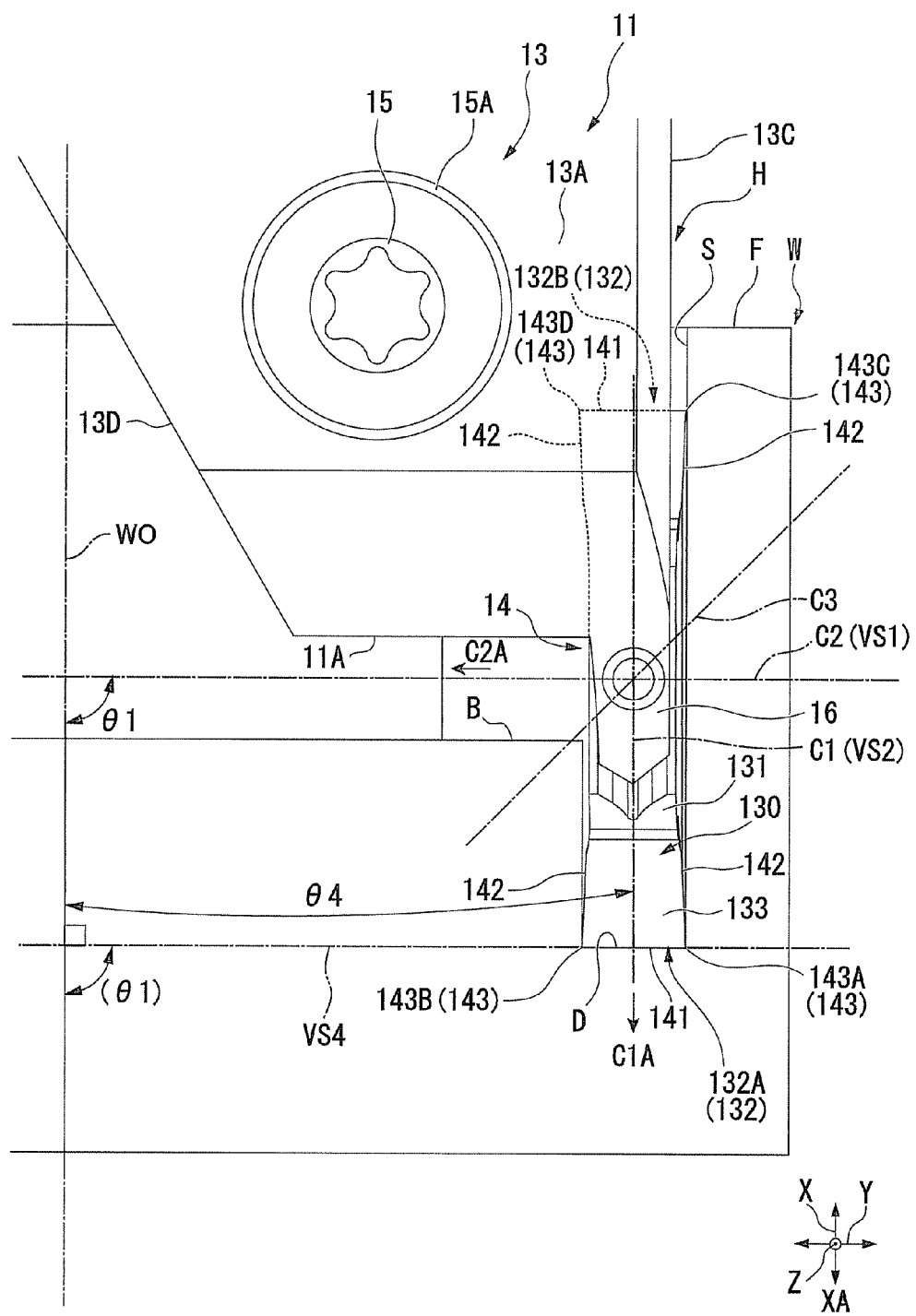
FIG. 8 is an enlarged view of the vicinity of the cutting insert 130 in FIG. 3.

In addition, the pair of cutting edges 132 is disposed on both ends along the direction of the axis line C1 of the longitudinal direction on the upper surface of the insert body 131. As shown in FIG. 8, the cutting edge 132 includes the linear front cutting edge 141 which is formed in an end of the longitudinal direction of the insert body 131 and extends in the traverse direction (left and right directions in FIG. 8) perpendicular to the longitudinal direction, a pair of corner portions 143 which are disposed on both ends of the front cutting edge 141 and is formed so as to protrude in the traverse direction respectively, and a pair of side surface cutting edges 142 which each linearly extends so as to gradually narrow the mutual gap moving toward the center (inner side) of the insert body 131 along the longitudinal direction from the corner portions 143.

Specifically, the pair of side surface cutting edges 142 is formed so as to be gradually inclined from the outer end edge in the traverse direction toward the center (inner side) moving from the outer end edge in the longitudinal direction of the insert body 131 toward the center, and a so-called back taper is applied to the side surface cutting edges.

In addition, both ends in the upper surface of the insert body 131 become the pair of rake faces 133 which is retreated by one step from the center portion and each has an approximately rectangular shape. In the rake faces 133, three sides other than the center side in the longitudinal direction among the outer circumferential edges become the front cutting edge 141 and the pair of side surface cutting edges 142.

Moreover, in FIG. 6, in the circumferential surfaces which connect the upper surface and the lower surfaces among the outer surfaces of the insert body 131, a front flank 151 which is continuous with the front cutting edge 141 and a pair of side flanks 152 which is each continuous with the pair of side surface cutting edges 142 are formed. The front flank 151 is formed so as to be inclined to gradually retreat from the outer surface of the insert body 131 moving from the front cutting edge 141 toward the lower surface side. In addition, the side flanks 152 are formed so as to be inclined to gradually retreat from the outer surface of the insert body 131 moving from the side surface cutting edges 142 toward the lower surface side. Moreover, the outer surface mentioned here shows a virtual plane which passes through the front cutting edge 141 or the side surface cutting edge 142 of the insert body 131 and is parallel to the axis line C3 of the height direction. In descriptions hereinafter, the surface on which the front flank 151 is formed in the insert body 131 is referred to as a front surface of the cutting insert 130, and the surface on which the side flank 152 is formed in the insert body 131 is referred to as a side surface of the cutting insert 130.

If the cutting insert 130 is mounted on the insert mounting seat 14 of the tool body 11, as shown in FIG. 3, the cutting edge 132A in the pair of cutting edges 132 is disposed on the one side (left side in X direction in FIG. 3), and the cutting edge 132B is disposed on the other side (right side in X direction in FIG. 3). Moreover, the one cutting edge 132A protrudes from the tip end face 11A in the tip 13 of the tool body 11 toward the tip side, is disposed so as to be opposite to the inner face B of the workpiece W, and performs the grooving to the inner face B. Specifically, in the tool body 11, the one cutting edge 132A in the pair of cutting edges 132 protrudes toward a grooving direction which is indicated by a reference numeral XA in the X direction from the tip end face 11A of the tip 13, and the cutting inert 130 is mounted.

In addition, a direction indicated by a reference numeral C2A in FIGS. 3, 5 to 8 shows a first traverse direction which is the other traverse direction in the traverse directions (directions in axis line C2 of the traverse direction) of the insert body 131. The first traverse direction C2A is a direction which is from the one corner portion 143A (143C) positioned on the one side surfaces 12C and 13C side of the tool body 11 in the pair of corner portions 143A and 143B (143C and 143D) (positioned on an inner circumferential surface S side of workpiece W) toward the other corner portion 143B (143D) which is positioned on the other side surfaces 12D and 13D side of the tool body 11 rather than on the one corner portion 143A (143C) (positioned on a side opposite to the inner circumferential surface S). As shown in a front view of the tool body 11 of FIG. 10, the axis line C2 of the traverse direction of the cutting insert 130 is gradually inclined toward the front of the rotational direction WT of the workpiece W moving toward the first traverse direction C2A.

That is, the cutting insert 130 is gradually inclined toward the front of the rotational direction WT of the workpiece W as the front cutting edge 141 in the one cutting edge 132A goes toward the first traverse direction C2A. Specifically, as shown in FIG. 5, the cutting insert 130 is gradually inclined toward the front of the rotational direction WT (toward the lower surface 13B of the tool body 11) as the front cutting edge 141 of the cutting edge 132A goes from the one side surface 13C of the tool body 11 toward the other side surface 13D side. Moreover, according to this, in the one cutting edge 132A, the corner portion 143B which is positioned on the first traverse direction C2A in the pair of corner portions 143A and 143B is disposed on the front of the rotational direction WT of the workpiece W with respect to the corner portion 143A.

In the present embodiment, the front cutting edge 141 of the cutting edge 132A is gradually inclined toward the front of the rotational direction WT of the workpiece W as being separated from the inner circumferential surface S toward the rotation axis line WO. Here, one indicated by a reference numeral VS3 in FIGS. 4, 5 and, 10 represents a virtual plane of the tool which includes the corner portion 143B of the cutting edge 132A and the rotation axis line WO. In FIG. 10, an angle $\theta 2$ between the front cutting edge 141 of the cutting edge 132A and the virtual plane of the tool VS3 is more than 0° and less than 7°. In addition, in the present embodiment, for example, $\theta 2$ is about 3°. Moreover, since the axis line C2 of the traverse direction is parallel to the front cutting edge 141, $\theta 2$ can also be an angle between the axis line C2 of the traverse direction and the virtual plane of the tool VS3. In addition, in the present embodiment, the virtual plane of the tool VS3 is disposed within the X-Y horizontal plane.

Moreover, a direction indicated by a reference numeral C1A in FIGS. 3 and 4 shows a first longitudinal direction which is one longitudinal direction in the longitudinal directions (directions of the axis line C1 of the longitudinal direction) of the insert body 131. The first longitudinal direction C1A is a direction which is from the other cutting edge 132B toward the one cutting edge 132A in the pair of cutting edges 132A and 132B. As shown in FIG. 4, when viewed from the one side surface 13C side of the tool body 11, the axis line C1 of the longitudinal direction of the cutting insert 130 is inclined so as to gradually approach the virtual plane of the tool VS3 moving toward the first longitudinal direction C1A.

Specifically, in the side surface view of FIG. 4, the axis line C1 of the longitudinal direction extends so as to gradually approach the virtual plane of the tool VS3 from the upper surface of the insert body 131 toward the lower surface side (downward in the Z direction in FIG. 4) moving toward the first longitudinal direction C1A. That is, the axis line C1 of the longitudinal direction gradually extends from the upper surface 13A of the tool body 11 toward the lower surface 13B side moving toward the first longitudinal direction C1A. Moreover, according to this, the front cutting edge 141 of the cutting edge 132B is separated toward the upper surface side of the insert body 131 (upper surface 13A side of tool body 11) with respect to the virtual plane of the tool VS3. Moreover, in the FIG. 4, an angle $\theta 3$ between the axis line C1 of the longitudinal direction and the virtual plane of the tool VS3 is more than 0° and less than 10°. In the present embodiment, for example, $\theta 3$ is about 3°.

As shown in FIG. 4, the cutting insert 130 mounted on the tool body 11 is disposed so as to be gradually inclined toward the lower surface 13B of the tool body 11 moving from the other side at which the cutting edge 132B is disposed toward the one side at which the cutting edge 132A is disposed and the first longitudinal direction C1A.

Moreover, FIGS. 3 and 8 are top views of the cutting insert 130 when viewed from a direction perpendicular to the virtual plane of the tool VS3; in the top view, an angle $\theta 1$ between the axis line C2 of the traverse direction and the rotation axis line WO is 90° or more and 90.5° or less. The cutting insert 130 is mounted on the insert mounting seat 14 so that the angle $\theta 1$ is in the above-described range. In the present embodiment, $\theta 1$ is about 90°. Thereby, in the top view, an angle between the extension line of the front cutting edge 141 of the cutting edge 132A parallel to the axis line C2 of the traverse direction and the rotation axis line WO also is $\theta 1$ (=90°). Moreover, in FIG. 8, an angle $\theta 4$ between the axis line C1 of the longitudinal direction and the rotation axis line WO is more than 0° to less than 1°. In the present embodiment, $\theta 4$ is about 0.2°. Specifically, the relationship between $\theta 4$ and $\theta 1$ is 1°>$\theta 4$>$\theta 1$−90°. In the present embodiment, since $\theta 1$ is 90°, in the top view of the tool body 11 shown in FIG. 8, the axis line C2 of the traverse direction which is projected to the virtual plane of the tool VS3 and the rotation axis line WO are perpendicular to each other. On the other hand, the axis line C2 of the traverse direction which is projected to the virtual plane of the tool VS3 and the axis line C1 of the longitudinal direction are not perpendicular to each other. That is, the axis line C1 of the longitudinal direction which is projected to the virtual plane of the tool VS3 and the rotation axis line WO are not parallel to each other.

Figure 9:
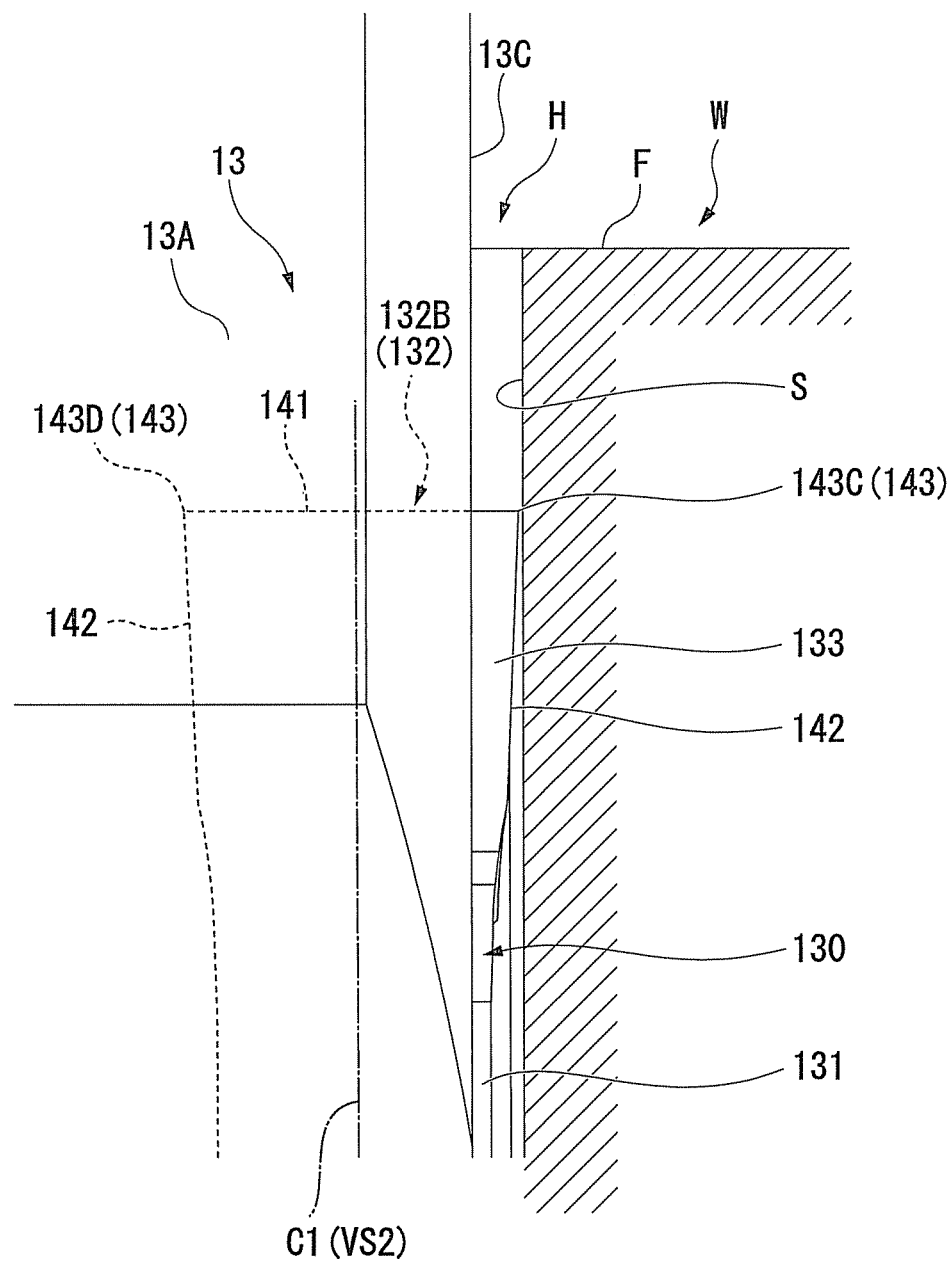
FIG. 9 is an enlarged view of the other cutting edge 132B of the cutting insert in FIG. 8.

Moreover, as shown in FIGS. 8 and 9, when viewed from the direction perpendicular to the virtual plane of the tool VS3 (opposite to the rake face 133), in the cutting insert 130, the corner portion 143C which is positioned on the side opposite to the first traverse direction C2A in the other cutting edge 132B is disposed further toward the first traverse direction C2A than the corner portion 143A which is positioned on the opposite side in the one cutting edge 132A. That is, the corner portion 143A which is positioned on the one side surface 13C side of the tool body 11 (left side in FIG. 8) in the one cutting edge 132A is disposed further toward the one side surface 13C side (side opposite to the first traverse direction C2A) than the corner portion 143C which is positioned on the one side surface 13C side in the other cutting edge 132B. In the present embodiment, the corner portion 143C which is positioned on the inner circumferential surface S side in the cutting edge 132B is separated from the inner circumferential surface S with respect to the corner portion 143A which is positioned on the inner circumferential surface S side in the cutting edge 132A.

Figure 11:
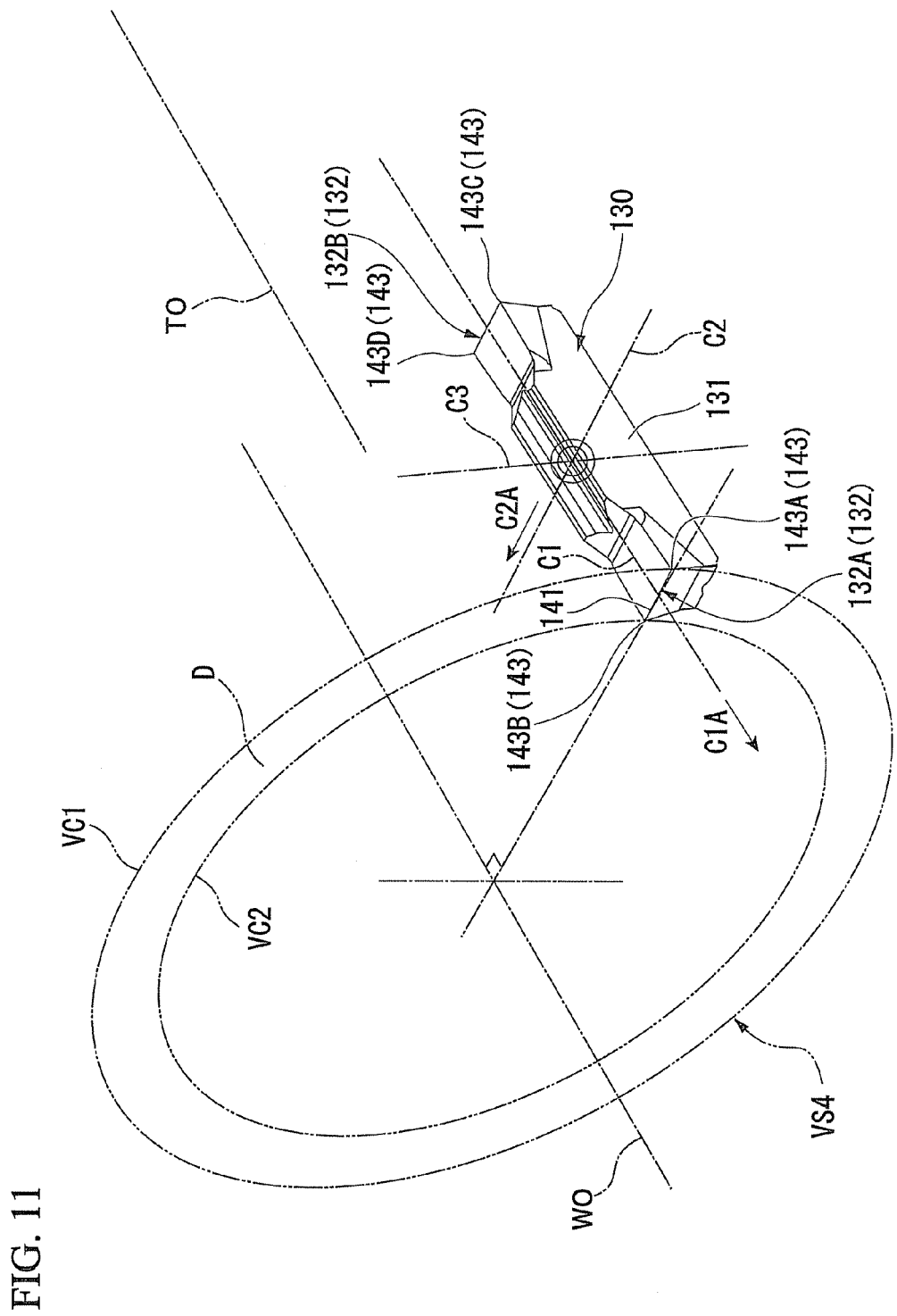
FIG. 11 is a view showing a mounting posture of the cutting insert 130, a virtual circle VC1 around which a corner portion 143A is rotated around the rotation axis line WO, and a virtual circle VC2 around which a corner portion 143B is rotated around the rotation axis line WO.
Figure 12:
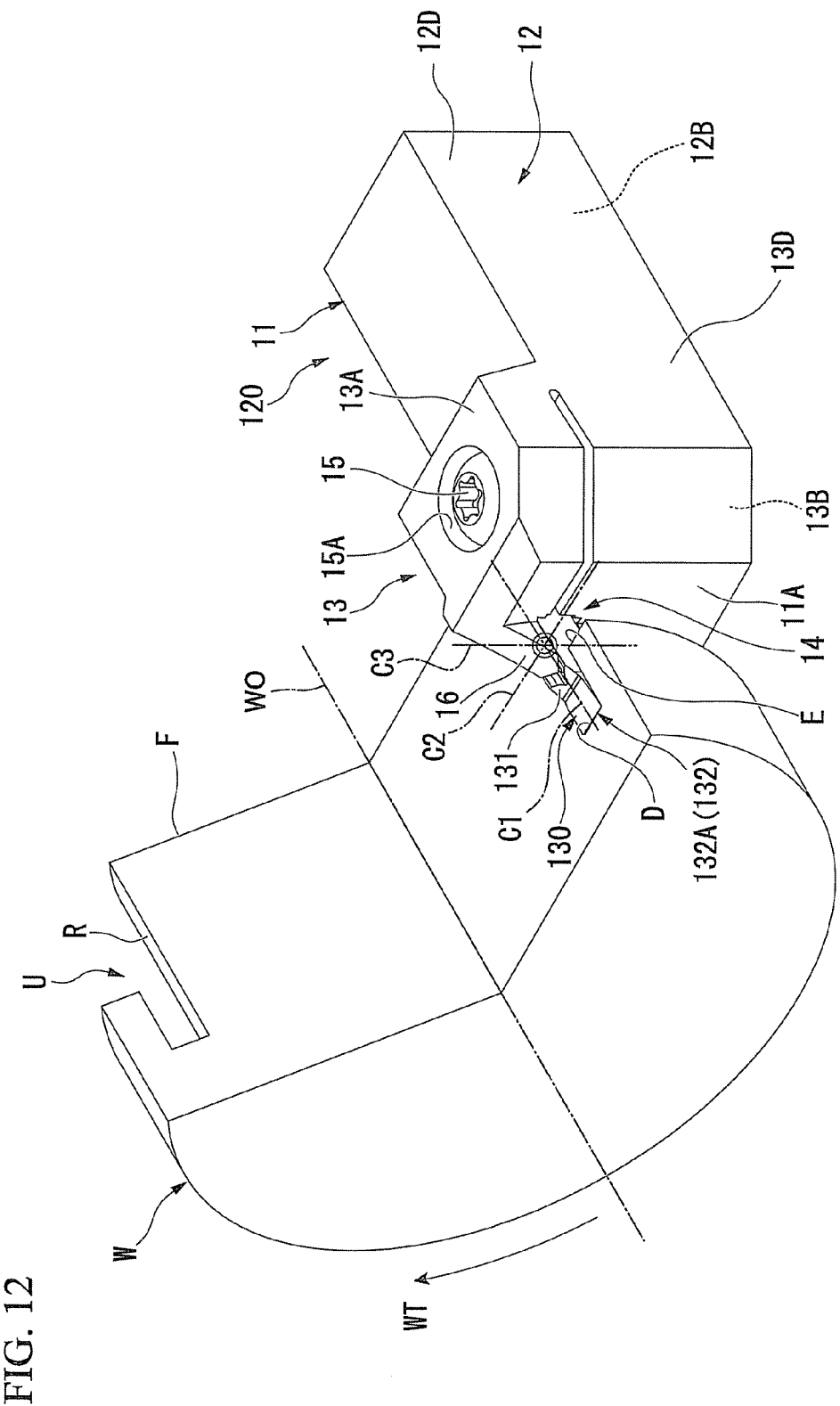
FIG. 12 is a schematic perspective view showing an insert-replaceable grooving tool of a second embodiment of the present invention and a workpiece to which a grooving is performed using the insert-replaceable grooving tool.

Moreover, by adjusting the above-described 91 to 84, as shown in FIGS. 8 and 11, the pair of corner portions 143A and 143B in the one cutting edge 132A can be disposed on the same workpiece virtual plane VS4 perpendicular to the rotation axis line WO. In the present embodiment, the angles $\theta 2$ and $\theta 3$ are adjusted and the angle $\theta 1$=90° is satisfied, and therefore, the pair of corner portions 143A and 143B are disposed on the workpiece virtual plane VS4. Specifically, as shown in FIG. 11, in the cutting edge 132A, a virtual circle VC1 which is obtained by rotating the corner portion 143A around the rotation axis line WO and a virtual circle VC2 which is obtained by rotating the corner portion 143B around the rotation axis line WO are contained within the workpiece virtual plane VS4. In addition, the outer circumference (trajectory) of the virtual circle VC1 coincides with the outer circumferential edge portion in the groove bottom D of the groove which is formed in the workpiece W and the outer circumference of the virtual circle VC2 coincides with the inner circumferential edge portion of the groove bottom D. Moreover, the front cutting edge 141 of the cutting edge 132A is disposed on the workpiece virtual plane VS4 at any portion which is positioned between the corner portion 143A and the corner portion 143B.

In the present embodiment, in a state where the corner portion 143A of the one cutting edge 132A is closely disposed so as to abut the inner circumferential surface S of the workpiece W, the cutting insert 130 of the tool body 11 having the above-described configuration moves in the grooving direction XA toward the direction of the rotation axis line WO of the workpiece W along the inner circumferential surface S. Moreover, the cutting edge 132A performs the grooving with respect to the inner face B facing the base end side of the tool body 11.

As describe above, according to the insert-replaceable grooving tool 110 of the present embodiment and the end face grooving method using this, the front cutting edge 141 in the one cutting edge 132A of the cutting insert 130 protruding toward the inner face B of the workpiece W from the tip 13 of the tool body 11 is parallel to the axis line C2 of the traverse direction and is gradually inclined toward the front of the rotational direction WT around which the workpiece W rotates moving toward the first traverse direction C2A. Therefore, discharge performance of chips which are cut by the one cutting edge 132A can be enhanced.

That is, the front cutting edge 141 of the cutting edge 132A is inclined as described above, and therefore, the chips cut by the cutting edge 132A are discharged toward the other side surface 13D side of the tool body 11 (the direction which is opposite to the inner circumferential surface S and is toward the rotation axis line WO). Thereby, the discharge performance of the chips is improved, contacting of the chips on the inner circumferential surface S of the workpiece W positioned on the one side surface 13C of the tool body 11 is prevented, occurrence of a chip accumulation in the vicinity of the inner circumferential surface S is prevented, and therefore, machining accuracy is improved.

In addition, the axis line C1 of the longitudinal direction of the cutting insert 130 is inclined so as to gradually approach the virtual plane of the tool VS3 moving toward the first longitudinal direction C1A and extends toward the lower surface side (lower surface 13B side of tool body 11) of the insert body 131. That is, since the other cutting edge 132B is separated toward the upper surface side of the insert body 131 (upper surface 13A side of tool body 11) with respect to the virtual plane of the tool VS3, a wedge angle β of the one cutting edge 132A (angle between the rake face 133 and the front flank 151 in FIG. 4) can be formed to be relatively large. Thereby, cutting edge strength of the one cutting edge 132A performing the grooving to the workpiece W is sufficiently secured.

In addition, according to the mounting posture of the cutting insert 130, the thickness of the lower jaw portion 17 supporting the cutting insert 130 in the tip 13 of the tool body 11 can be sufficiently secured, and mechanical strength of the tip 13 can be enhanced. Moreover, the front flank 151 which is continuous with the front cutting edge 141 is separated from the groove bottom D while the cutting edge strength of the front cutting edge 141 of the cutting edge 132A is sufficiently secured, and the front flank contacting the groove bottom D is prevented.

In addition, the one corner portion 143C, which is positioned on the side opposite to the first traverse direction C2A in the other cutting edge 132B, is positioned in the first traverse direction C2A with respect to the one corner portion 143A positioned on the opposite side in the one cutting edge 132A. Thereby, like the present embodiment, in the case where the grooving (end face grooving of inner diameter side) is performed to the inner face B of the machined hole H along the inner circumferential surface S of the machined hole H having a cylindrical hole shape which is formed with the rotation axis line WO of the workpiece W as the center, the following effects are presented.

That is, when the one corner portion 143A in the one cutting edge 132A of the cutting insert 130 is closely disposed so as to abut the inner circumferential surface S of the workpiece W, the cutting insert 130 moves in the grooving direction XA along the inner circumferential surface S, and the grooving is performed, the one corner portion 143C in the other cutting edge 132B is separated from the inner circumferential surface S, and therefore, the corner portion 143C contacting the inner circumferential surface S and being damaged is reliably prevented. Moreover, the unused other cutting edge 132B being damaged due to the contacting is prevented.

In addition, the one corner portion 143C of the other cutting edge 132B is separated from the inner circumferential surface S of the workpiece W regardless of a depth d1 of the inner face B of the workpiece W shown in FIG. 3, and therefore, the corner portion 143C contacting the inner circumferential surface S and being damaged is reliably prevented.

Figure 28:
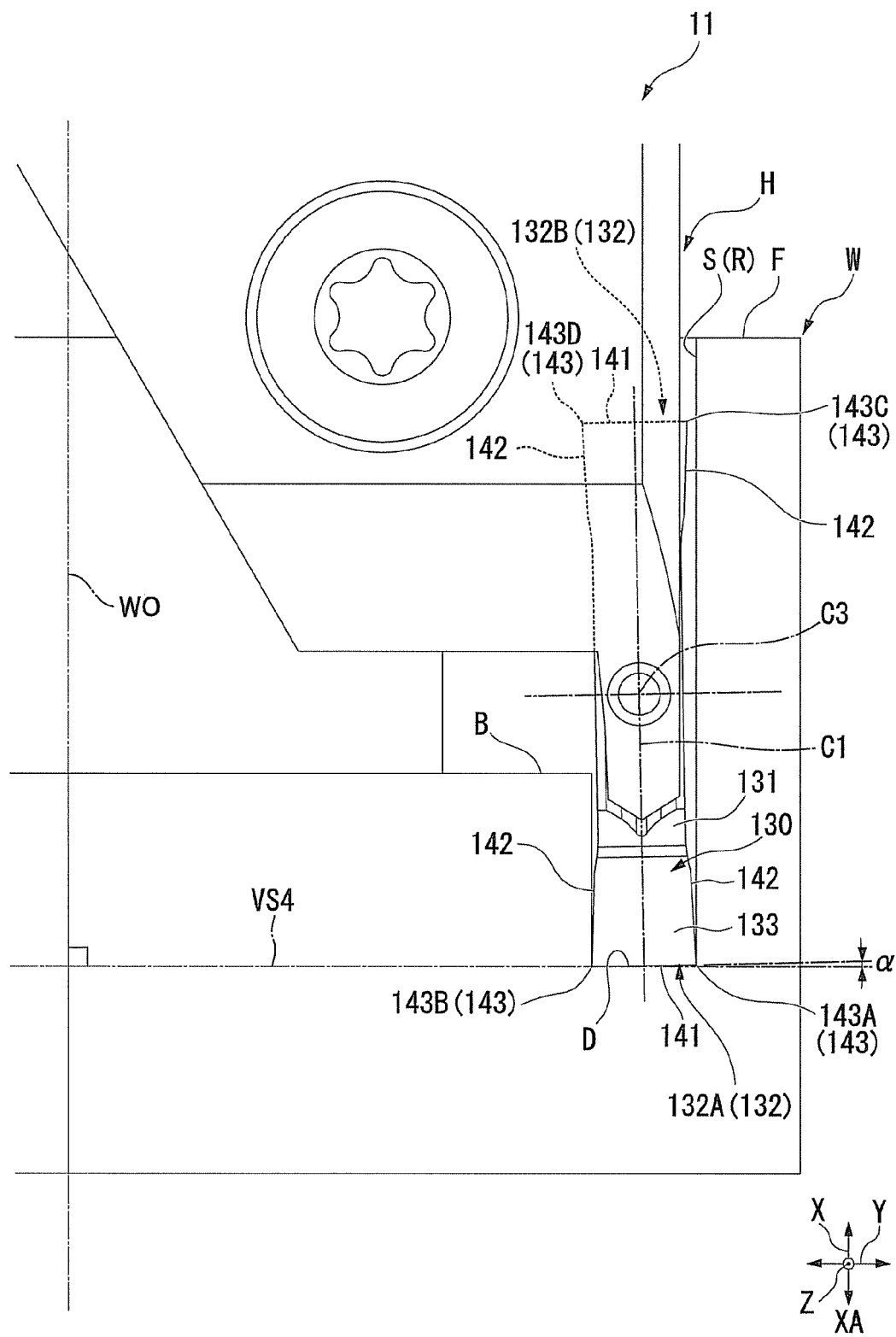
FIG. 28 is an enlarged view of the cutting insert 130 and a groove bottom D in FIG. 27.
Figure 29:
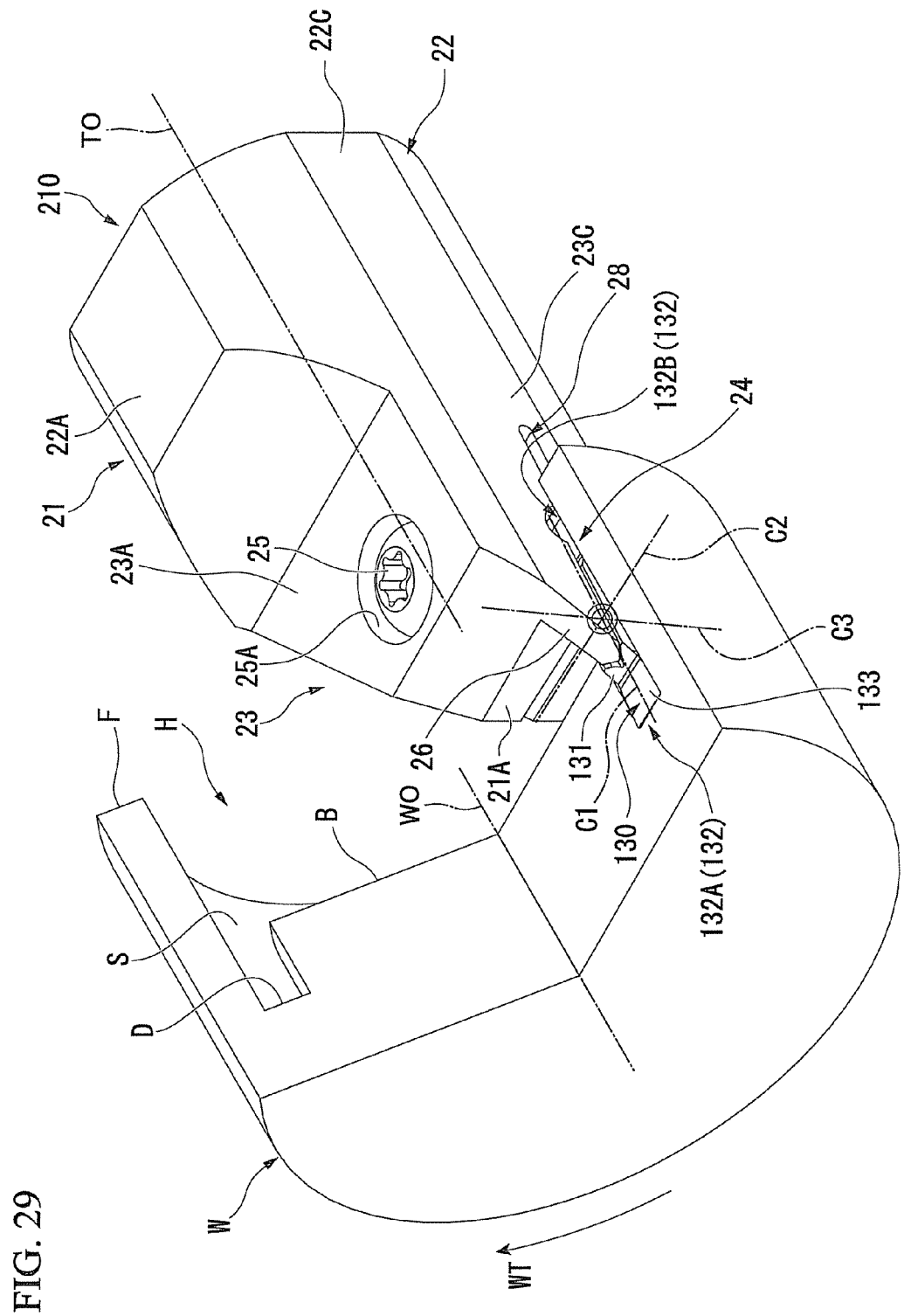
FIG. 29 is a schematic perspective view showing an insert-replaceable grooving tool of a third embodiment of the present invention and a workpiece to which a grooving is performed using the insert-replaceable grooving tool.
Figure 30:
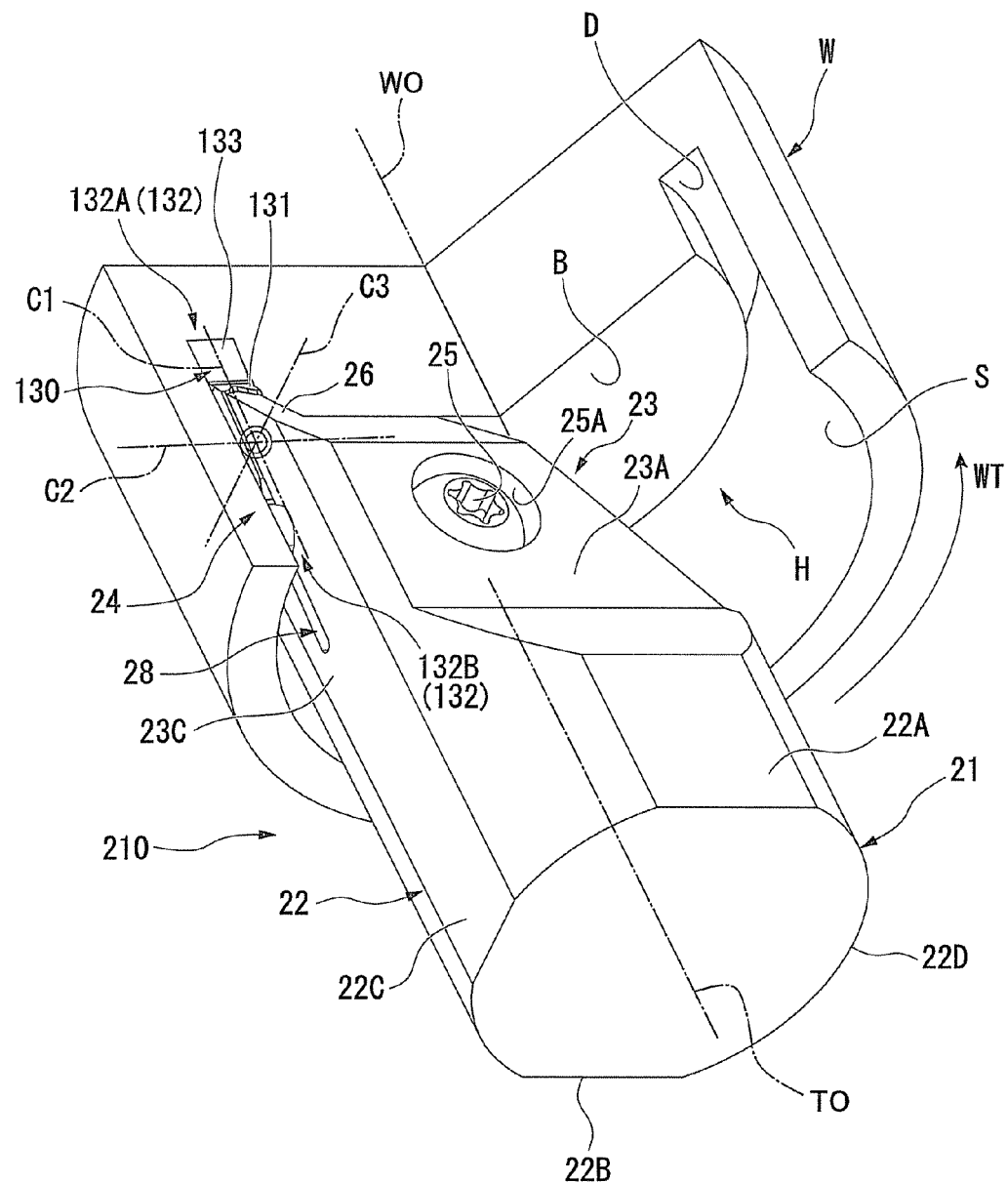
FIG. 30 is a schematic perspective view showing the insert-replaceable grooving tool of the third embodiment of the present invention and the workpiece to which the grooving is performed using the insert-replaceable grooving tool.

Moreover, if attention is focused on the groove bottom D of the workpiece W which is cut by the one cutting edge 132A, the axis line C2 of the traverse direction of the cutting insert 130 is gradually inclined toward the front of the rotational direction WT around which the workpiece W rotates moving toward the first traverse direction C2A, the axis line C1 of the longitudinal direction is inclined toward the lower surface side of the insert body 131 so as to approach with respect to the virtual plane of the tool VS3 moving toward the first longitudinal direction C1A, and the one corner portion 143C in the other cutting edge 132B is disposed further toward the first traverse direction C2A than the one corner portion 143A in the one cutting edge 132A. Therefore, the groove bottom D is formed so as to include an inclination close to perpendicularity with respect to the rotation axis line WO of the workpiece W. That is, an angle α of the groove bottom D in FIG. 28 is significantly decreased, and the machining accuracy of the groove which is cut in the workpiece W can be enhanced.

Moreover, the pair of side surface cutting edges 142 and 142 which is included for each of the cutting edges 132A and 132B is formed to be inclined to gradually narrow the mutual gap moving from the outer end edge in the longitudinal direction of the insert body 131 toward the center, and therefore, machining accuracy of the groove wall in the machined groove is secured. That is, even though the mounting posture with respect to the tool body 11 of the cutting insert 130 is set as described above, the side surface cutting edge 142 which is disposed on the side opposite to the inner circumferential surface S of the workpiece W in the one cutting edge 132A (that is, the first traverse direction C2A) does not contact the opening end edge of the groove wall of the opposite side of the groove formed in the workpiece W.

In addition, when the cutting insert 130 is viewed from the direction perpendicular to the virtual plane of the tool VS3, the angle θ1 between the axis line C2 of the traverse direction along the traverse direction of the insert body 131 and the rotation axis line WO of the workpiece W is 90° or more and 90.5° or less. According to this, in FIG. 8, an angle θ4, in which the axis line C1 of the longitudinal direction along the longitudinal direction of the insert body 131 is inclined with respect to the rotation axis line WO of the workpiece W, becomes a value which is approximated to and slightly greater than a value (that is, θ1−90) of 90° subtracted from the angle θ1. In the present embodiment, the inner circumferential surface S of the workpiece W is formed so as to be parallel to the rotation axis line WO, the cutting insert 130 is mounted on the tool body 11 so that the axis line C1 of the longitudinal direction is slightly inclined and is approximately parallel with respect to the inner circumferential surface S of the workpiece W. Thereby, as described above, the one corner portion 143C of the other cutting edge 132B is reliably separated from the inner circumferential surface S. Therefore, the machining accuracy of the groove bottom D in the groove formed on the inner face B of the workpiece W can be secured while the machining accuracy of the inner circumferential surface S is secured. Specifically, since the angle θ1 is set within the above-described range, the groove bottom D of the workpiece W which is subjected to the grooving is formed so as to approximately perpendicular to the rotation axis line WO, and therefore, the machining accuracy of the groove bottom D is enhanced.

In addition, like the present embodiment, in the case where the pair of corner portions 143A and 143B in the one cutting edge 132A is disposed on the same workpiece virtual plane VS4 perpendicular to the rotation axis line WO of the workpiece W, the groove bottom D of the workpiece W cut by the one cutting edge 132A can be formed to be reliably perpendicular with respect to the rotation axis line WO. Therefore, finished accuracy of the groove of the workpiece W is sufficiently secured.

In this way, in the end face grooving of the inner diameter side using the above-described insert-replaceable grooving tool 110, even though the inner circumferential surface S which is adjacent to the inner face B of the machined hole H being formed in the workpiece W and having a cylindrical hole shape and is parallel to the rotation axis line WO is formed, the end face grooving of the inner diameter side having high accuracy can be performed regardless of the position of the inner face B to be subjected to the grooving.

Second Embodiment

Next, an insert-replaceable grooving tool 120 of a second embodiment of the present invention will be described with reference to FIGS. 12 to 20. Moreover, the same reference numerals are attached to the same members as the above-described embodiment, and the descriptions are omitted.

The insert-replaceable grooving tool 120 of the present embodiment performs an end face grooving of an outer diameter side with respect to the workpiece W having an approximately cylindrical shape. Specifically, the workpiece W is formed in a multistage cylindrical shape and includes a step portion U between a large diameter portion and a small diameter portion. An end face E having an annular surface which is adjacent to an outer circumferential surface R of the small diameter portion and is perpendicular to the rotation axis line WO is formed in the step portion U of the workpiece W.

The insert-replaceable grooving tool 120 is formed in a shaft shape, and includes the tool body 11 which has an approximately rectangular cross-section, and the above-described cutting insert 130 which is detachably mounted to the tip 13 of the tool body 11 and in which the cutting edge 132A protrudes from the tip end face 11A of the tool body 11 toward the grooving direction XA of the tip side. In the insert-replaceable grooving tool 120, the longitudinal direction (the X direction shown in the drawings) of the tool body 11 is disposed so as to be substantially parallel with respect to the rotation axis line WO of the workpiece W. In this state, the cutting edge 132A moves so as to be along the outer circumferential surface R in the small diameter portion of the step portion U toward the tip 13 of the tool body 11 in the step portion U of the workpiece W which is rotated in a rotational direction WT about the rotation axis line WO, and the end face E is cut.

Figure 13:
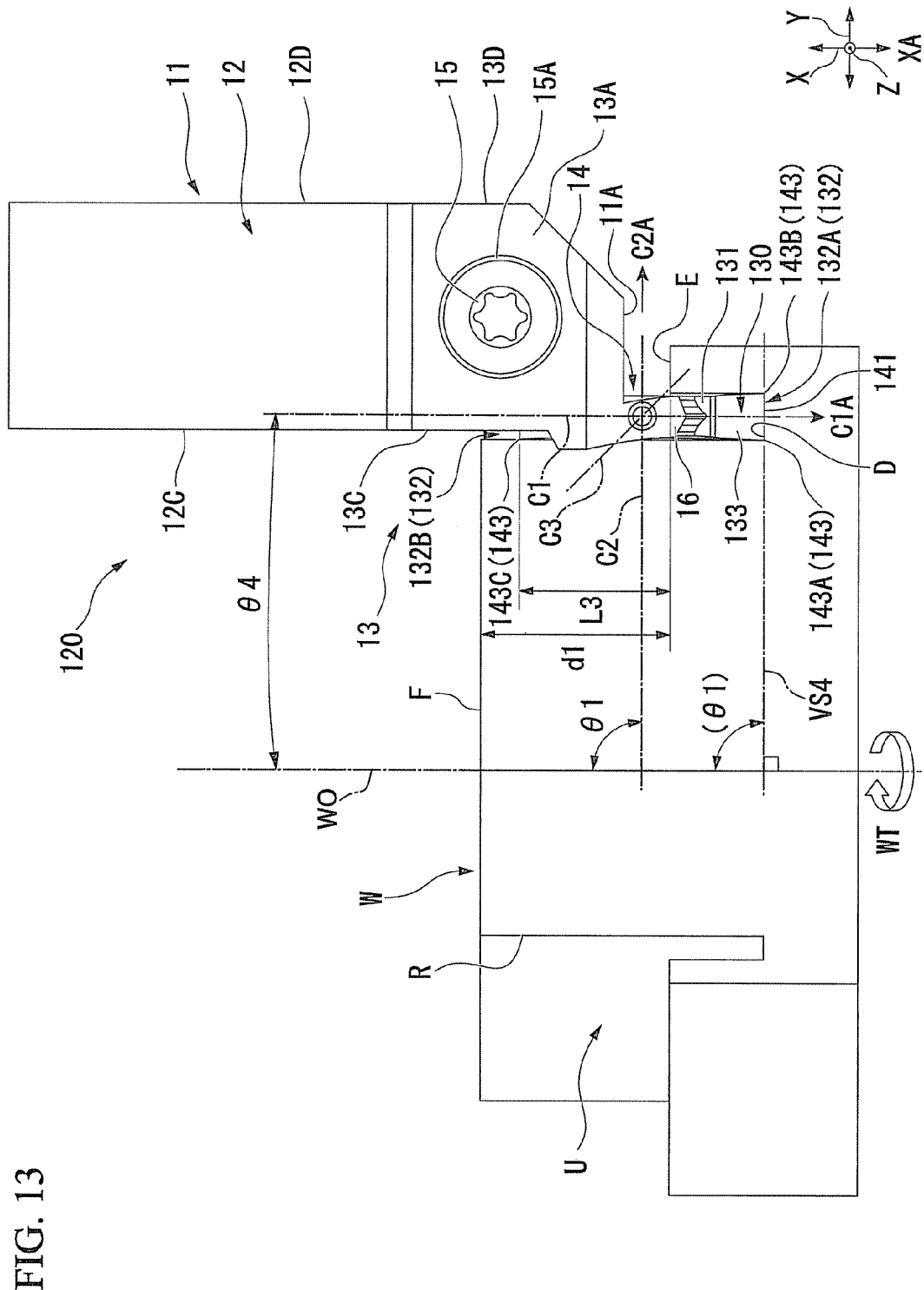
FIG. 13 is a plan view of the insert-replaceable grooving tool of the second embodiment of the present invention and the workpiece when viewed from a direction opposite to a rake face of a cutting insert, and a view when viewed from the upper surface of the cutting insert.

Similar to the insert-replaceable grooving tool 110, in the insert-replaceable grooving tool 120, the axis line C1 of the longitudinal direction of the cutting insert 130 extends so as to be along the longitudinal direction of the tool body 11. Moreover, on the other hand, as shown in FIG. 13, in the insert-replaceable grooving tool 120, the mutual disposition of the one side surface 13C (12C) and the other side surface 13D (12D) in both side surfaces facing the side (Y direction) of the tool body 11 is different from that of the above-described insert-replaceable grooving tool 110.

In the tool body 11 of the insert-replaceable grooving tool 120, the center portion and the base end other than the tip 13 are formed in an approximately rectangular parallelepiped shape and become a shank portion 12. The one side surface 12C and the other side surface 12D of the shank portion 12 are formed in a planar rectangle respectively. The rotation of the shank portion 12 is held in a state of being stopped, and therefore, the insert-replaceable grooving tool 120 is fixed and supported to a machine tool (not shown).

Figure 15:
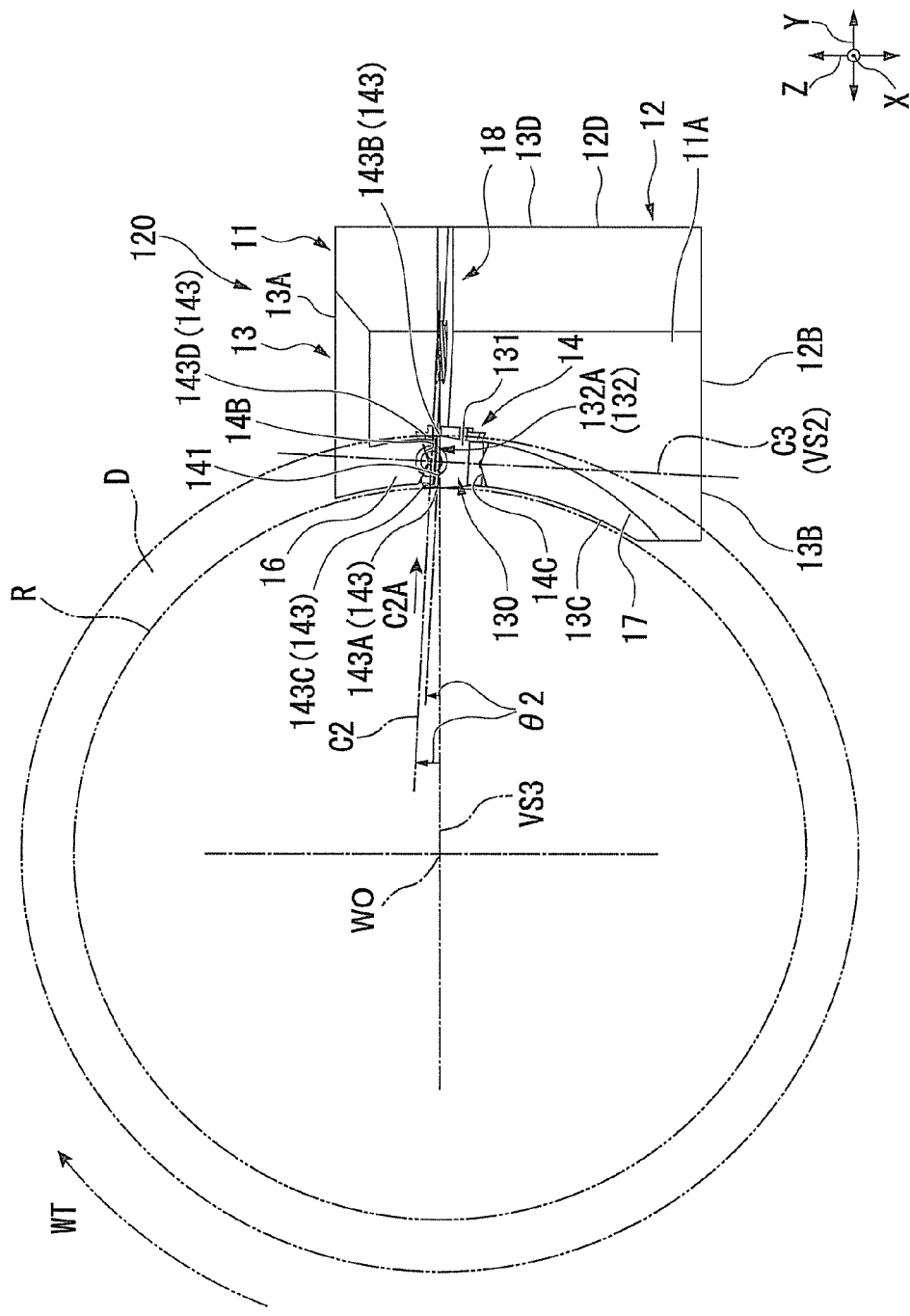
FIG. 15 is a front view of the insert-replaceable grooving tool of the second embodiment of the present invention when viewed from a tip of a tool body.

In addition, as shown in FIG. 15, the portion corresponding to the upper jaw portion 16 in the one side surface 13C of the tip 13 is formed to be curved in a curved concave shaped cross-section to be gradually toward the other side surface 13D side (right side of the Y direction in FIG. 15) moving from the upper surface 13A toward the lower surface 13B. In addition, the side surface facing the other side surface 13D side in the upper jaw portion 16 is formed to be curved in a curved concave shaped cross-section to be gradually toward the other side surface 13D side moving from the upper surface 13A toward the lower surface 13B. Moreover, the portion corresponding to the lower jaw portion 17 in the one side surface 13C of the tip 13 is formed to be curved in a curved concave shaped cross-section to be gradually toward the one side surface 13C side (left side of the Y direction in FIG. 15) moving from the upper surface 13A toward the lower surface 13B. In addition, the side surface facing the other side surface 13D side in the lower jaw portion 17 is formed to be curved in a curved concave shaped cross-section to be gradually toward the one side surface 13C side moving from the upper surface 13A toward the lower surface 13B. In the front view of the tool body 11 shown in FIG. 15, the entire of the upper jaw portion 16 and the lower jaw portion 17 is formed in an approximately arch shape.

Figure 16:
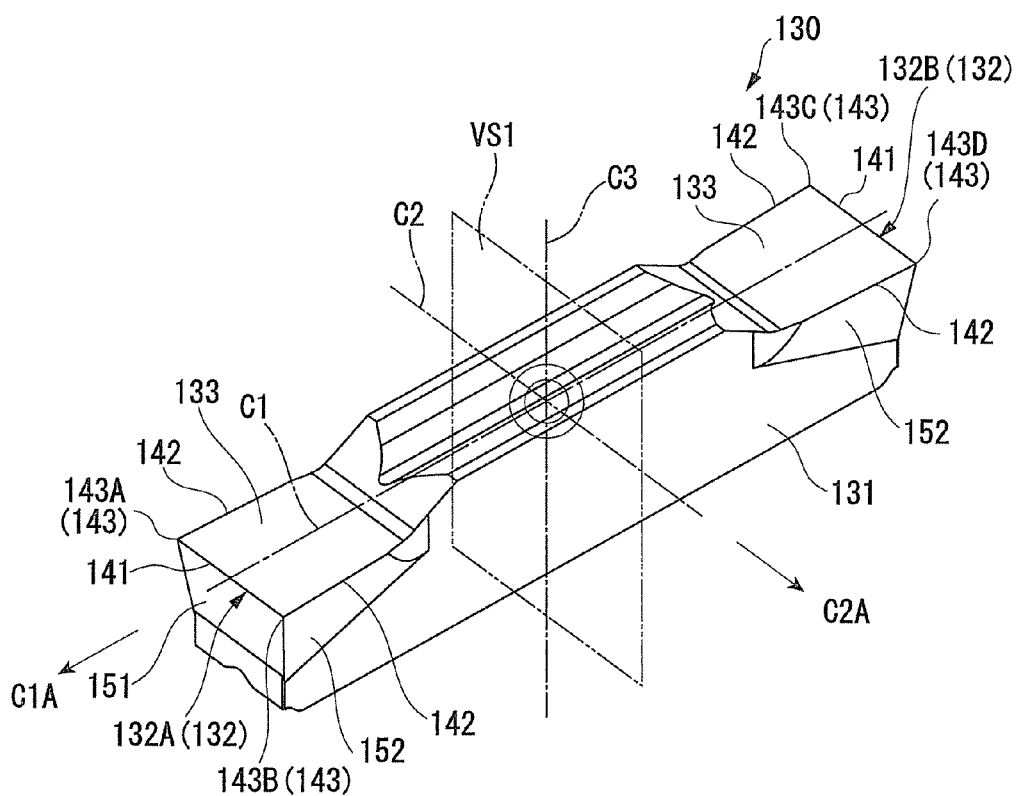
FIG. 16 is a perspective view showing the cutting insert.
Figure 17:
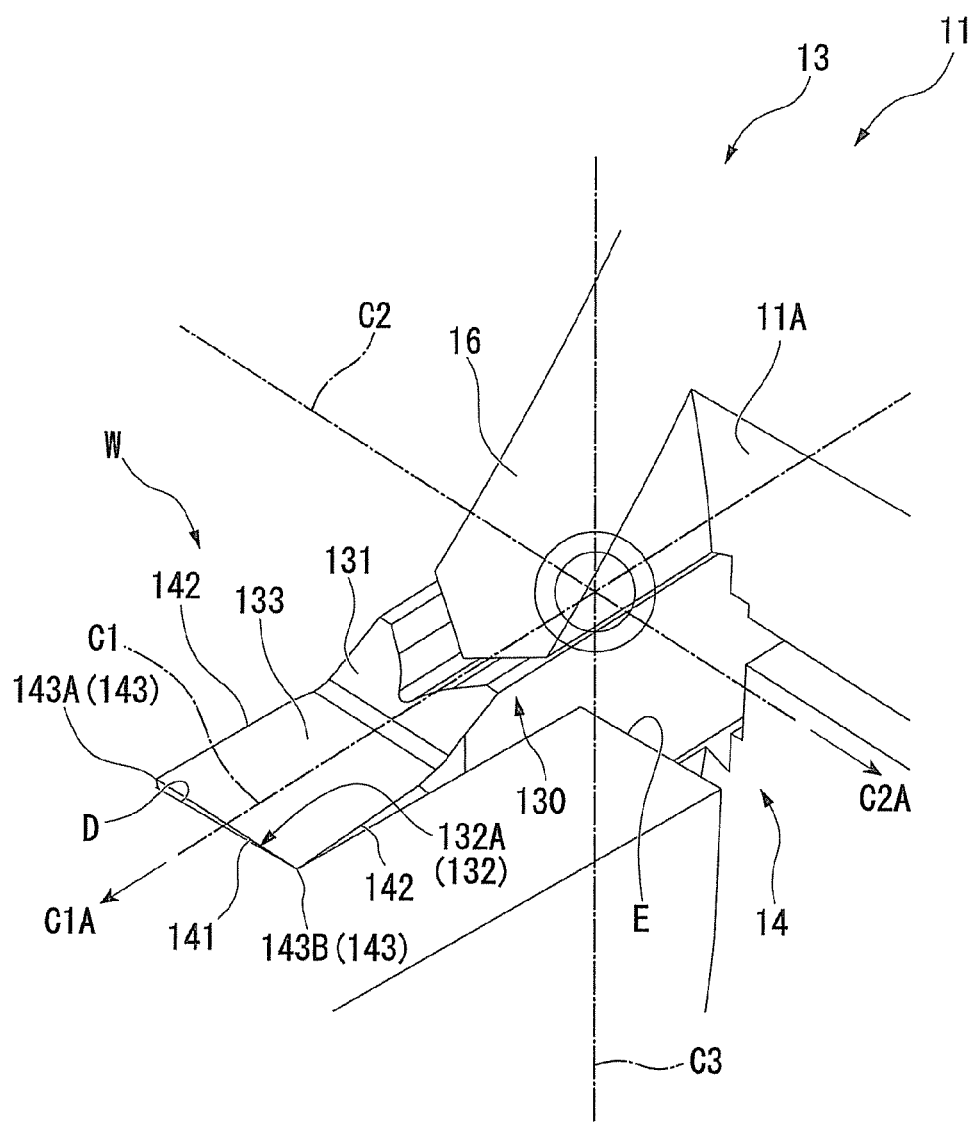
FIG. 17 is an enlarged view of the one cutting edge 132A of the cutting insert in FIG. 12.

Moreover, the cutting insert 130 is disposed so as to be along the one side surface 13C in the tip 13 of the tool body 11. In addition, as shown in FIGS. 13, 16 and, 18, the one corner portion 143A (143C) of the cutting insert 130 is positioned on the one side surfaces 12C and 13C side of the tool body 11 and is disposed so as to be opposite to the outer circumferential surface R of the small diameter portion of the workpiece W. In the insert-replaceable grooving tool 120, the first traverse direction C2A from the one corner portion 143A (143C) toward the other corner portion 143B (143D) is toward the opposite of the above-described insert-replaceable grooving tool 110.

Figure 19:
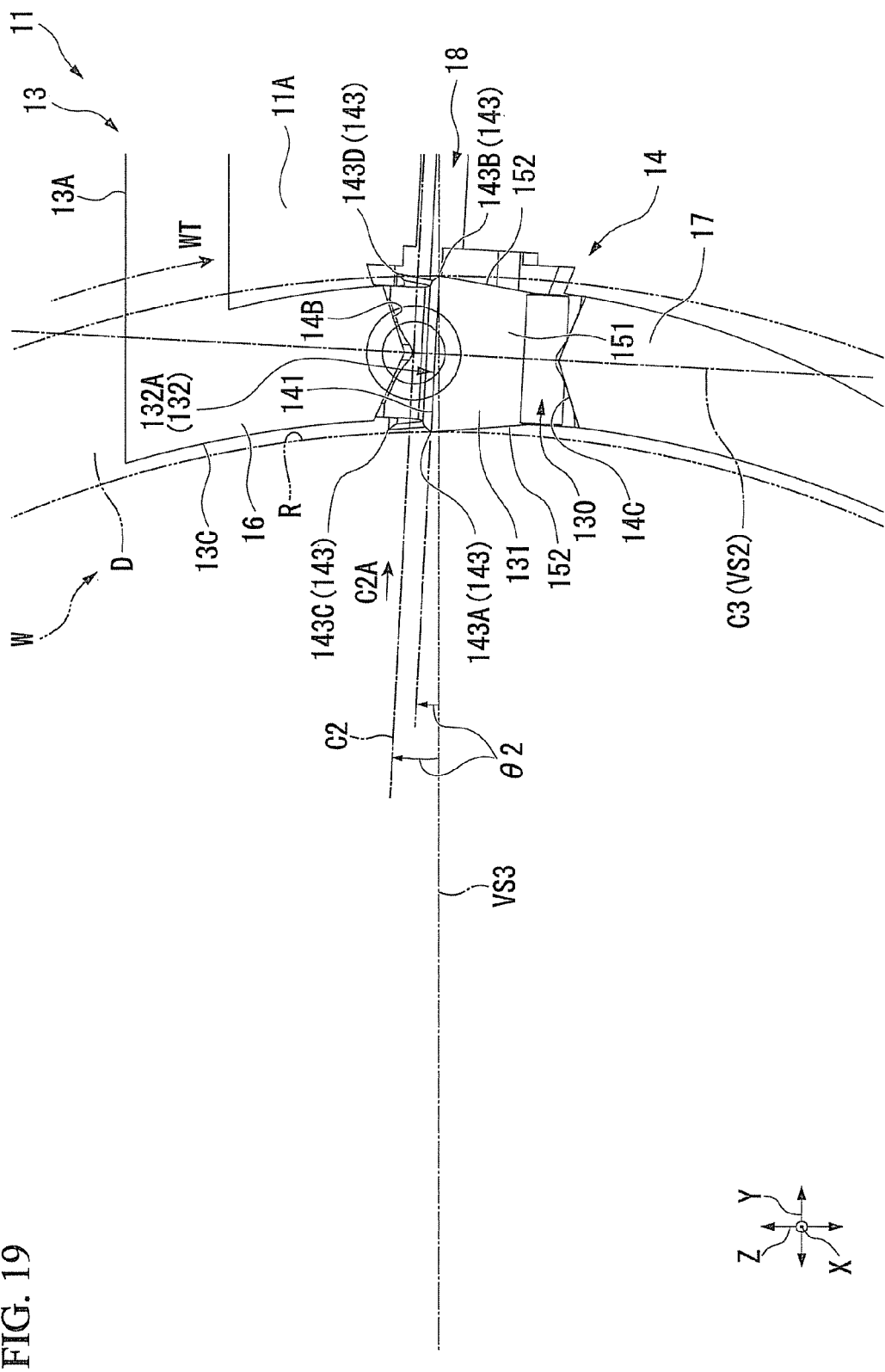
FIG. 19 is an enlarged view of the vicinity of the cutting insert 130 in FIG. 15.

Moreover, in a front view of the tool body 11 shown in FIG. 19, the front cutting edge 141 of the one cutting edge 132A is gradually inclined toward the front of the rotational direction WT of the workpiece W moving toward the first traverse direction C2A. Moreover, according to this, in the one cutting edge 132A, the corner portion 143B which is positioned on the first traverse direction C2A in the pair of corner portions 143A and 143B is disposed on the front of the rotational direction WT of the workpiece W with respect to the corner portion 143A.

In the present embodiment, the front cutting edge 141 of the cutting edge 132A is gradually inclined toward the front of the rotational direction WT of the workpiece W as being separated from the outer circumferential surface R of the small diameter portion toward the side opposite to the rotation axis line WO. In addition, the virtual plane of the tool VS3 includes the corner portion 143B of the cutting edge 132A and the rotation axis line WO. In FIGS. 15 and 19, the angle θ2 between the front cutting edge 141 of the cutting edge 132A and the virtual plane of the tool VS3 is more than 0° to 7° or less. In addition, in the present embodiment, for example, θ2 is about 3°. Moreover, since the axis line C2 of the traverse direction is parallel with respect to the front cutting edge 141, θ2 can also be an angle between the axis line C2 of the traverse direction and the virtual plane of the tool VS3.

Figure 14:
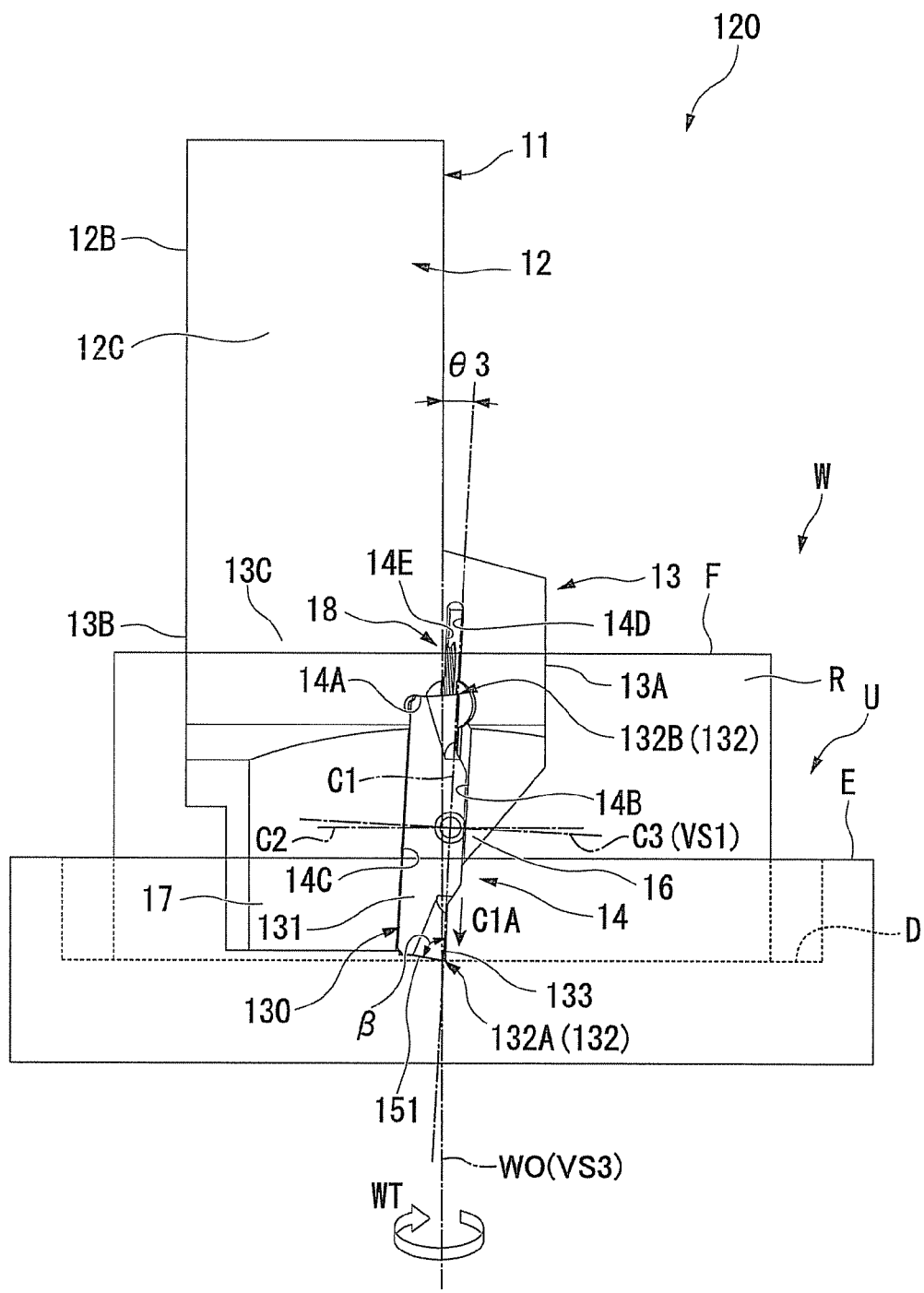
FIG. 14 is a schematic side view showing the insert-replaceable grooving tool of the second embodiment of the present invention and the workpiece.

In addition, as shown in FIG. 14, when viewed from the one side surface 13C side of the tool body 11, the axis line C1 of the longitudinal direction of the cutting insert 130 is inclined so as to gradually approach the virtual plane of the tool VS3 moving toward the first longitudinal direction C1A.

Specifically, in the side surface view of the tool body 11 shown in FIG. 14, the axis line C1 of the longitudinal direction extends so as to gradually approach the virtual plane of the tool VS3 from the upper surface of the insert body 131 toward the lower surface side (the left side of the Z direction in FIG. 14) moving toward the first longitudinal direction C1A. That is, the axis line C1 of the longitudinal direction gradually extends from the upper surface 13A of the tool body 11 toward the lower surface 13B side moving toward the first longitudinal direction C1A. Moreover, according to this, the front cutting edge 141 of the cutting edge 132B is separated toward the upper surface side of the insert body 131 (upper surface 13A side of tool body 11) with respect to the virtual plane of the tool VS3. Moreover, in the FIG. 14, the angle θ3 between the axis line C1 of the longitudinal direction and the virtual plane of the tool VS3 is more than 0° and less than 10°. In the present embodiment, for example, θ3 is about 3°.

Moreover, FIG. 13 is a top view of the cutting insert 130 when viewed from a direction perpendicular to the virtual plane of the tool VS3, in the top view, the angle θ1 between the axis line C2 of the traverse direction and the rotation axis line WO is 90° or more and 90.5° or less. The cutting insert 130 is mounted on the insert mounting seat 14 so that the angle θ1 is in the above-described range. In the present embodiment, θ1 is about 90°. Thereby, in the top view, the angle between the extension line of the front cutting edge 141 of the cutting edge 132A parallel to the axis line C2 of the traverse direction and the rotation axis line WO also is θ1 (=90°). Moreover, in FIG. 13, the angle θ4 between the axis line C1 of the longitudinal direction and the rotation axis line WO is more than 0° and less than 1°. In the present embodiment, θ4 is about 0.2°. Specifically, the relationship between θ4 and θ1 is 1°>θ4>θ1−90°. In the present embodiment, since θ1 is 90°, in the top view of the tool body 11 shown in FIG. 13, the axis line C2 of the traverse direction which is projected to the virtual plane of the tool VS3 and the rotation axis line WO are perpendicular to each other. On the other hand, the axis line C2 of the traverse direction which is projected to the virtual plane of the tool VS3 and the axis line C1 of the longitudinal direction are not perpendicular to each other. That is, the axis line C1 of the longitudinal direction which is projected to the virtual plane of the tool VS3 and the rotation axis line WO are not parallel to each other.

Figure 18:
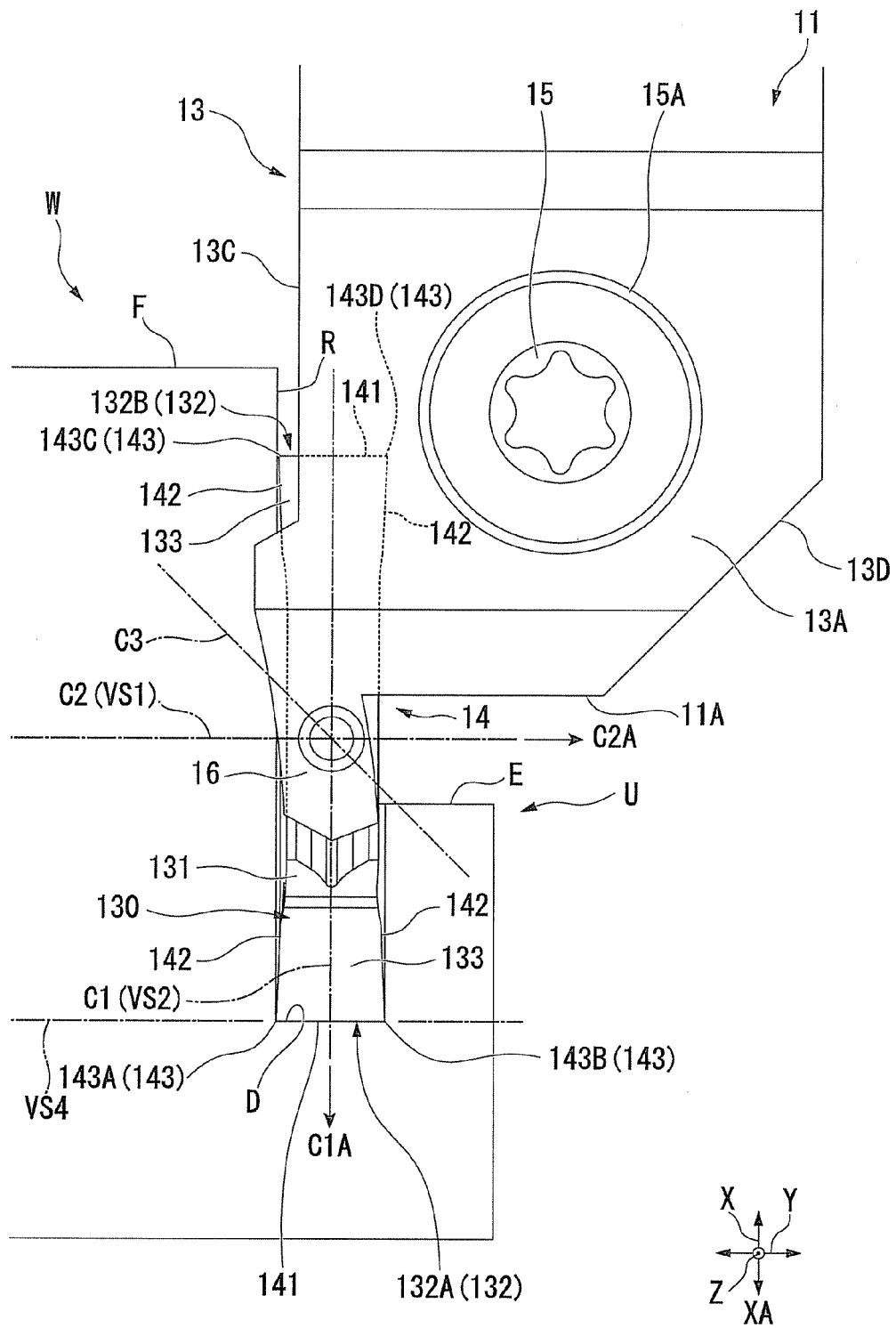
FIG. 18 is an enlarged view of the vicinity of the cutting insert 130 in FIG. 13.

Moreover, as shown in FIG. 18, when viewed from the direction perpendicular to the virtual plane of the tool VS3 (opposite to the rake face 133), in the cutting insert 130, the corner portion 143C which is positioned on the side opposite to the first traverse direction C2A in the other cutting edge 132B is disposed further toward the first traverse direction C2A than the corner portion 143A which is positioned on the opposite side in the one cutting edge 132A. That is, the corner portion 143A which is positioned on the one side surface 13C side of the tool body 11 (left side in FIG. 18) in the one cutting edge 132A is disposed further toward the one side surface 13C side (side opposite to the first traverse direction C2A) than the corner portion 143C which is positioned on the one side surface 13C side in the other cutting edge 132B. In the present embodiment, the corner portion 143C which is positioned on the outer circumferential surface R side in the cutting edge 132B is separated from the outer circumferential surface R with respect to the corner portion 143A which is positioned on the outer circumferential surface R side in the cutting edge 132A.

Figure 20:
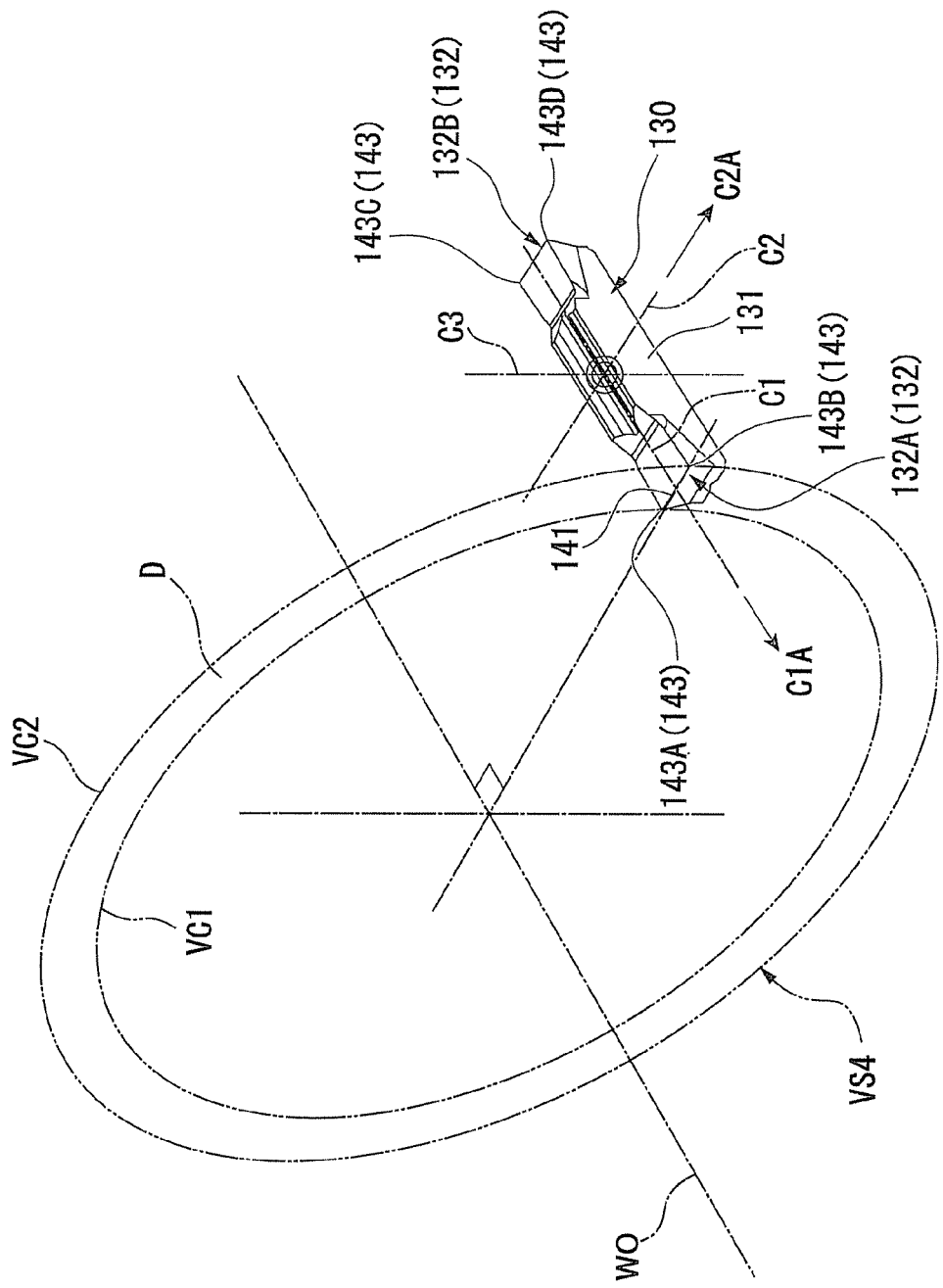
FIG. 20 is a view showing a mounting posture of the cutting insert 130, the virtual circle VC1 around which the corner portion 143A is rotated around the rotation axis line WO, and the virtual circle VC2 around which the corner portion 143B is rotated around the rotation axis line WO.

Moreover, by adjusting the above-described θ1 to θ4, as shown in FIGS. 18 and 20, the pair of corner portions 143A and 143B in the one cutting edge 132A can be disposed on the same workpiece virtual plane VS4 perpendicular to the rotation axis line WO. In the present embodiment, the angles θ2 and θ3 are adjusted and the angle θ1=90° is satisfied, and therefore, the pair of corner portions 143A and 143B is disposed on the workpiece virtual plane VS4. Specifically, as shown in FIG. 20, in the cutting edge 132A, the virtual circle VC1 which is obtained by rotating the corner portion 143A around the rotation axis line WO and the virtual circle VC2 which is obtained by rotating the corner portion 143B around the rotation axis line WO are contained within the workpiece virtual plane VS4. In addition, the outer circumference of the virtual circle VC1 coincides with the inner circumferential edge portion in the groove bottom D of the groove which is formed in the workpiece W and the outer circumference of the virtual circle VC2 coincides with the outer circumferential edge portion of the groove bottom D.

In the present embodiment, in the state where the corner portion 143A of the one cutting edge 132A is closely disposed so as to abut the outer circumferential surface R of the small diameter portion of the workpiece W, the cutting insert 130 of the tool body 11 having the above-described configuration moves in the grooving direction XA toward the rotation axis line WO direction of the workpiece W along the outer circumferential surface R. Moreover, the cutting edge 132A performs the grooving with respect to the end face E facing the base end side of the tool body 11.

According to the insert-replaceable grooving tool 120 of the present embodiment, in the step portion U of the workpiece W having a multistage cylindrical shape, in the case where the grooving (the end face grooving of the outer diameter side) is performed to the end face E of the workpiece W along the small diameter portion having the outer circumferential surface R parallel to the rotation axis line WO, effects similar to those of the above-described embodiment are presented.

Specifically, the front cutting edge 141 in the one cutting edge 132A is parallel to the axis line C2 of the traverse direction and is gradually inclined toward the front of the rotational direction WT around which the workpiece W rotates moving toward the first traverse direction C2A. Therefore, a discharge performance of chips which are cut by the one cutting edge 132A can be enhanced. That is, the front cutting edge 141 of the cutting edge 132A is inclined as described above, and therefore, the chips cut by the cutting edge 132A are discharged toward the other side surface 13D side of the tool body 11 (the direction which is opposite to the outer circumferential surface R and is separated from the rotation axis line WO). Thereby, the discharge performance of the chips is improved, contacting of the chips on the outer circumferential surface R of the workpiece W positioned on the one side surface 13C of the tool body 11 is prevented, the occurrence of a chip accumulation in the vicinity of the outer circumferential surface R is prevented, and therefore, machining accuracy is improved.

In addition, regardless of the position of the end face E of the workpiece W which is subjected to the grooving by the cutting edge 132A of the cutting insert 130, the corner portion 143C of the cutting edge 132B is separated from the outer circumferential surface R, and, the corner portion 143C contacting the outer circumferential surface R and being damaged is reliably prevented. Therefore, the end face grooving of the outer diameter side having high accuracy can be performed.

In addition, the present invention is not limited to the above-described embodiments, and various modifications can be applied within the scope which does not depart from the gist of the present invention.

For example, in the above-described first and second embodiments, the insert mounting seat 14 is formed on the tip 13 of the tool body 11. However, the present invention is not limited to this. That is, a head portion which is detachably mounted on the tip 13 is mounted, and the insert mounting seat 14 may be formed on the head portion. In this case, the insert mounting seat 14 is formed so as to be opened to the one side surface of the head portion, and the cutting insert 130 is disposed so as to be along the one side surface. Moreover, the shape of the above-described tool body 11 is not limited to those which are described in the above-described embodiments.

Figure 21:
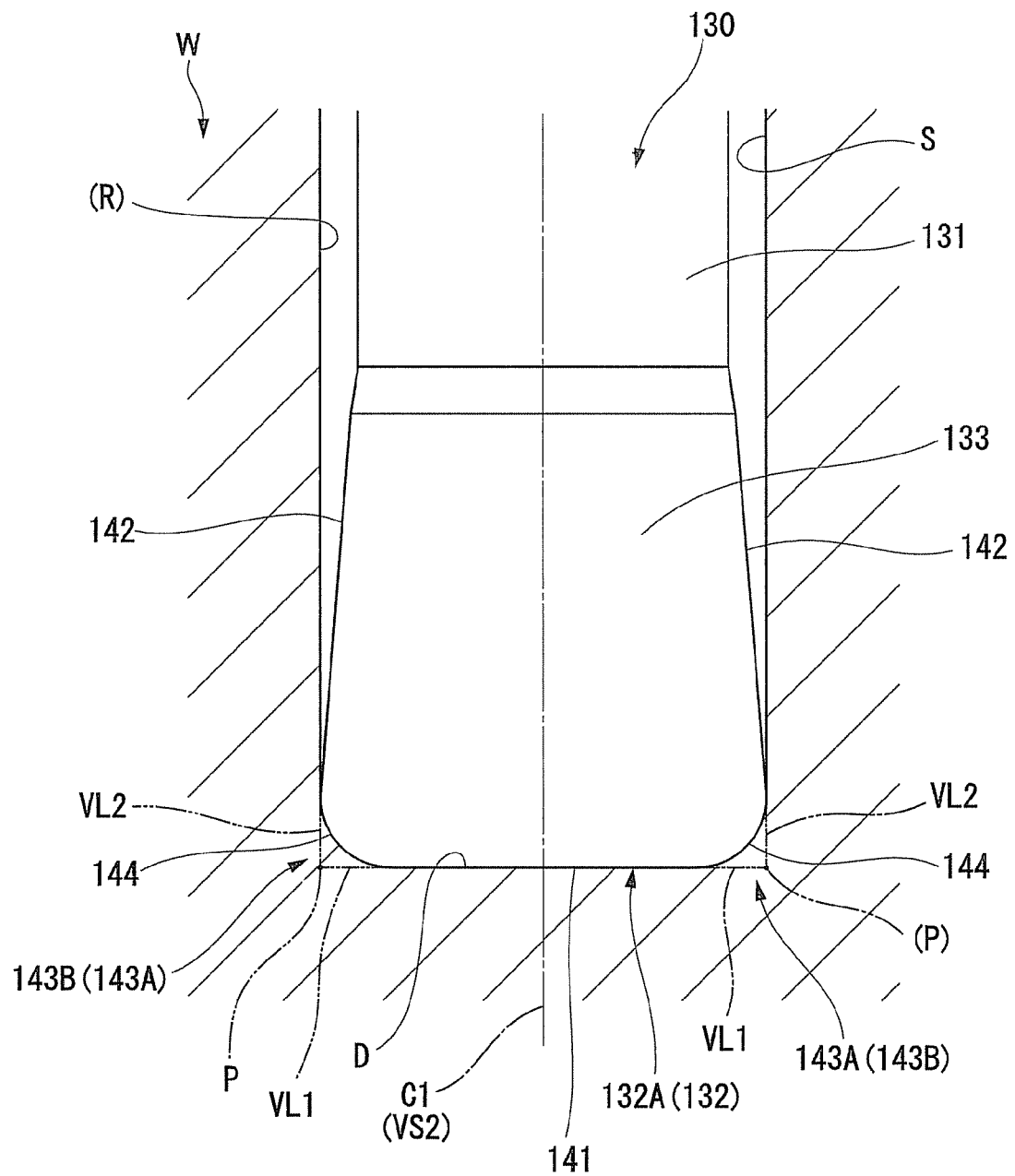
FIG. 21 is a view showing a modification of the corner portion in the cutting edge of the cutting insert.
Figure 22:
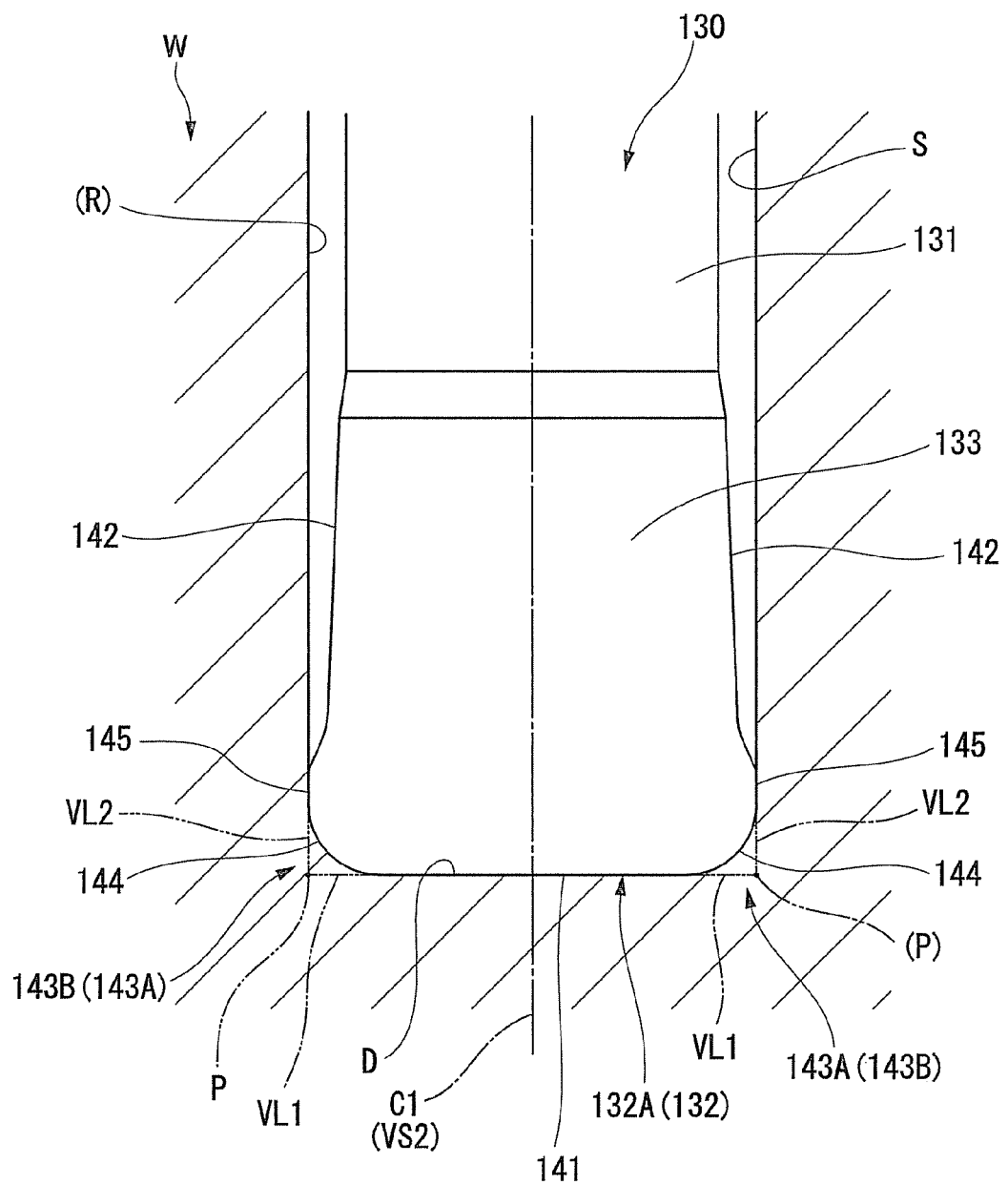
FIG. 22 is a view showing a modification of the corner portion in the cutting edge of the cutting insert.
Figure 23:
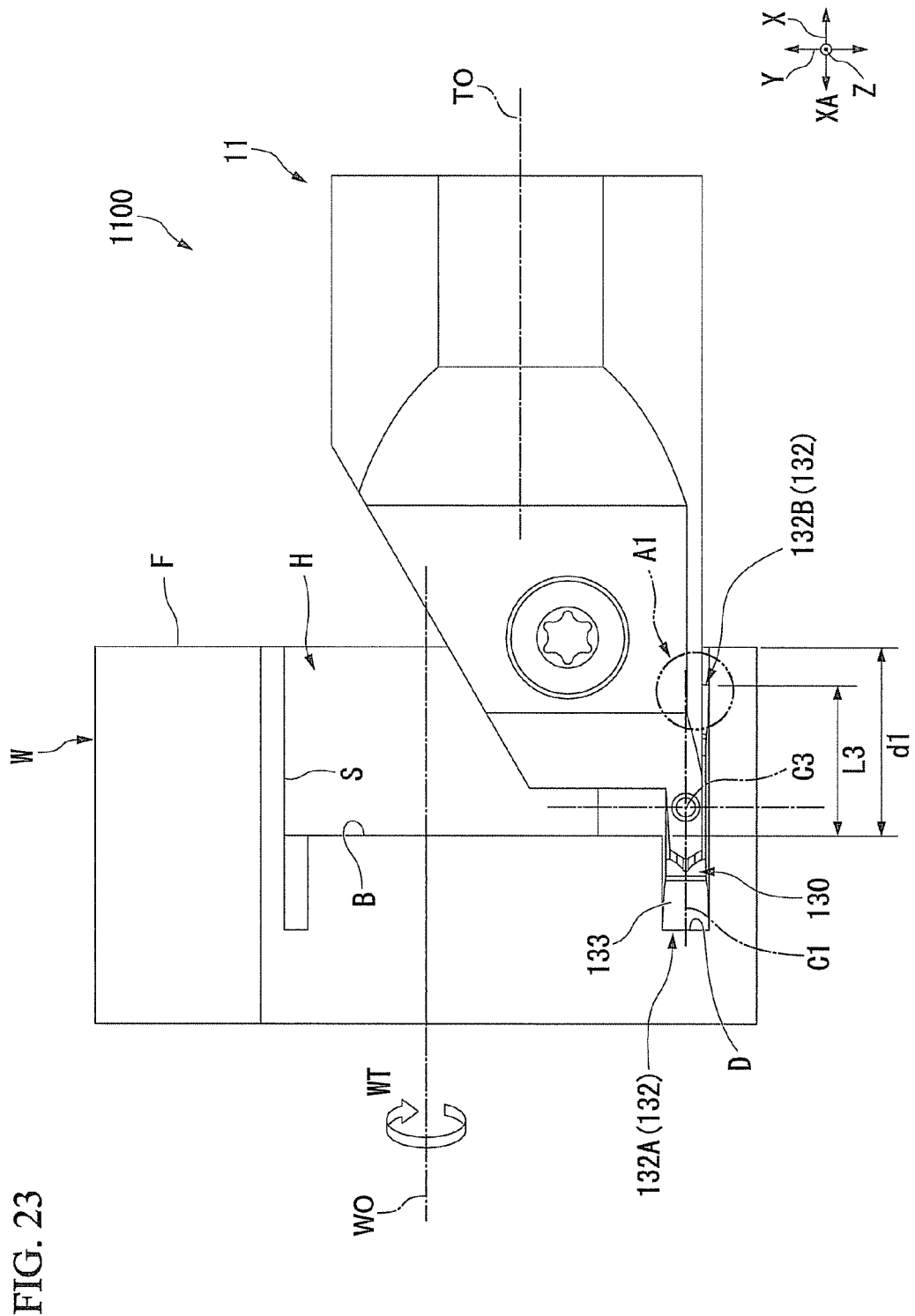
FIG. 23 is a plan view of an insert-replaceable grooving tool (end face grooving of inner diameter side) of the related art and a workpiece when viewed from a direction opposite to a rake face of a cutting insert, and a view when viewed from the upper surface of the cutting insert.
Figure 24:
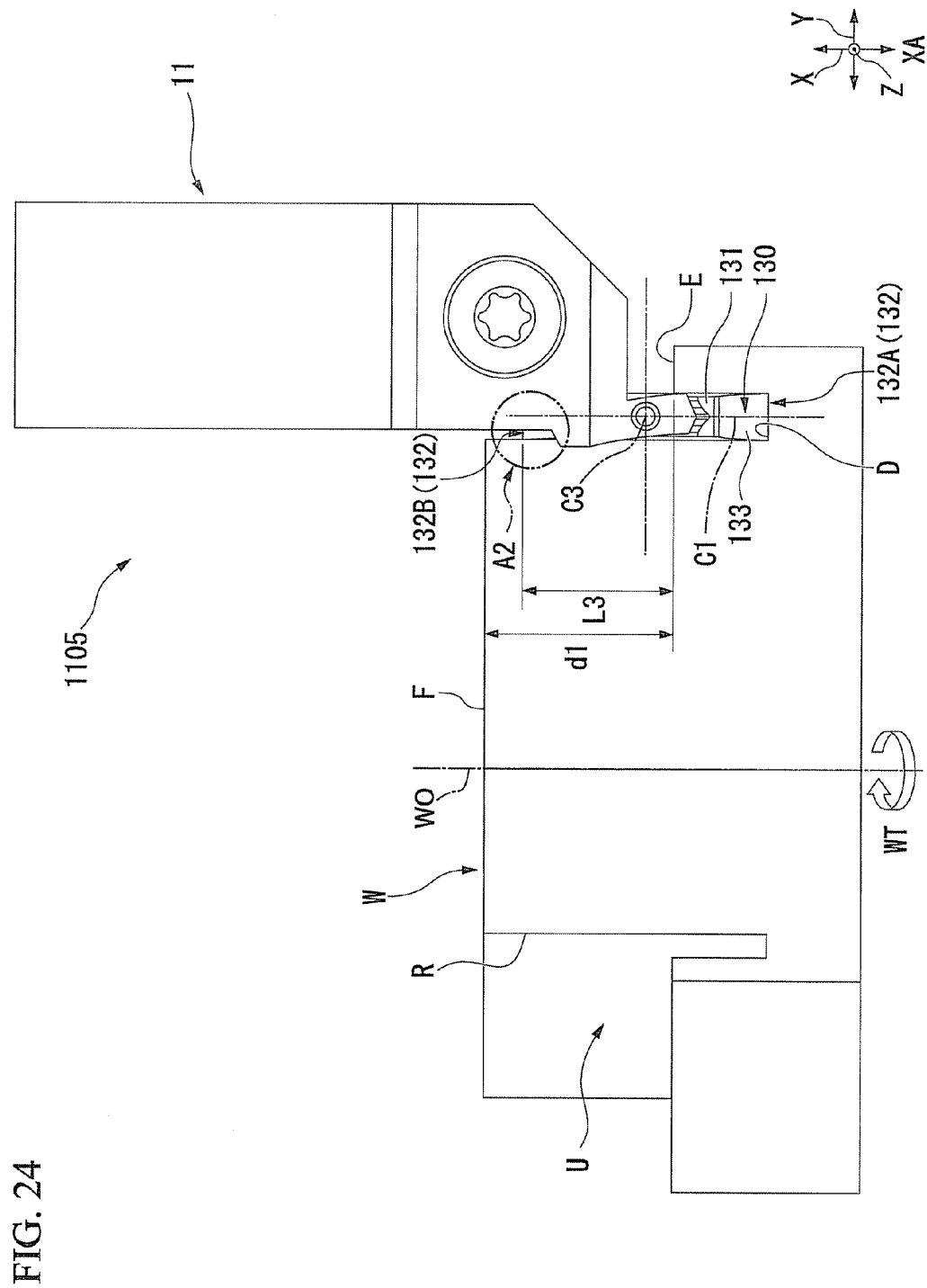
FIG. 24 is a plan view of the insert-replaceable grooving tool (end face grooving of outer diameter side) of the related art and the workpiece when viewed from the direction opposite to the rake face of the cutting insert, and a view when viewed from the upper surface of the cutting insert.
Figure 25:
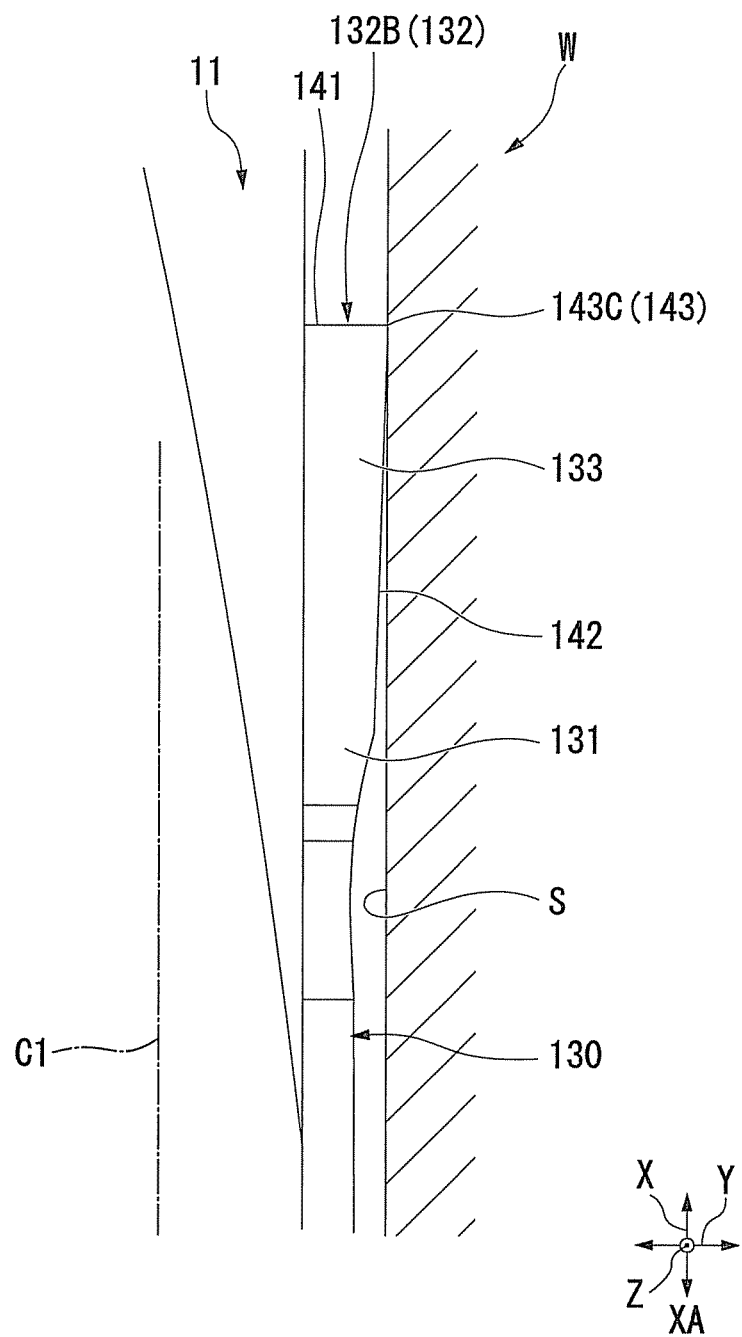
FIG. 25 is an enlarged view of a portion A1 in FIG. 23.
Figure 26:
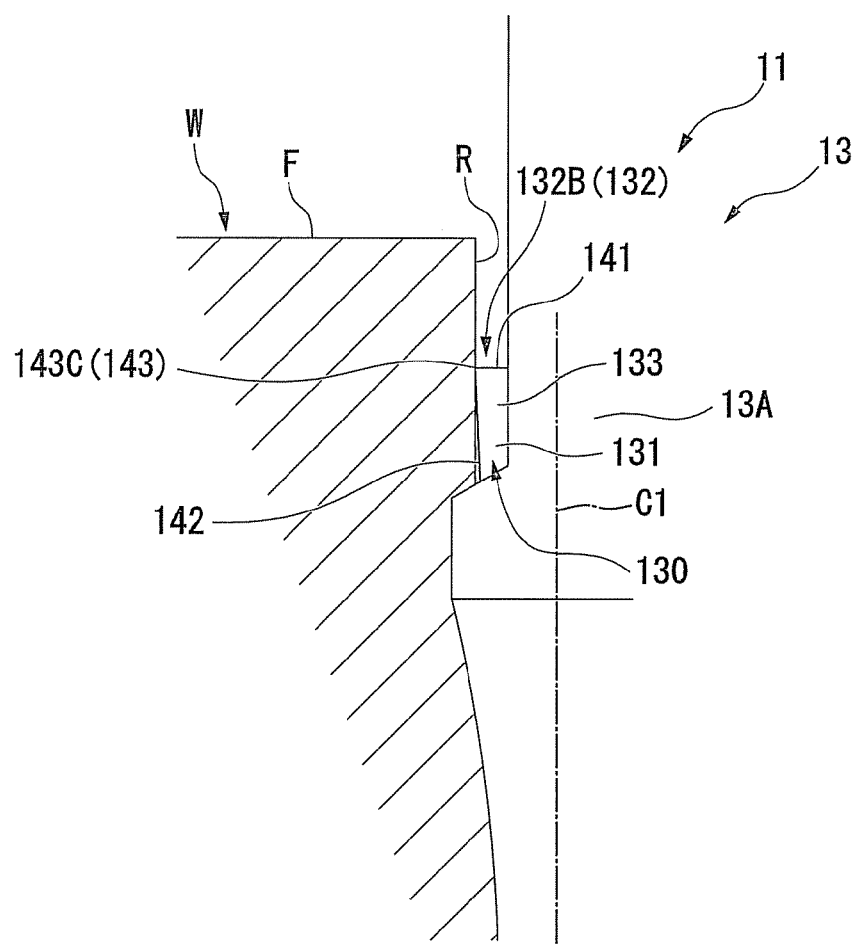
FIG. 26 is an enlarged view of a portion A2 in FIG. 24.
Figure 27:
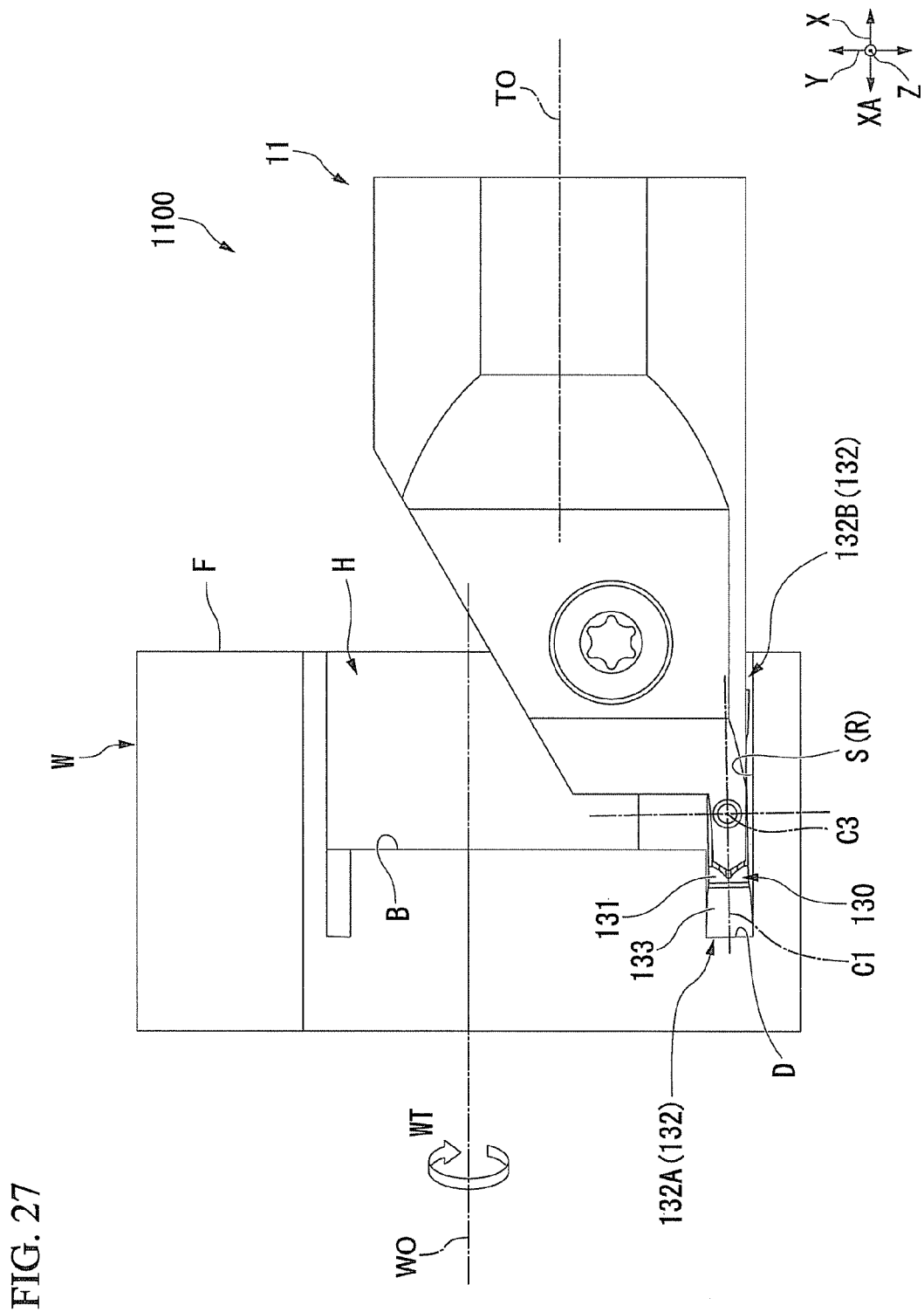
FIG. 27 is a plan view of the insert-replaceable grooving tool of the related art and the workpiece when viewed from a direction opposite to a rake face of a cutting insert, and a view when viewed from the upper surface of the cutting insert.

Moreover, the pair of corner portions 143 of the cutting edge 132 is not limited to the shapes explained in the above-described first and second embodiments. FIGS. 21 and 22 show a modification of the corner portion 143. In FIG. 21, the corner portion 143 has a convex curved line shape and includes a first corner edge 144 which smoothly connects the front cutting edge 141 and the side surface cutting edge 142. In addition, in the corner portion 143B of the one cutting edge 132A, an intersection point P of an extension line VL1 of the front cutting edge 141 which is adjacent to the corner portion 143B and a vertical line VL2 which extends from the outer edge portion of the traverse direction of the insert body 131 in the first corner edge 144 toward the extension line VL1 is disposed on the virtual plane of the tool VS3. In this case, damage of the cutting edge or the like in each of the corner portions 143 is prevented.

Moreover, in FIG. 22, the corner portion 143 includes the first corner edge 144 and a second linear corner edge 145 which connects an end of the center side (the upper portion in FIG. 22) along the longitudinal direction of the insert body 131 in the first corner edge 144 and the side surface cutting edge 142. When the cutting insert 130 is viewed from the direction perpendicular to the virtual plane of the tool VS3, the second corner edge 145 extends so as to be parallel with respect to the rotation axis line WO of the workpiece W and is formed so as to extend to be parallel with respect to the inner circumferential surface S (outer circumferential surface R). In this case, the second corner edge 145 dredges the groove wall of the workpiece W which is cut by the front cutting edge 141 and the first corner edge 144 of the one cutting edge 132A, and the finished accuracy of the groove wall can be enhanced.

Moreover, in the above-described first and second embodiments, the cutting edge 132A of the cutting insert 130 performs the grooving with respect to the end faces B and E along the circumferential surfaces S and R of the workpiece W. However, the present invention is not limited to this. For example, the cutting edge 132A may perform the grooving with respect to the end faces B and E which are separated from the circumferential surfaces S and R of the workpiece W. According to the embodiments of the present invention, even in the case where the grooving is performed to any of the end face portions B and E which are adjacent to the circumferential surfaces S and R of the workpiece W and the end face portions B and E which are separated from the circumferential surfaces S and R of the workpiece W, a cutting processing having high accuracy can be performed.

Third Embodiment

FIG. 6, FIGS. 29 to 38 show an insert-replaceable grooving tool 210 of a third embodiment of the present invention and the cutting insert 130 which is used in the insert-replaceable grooving tool 210. The insert-replaceable grooving tool 210 of the present embodiment is formed in a shaft shape, and includes a tool body 21 which is perpendicular to the central axis line TO and has an approximately circular cross-section and the cutting insert 130 which is detachably mounted to an end (tip) 23 of a tip side along the central axis line TO of the tool body 21 and in which a cutting edge 132 protrudes from a tip end face 21A of the tool body 21 toward the tip side.

The insert-replaceable grooving tool 210 of the present embodiment performs an end face grooving of an inner diameter side with respect to the workpiece W having an approximately cylindrical shape. An inner circumferential surface (circumferential surface) S which is parallel to the rotation axis line WO toward the rotation axis line WO of the workpiece W is formed on the machined hole H having a cylindrical hole shape in the workpiece W. The inner circumferential surface S is positioned at the most inner portion of the machined hole H and is adjacent to the inner face (end face) B which is perpendicular to the rotation axis line WO and has a circular plane. In the insert-replaceable grooving tool 210, the central axis line TO of the tool body 21 is disposed so as to be substantially parallel to the rotation axis line WO of the workpiece W. In this state, in the workpiece W which is rotated in a rotational direction WT about the rotation axis line WO, the tip 23 of the tool body 21 is inserted to the machined hole H which is formed about the rotation axis line WO, the cutting edge 132 moves along the inner circumferential surface S, and the inner face B of the machined hole H is cut. Moreover, in the present embodiment, reference numerals X, Y, and Z indicating directions are used in a portion of the drawings. Here, the reference numerals X and Y each indicate a horizontal direction, and specifically, the X direction indicates a horizontal direction parallel to the rotation axis line WO of the workpiece W, and the Y direction indicates a horizontal direction perpendicular to the rotation axis line WO. In addition, the reference numeral Z indicates a vertical direction.

The tool body 21 is formed of a steel material or the like, and the center portion and the base end other than the tip 23 along the central axis line TO are formed by a shank portion 22 having an approximately constant outer diameter. On an area in which the shank portion 22 is positioned on the outer circumferential surface of the tool body 21, band shaped planes which extend so as to be parallel to the central axis line TO while interposing the central axis line TO up and down (Z direction) are formed, and an upper surface 22A and a lower surface 22B which are disposed so as to be opposite to each other are formed. The shank portion 22 is held in a state where rotation of the insert-replaceable grooving tool 210 is stopped by the upper surface 22A and the lower surface 22B, and therefore, the insert-replaceable grooving tool 210 is fixed and supported to a machine tool (not shown). Moreover, in the present embodiment, the central axis line TO extends in the X direction, and the upper surface 22A and the lower surfaces 22B are disposed within an X-Y horizontal plane. In descriptions below, the tip side (the left side in the left and right directions (X direction) in FIG. 31) of the tool body 21 may be referred to as one side, and the base end side (the right side in the X direction in FIG. 31) may be referred to as the other side.

Figure 31:
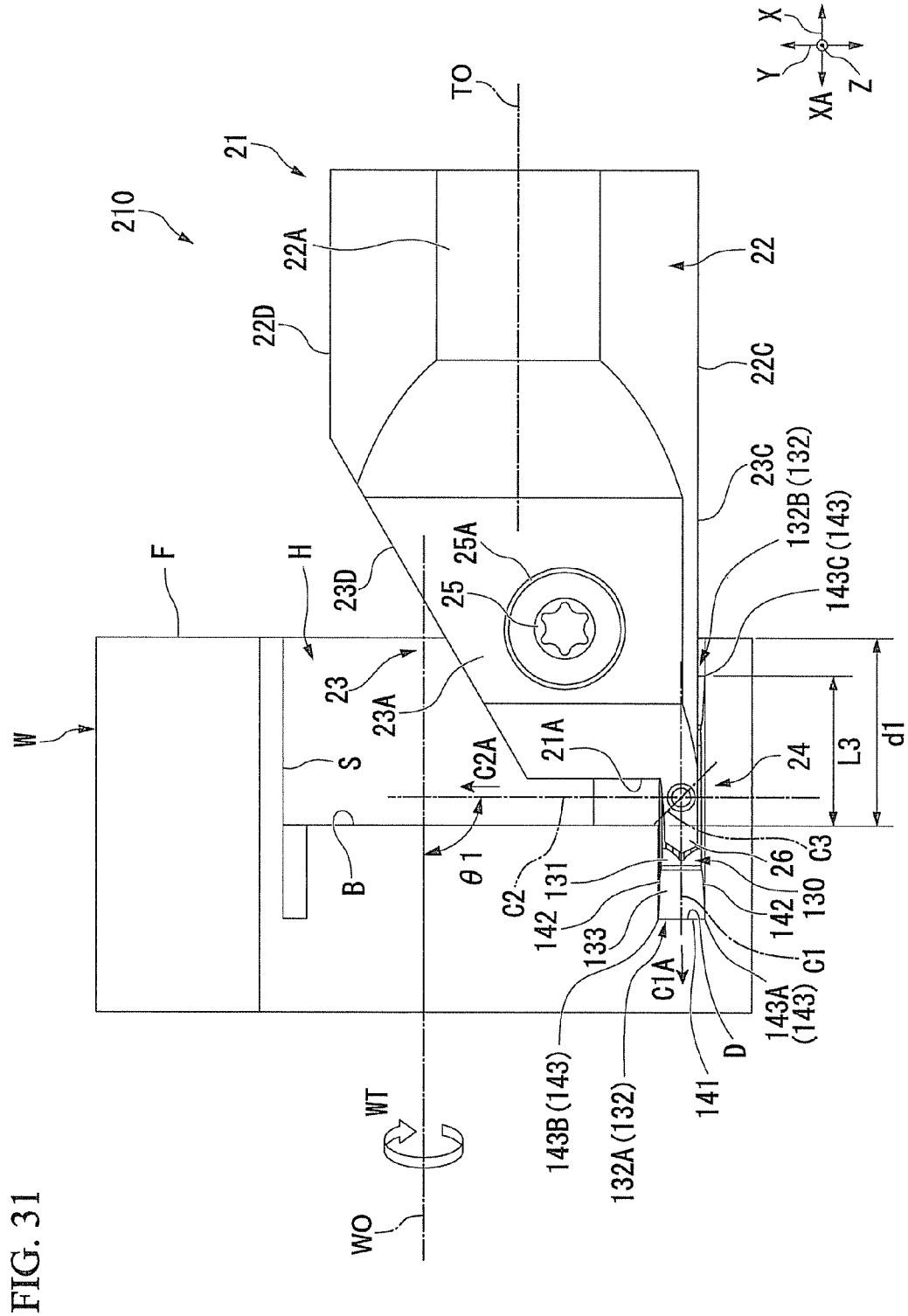
FIG. 31 is a plan view of the insert-replaceable grooving tool of the third embodiment of the present invention and the workpiece when viewed from a direction opposite to a rake face of a cutting insert, and a view when viewed from the upper surface of the cutting insert.
Figure 32:
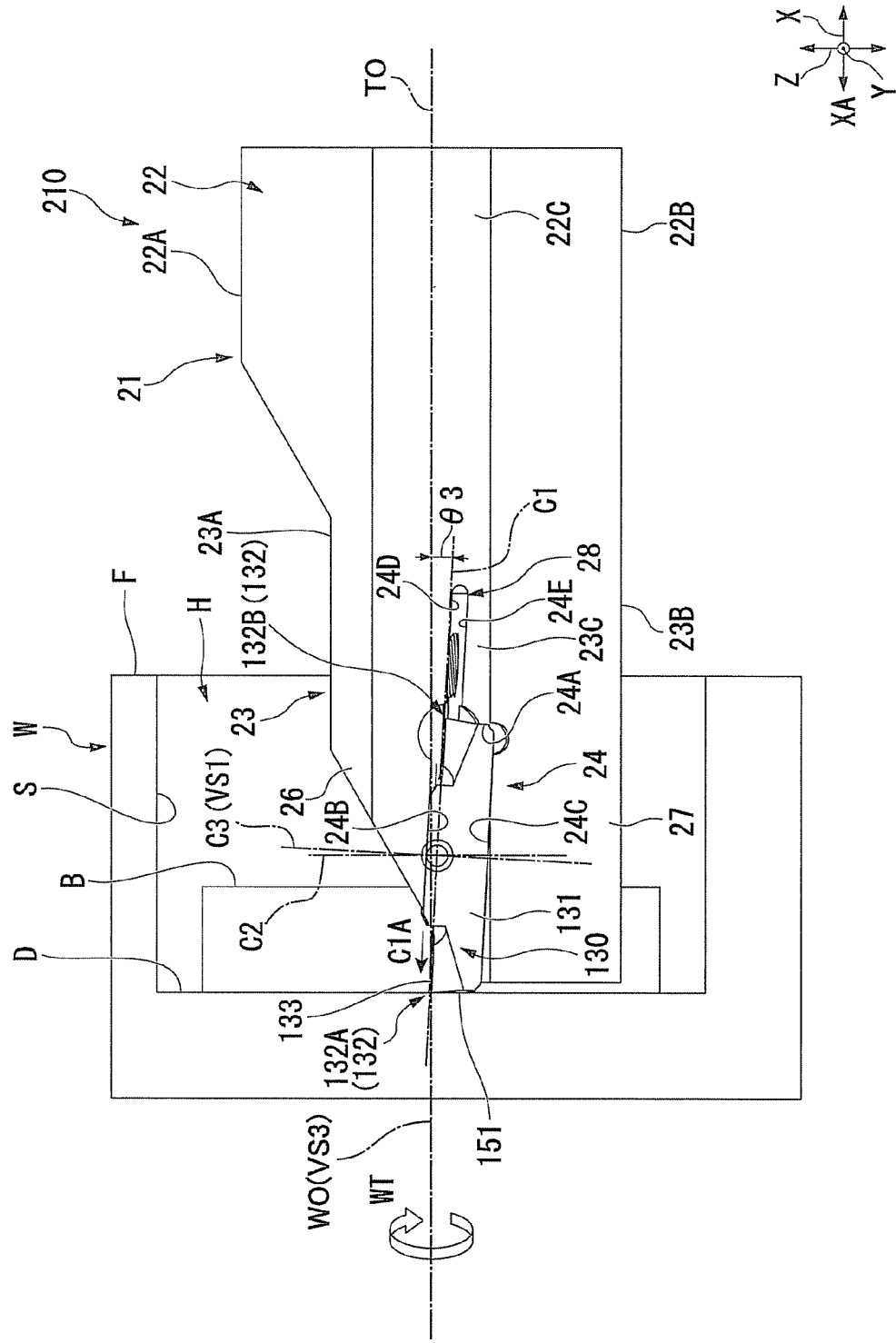
FIG. 32 is a schematic side view showing the insert-replaceable grooving tool of the third embodiment of the present invention and the workpiece.

The tip 23 of the tool body 21 has an approximately trapezoidal shape in a plan view of the tool body 21 shown in FIG. 31 and protrudes from the tip end face 21A to the tip side, and therefore, an upper jaw portion 26 and a lower jaw portion 27 are formed. The upper jaw portion 26 and the lower jaw portion 27 of the tip 23 are disposed so as to be opposite to each other in the up and down directions (Z direction), and are formed on an end of one side (the lower side in FIG. 31) in the directions (Y direction in FIG. 31) perpendicular to the rotation axis line WO in the tip end face 21A. In addition, as shown in FIG. 32, the upper surface 23A of the tip 23 is formed so as to be further recessed by a step than the upper surface 22A of the shank portion 22. Moreover, the lower surface 23B in the tip 23 of the tool body 21 is flush with the lower surface 22B in the shank portion 22.

In addition, in both side surfaces which face the front (Y direction in FIG. 31) in the tip 23 of the tool body 21, one side surface 23C facing the one side is continuous so as to be flush with a side surface (one side surface) 22C facing the one side in the shank portion 22 and forms the side surface facing the one side of the upper jaw portion 26 and the lower jaw portion 27. A center portion in the Z direction in the one side surface 23C of the tip 23 and the one side surface 22C of the shank portion 22 is formed in a band shaped plane which is perpendicular to the upper surface 22A and the lower surface 22B and extends along the central axis line TO.

Moreover, in the tip 23, the other side surface 23D is formed so as to face the back of the one side surface 23C toward the other side (upper side in FIG. 31) in both side surfaces. The other side surface 23D of the tip 23 is gradually inclined toward the one side moving from the base end of the tool body 21 toward the tip side, and formed in a tapered shape. In addition, the base end of the other side surface 23D is continuous with a side surface (other side surface) 22D having a curved convex shaped cross-section which faces the other side in the shank portion 22. Moreover, the shapes of the shank portion 22 and the tip 23 of the above-described tool body 21 are an example and are not limited to the present embodiment. For example, the shape of the one side surfaces 23C and 22C is not limited to the above-described plane and may be a curved surface shape, an irregular shape, or the like in addition to the plane. Moreover, the one side surface 23C may not be flush with and not be continuous with the one side surface 22C. For example, in a plan view of FIG. 31, the one side surface 22C of the shank portion 22 may be formed so as to protrude downward in the shown Y direction or so as to be recessed upward in the Y direction with respect to the one side surface 23C of the tip 23.

Figure 33:
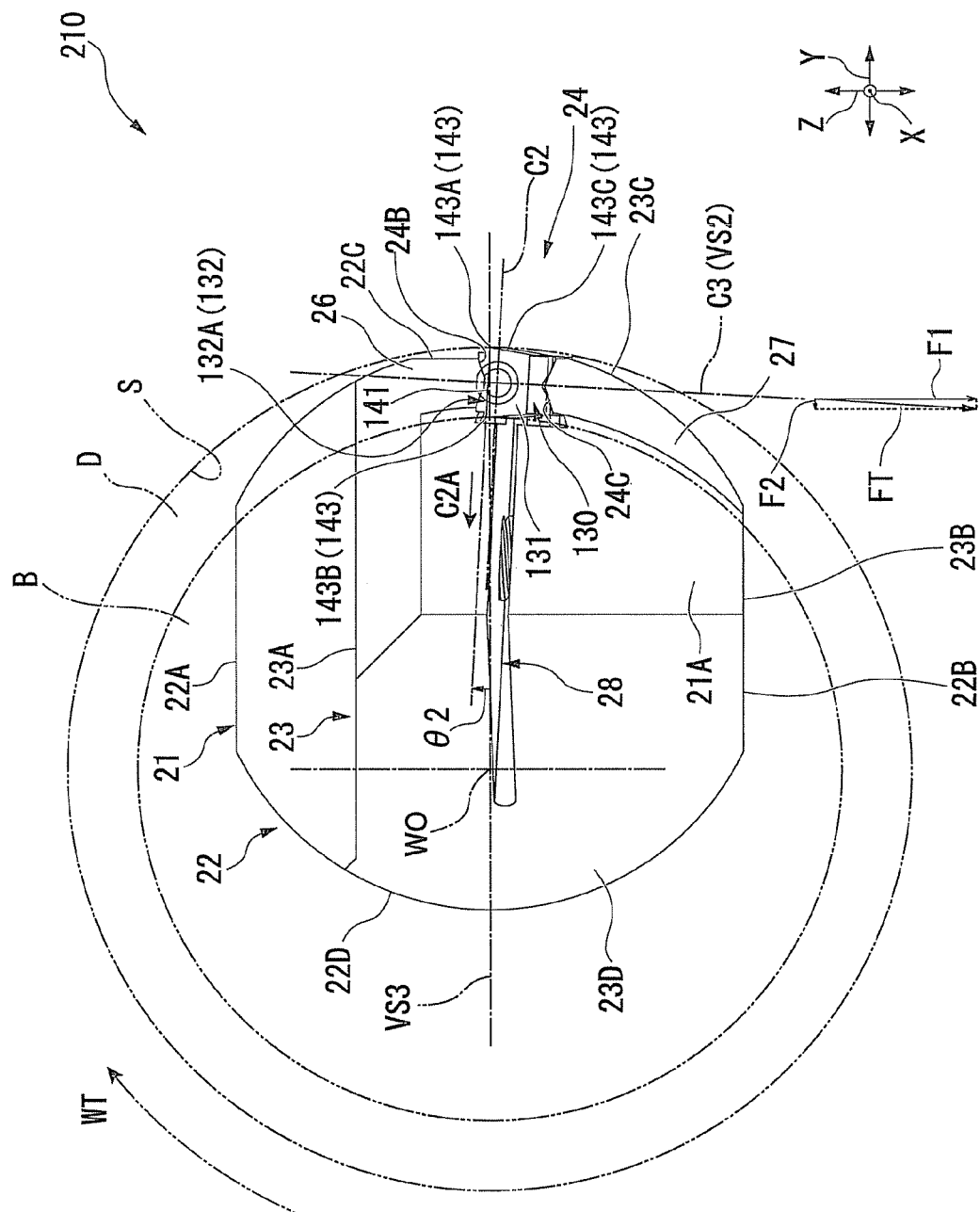
FIG. 33 is a front view of the insert-replaceable grooving tool of the third embodiment of the present invention when viewed from a tip of a tool body.
Figure 34:
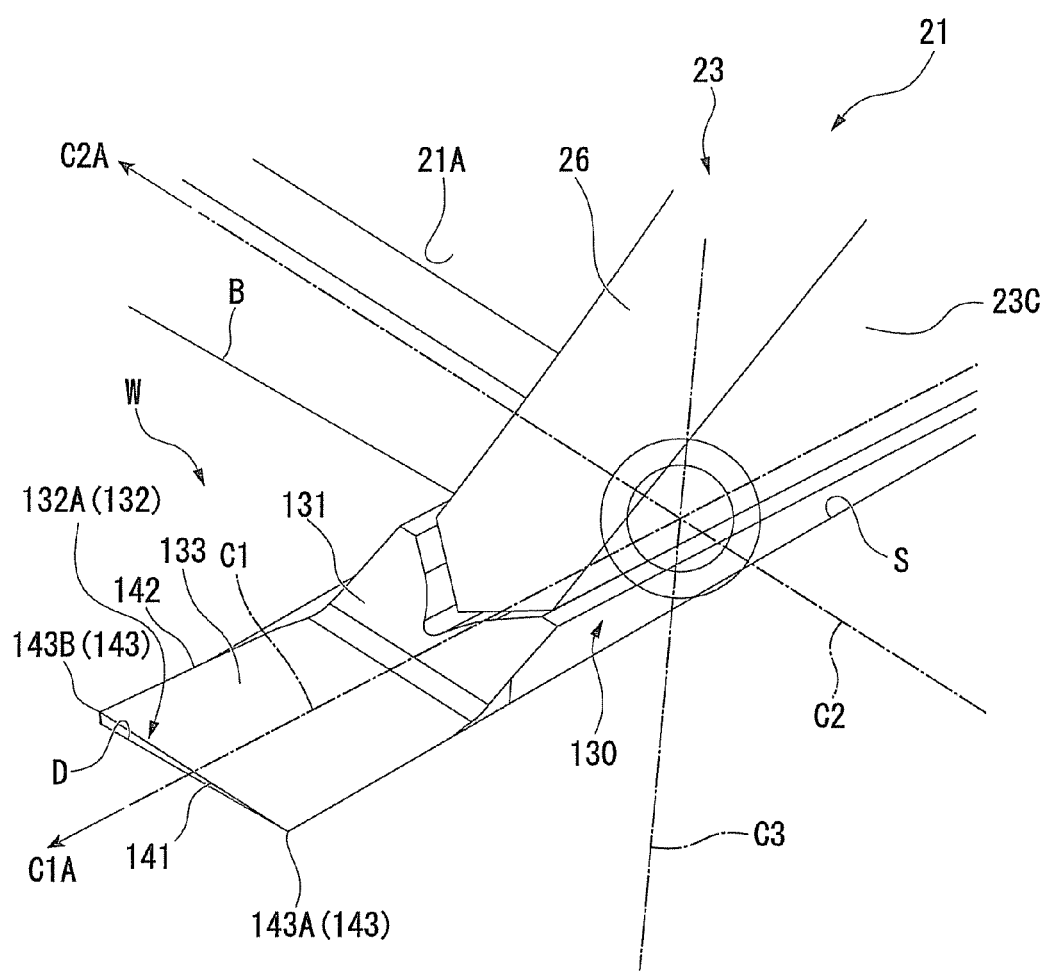
FIG. 34 is an enlarged view of the one cutting edge 132A of the cutting insert in FIG. 29.

In a side view of the tool body 21 shown in FIG. 32, the upper jaw portion 26 has an approximately triangular shape, and the upper surface of the upper jaw portion 26 is formed so as to be gradually inclined toward the lower surface 23B side moving from the base end toward the tip side. In addition, in a front view of the tool body 21 shown in FIG. 33, the surface of the lower jaw portion 27 facing the rotation axis line WO has a curved concave shaped cross-section, the surface facing the side opposite to the rotation axis line WO has a curved convex shaped cross-section, and the entire lower jaw portion 27 is formed in an approximately arch shape. As shown in FIG. 33, the thickness of the lower jaw portion 27 is formed so as to be gradually thinned moving from the upper surface 23A side toward the lower surface 23B side. Specifically, in the front view, the lower jaw portion 27 is formed so as to correspond to the lower side portion in the Z direction in the one side surface 22C of the shank portion 22 and the one side surface 23C of the tip 23, and is gradually curved toward the other side surface 23D moving toward the lower side in the Z direction. Moreover, in the side view of FIG. 32, the lower jaw portion 27 has an approximately rectangular shape and protrudes further toward the tip side of the tool body 21 than the upper jaw portion 26.

In addition, a gap is provided between the upper jaw portion 26 and the lower jaw portion 27 and the gap becomes an insert mounting seat 24 to which the cutting insert 130 is detachably mounted. The tool body 21 mounts the cutting insert 130 on the insert mounting seat 24 and the cutting insert 130 is disposed along the one side surfaces 23C and 22C facing the side of the tool body 21. Specifically, in the plan view of FIG. 31, the cutting insert 130 extends so as to be approximately parallel with respect to the central axis line TO when being mounted on the insert mounting seat 24 which is opened to the one side surface 23C of the tip 23 of the tool body 21, and the cutting insert is disposed along the one side surface 23C in a state where the corner portion 143C of the cutting edge 132B described below slightly protrudes toward the lower side in the Y direction from the one side surface 23C.

The insert mounting seat 24 has an approximately rectangular parallelepiped hole shape, is positioned on the one side surface 23C side of the tip 23, and extends along the X direction. The tip and the center portion of the insert mounting seat 24 are disposed between the upper jaw portion 26 and the lower jaw portion 27 and are opened to both sides in the Y direction. In addition, the tip of the insert mounting seat 24 is also opened to a direction (grooving direction XA described below) which faces the tip side in the X direction. In addition, the base end of the insert mounting seat 24 is disposed between the upper surface 23A and the lower surface 23B and is opened to the one side surface 23C. In the side view of FIG. 32, the insert mounting seat 24 is formed so as to be gradually inclined from the upper surface 23A toward the lower surface 23B moving from the base end of the tool body 21 toward the tip side. Moreover, a step portion 24A facing the tip side of the tool body 21 is formed on the base end of the insert mounting seat 24.

Moreover, in the base end side of the insert mounting seat 24, a fastening portion 28, which has a narrower slit shape than the insert mounting seat 24 and is opened to the tip end face 21A, the one side surface 23C, and the other side surface 23D, is formed. The fastening portion 28 is formed so as to be gradually inclined from the lower surface 23B toward the upper surface 23A moving from the base end of the tool body 21 toward the tip side.

Figure 37:
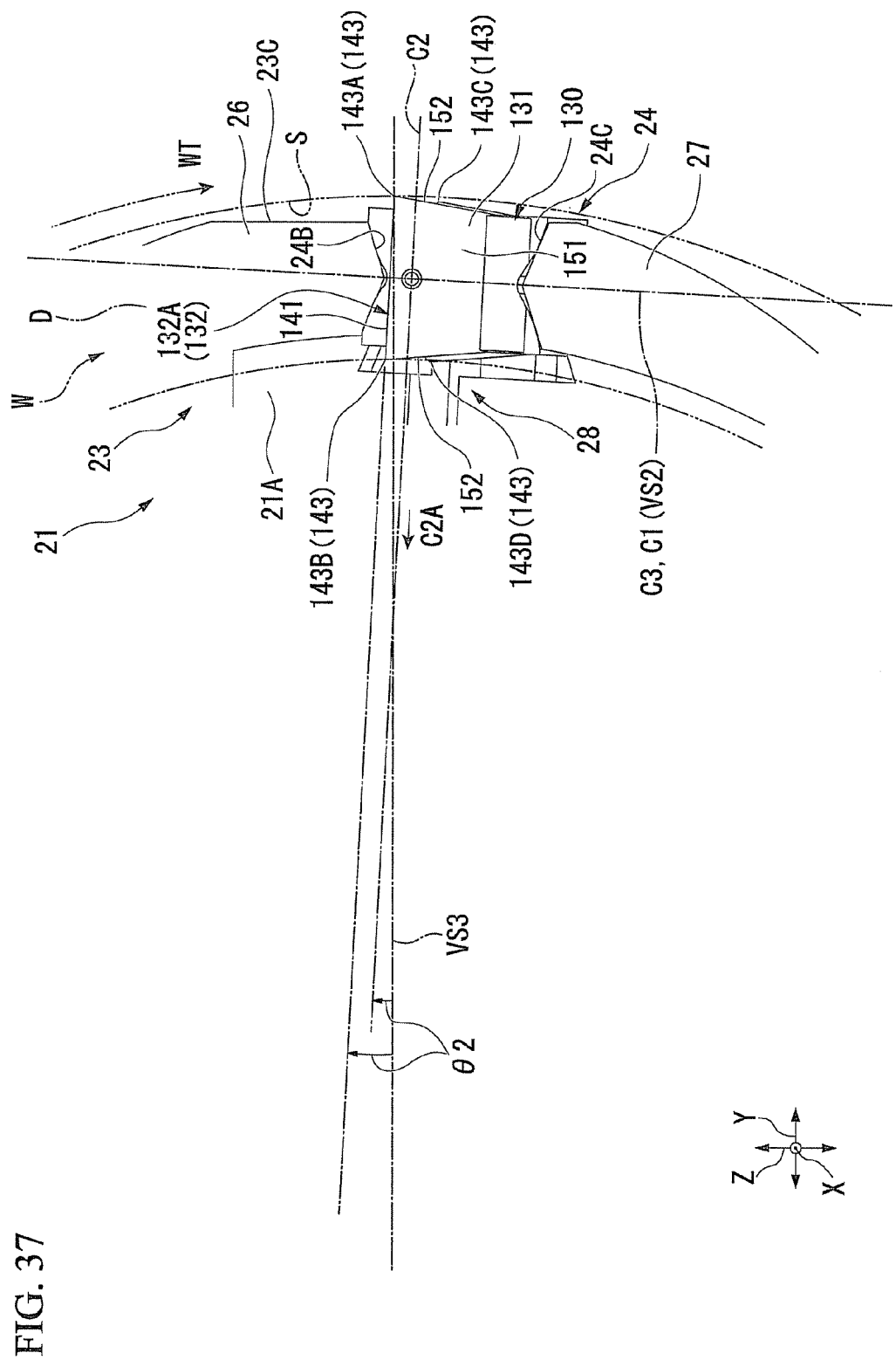
FIG. 37 is an enlarged view of the vicinity of the cutting insert 130 in FIG. 33.

Moreover, as shown in FIGS. 33 and 37, a top wall surface 24B and a bottom wall surface 24C which vertically face each other in the insert mounting seat 24 are formed in a convex V shape respectively when viewed from the tip end face 21A side (that is, when view the front surface of the tip end face 21A). In addition, as shown in FIG. 32, in the fastening portion 28, a gap between the top wall surface 24D and the bottom wall surface 24E is formed so as to be narrow with respect to the insert mounting seat 24. A through hole 25A which is opened to the upper surface 23A of the tip 23 and to which a clamp screw 25 is inserted is formed on the top wall surface 24D of the fastening portion 28. Moreover, a screwed hole (not shown) which is coaxial with the through hole 25A and in which a female screw processing is performed on the inner circumferential surface is formed on the bottom wall surface 24E of the fastening portion 28.

In addition, the cutting insert 130 which is mounted to the insert-replaceable grooving tool 210 is formed of a hard material such as cemented carbide, and as shown in FIG. 32, includes an insert body 131 having a bar shape and the pair of cutting edges 132 which is formed on an upper surface (surface facing upward in the Z direction in FIG. 32) of the insert body 131 in both ends of the longitudinal direction (left and right directions in FIG. 32 (X direction)) of the insert body 131. The cutting insert 130 is a so-called dog bone type cutting insert.

Here, the reference numeral C1 shown in FIGS. 6, 34 to 36 or the like indicates the axis line of the longitudinal direction along the longitudinal direction of the insert body 131, and the axis line C1 of the longitudinal direction passes through a center in a traverse direction perpendicular to the longitudinal direction in the insert body 131 and extends so as to pass through the center of each of the front cutting edges 141 and 141 described below in the pair of cutting edges 132. That is, the axis line C1 of the longitudinal direction passes through the center of the pair of cutting edges 132 and extends in the longitudinal direction. Moreover, the reference numeral C2 indicates the axis line of the traverse direction along the traverse direction of the insert body 131, and the axis line C2 of the traverse direction passes through the center (which is a center between the pair of cutting edges 132 and is a portion shown by a double circle in the drawings) of the insert body 131 along the axis line C1 of the longitudinal direction, is perpendicular to the axis line C1 of the longitudinal direction, and extends so as to be parallel to the front cutting edge 141. In addition, the reference numeral C3 indicates the axis line of the height direction along the height direction of the insert body 131, and the axis line C3 of the height direction passes through the center of the insert body 131 and extends in the direction perpendicular to the axis line C1 of the longitudinal direction and the axis line C2 of the traverse direction.

In addition, the cutting insert 130 is formed so as to be symmetric (that is, to be planarly symmetric) with respect to the insert virtual plane VS1 which passes through the center of the insert body 131 along the axis line C1 of the longitudinal direction and is perpendicular to the axis line C1 of the longitudinal direction. Moreover, the cutting insert 130 is formed so as to be also symmetric (planarly symmetric) with respect to the insert virtual plane VS2 which includes the axis line C1 of the longitudinal direction and the axis line C3 of the height direction and passes through centers of each of the upper surface of the insert body 131 (surface facing upward in the up and down directions (Z direction) in FIG. 33) and the lower surface (surface facing downward in the Z direction in FIG. 33). That is, the cutting insert 130 is formed so as to be rotationally symmetric with respect to the axis line C3 of the height direction. In addition, the cutting insert 130 may be formed not to be planarly symmetric with respect to the insert virtual plane VS2.

In addition, as shown in FIGS. 6 and 37, the cutting insert 130 is formed in a recessed V shape in each of the center portion in the longitudinal direction in the upper surface of the insert body 131 and the cross-section in which the lower surface is perpendicular to the axis line C1 of the longitudinal direction. According to the shape of the insert body 131, the cutting insert 130 is guided so as to slide on the top wall surface 24B and the bottom wall surface 24C in the portion which is opened to the tip side of the insert mounting seat 24, and is inserted to the other side (base end side of tool body 21).

As shown in FIG. 32, the end face of the other side of the insert body 131 abuts the step portion 24A, and therefore, the cutting insert 130 which is placed on the insert mounting seat 24 is positioned. In this state, by tightening the clamp screw 25, the top wall surface 24D of the fastening portion 28 approaches toward the bottom wall surface 24E while being elastically deformed, and the top wall surface 24B of the insert mounting seat 24 approaches toward the bottom wall surface 24C while being elastically deformed. In this way, the gaps between the top wall surfaces 24D and 24B and the bottom wall surfaces 24E and 24C are narrowed, and therefore, the cutting insert 130 is fixed and supported to the tip 23 of the tool body 21.

Figure 35:
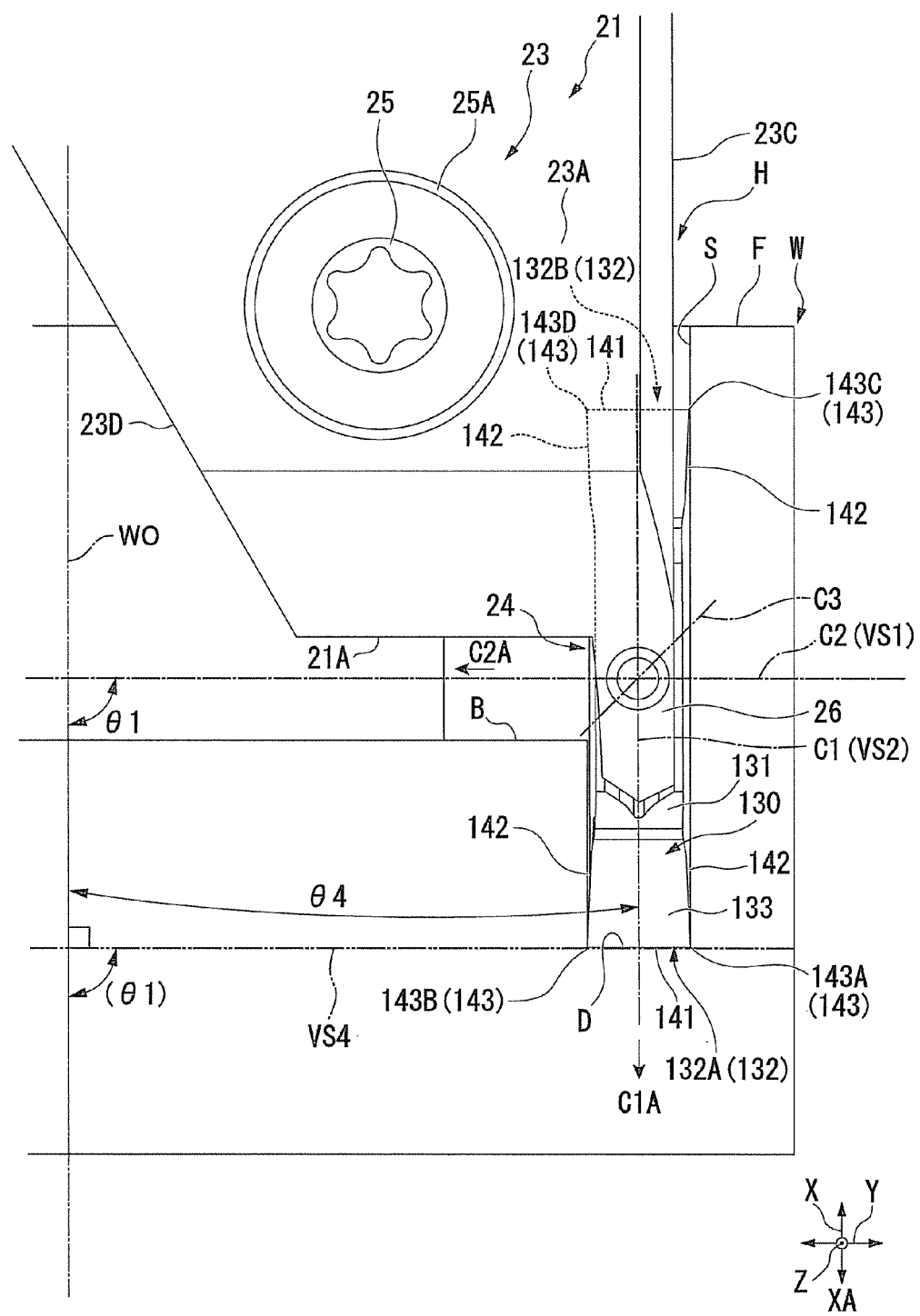
FIG. 35 is an enlarged view of the vicinity of the cutting insert 130 in FIG. 31.

In addition, the pair of cutting edges 132 is disposed on both ends along the direction of the axis line C1 of the longitudinal direction on the upper surface of the insert body 131. As shown in FIG. 35, the cutting edge 132 includes the linear front cutting edge 141 which is formed in the end of the longitudinal direction of the insert body 131 and extends in the traverse direction (left and right directions in FIG. 35) perpendicular to the longitudinal direction, the pair of corner portions 143 which are disposed on both ends of the front cutting edge 141 and is formed so as to protrude in the traverse direction respectively, and the pair of side surface cutting edges 142 which each linearly extends so as to gradually narrow the mutual gap moving toward the center (inner side) of the insert body 131 along the longitudinal direction from the corner portions 143.

Specifically, the pair of side surface cutting edges 142 is formed so as to be gradually inclined from the outer end edge in the traverse direction toward the center (inner side) moving from the outer end edge in the longitudinal direction of the insert body 131 toward the center, and the so-called back taper is applied to the side surface cutting edges.

In addition, both ends in the upper surface of the insert body 131 become the pair of rake faces 133 which is retreated by one step from the center portion and each has an approximately rectangular shape. In the rake faces 133, three sides other than the center side in the longitudinal direction among the outer circumferential edges become the front cutting edge 141 and the pair of side surface cutting edges 142.

Moreover, in FIG. 6, in the circumferential surfaces which connect the upper surface and the lower surfaces among the outer surfaces of the insert body 131, the front flank 151 which is continuous with the front cutting edge 141 and the pair of side flanks 152 which is each continuous with the pair of side surface cutting edges 142 are formed. The front flank 151 is formed so as to be inclined to gradually retreat from the outer surface of the insert body 131 moving from the front cutting edge 141 toward the lower surface side. In addition, the side flanks 152 are formed so as to be inclined to gradually retreat from the outer surface of the insert body 131 moving from the side surface cutting edges 142 toward the lower surface side. Moreover, the outer surface mentioned here shows a virtual plane which passes through the front cutting edge 141 or the side surface cutting edge 142 of the insert body 131 and is parallel to the axis line C3 of the height direction. In descriptions hereinafter, the surface on which the front flank 151 is formed in the insert body 131 is referred to as a front surface of the cutting insert 130, and the surface on which the side flank 152 is formed in the insert body 131 is referred to as a side surface of the cutting insert 130.

If the cutting insert 130 is mounted on the insert mounting seat 24 of the tool body 21, as shown in FIG. 31, the cutting edge 132A in the pair of cutting edges 132 is disposed on the one side (left side in X direction in FIG. 31), and the cutting edge 132B is disposed on the other side (right side in X direction in FIG. 31). Moreover, the one cutting edge 132A protrudes from the tip end face 21A in the tip 23 of the tool body 21 toward the tip side, is disposed so as to be opposite to the inner face B of the workpiece W, and performs the grooving to the inner face B. Specifically, in the tool body 21, the one cutting edge 132A in the pair of cutting edges 132 protrudes toward a grooving direction which is indicated by a reference numeral XA in the X direction from the tip end face 21A of the tip 23, and the cutting inert 130 is mounted.

In addition, the direction indicated by the reference numeral C2A in FIGS. 31, 33 to 35 shows the first traverse direction which is the other traverse direction in the traverse directions (directions in axis line C2 of the traverse direction) of the insert body 131. The first traverse direction C2A is the direction which is from the one corner portion 143A (143C) positioned on the one side surfaces 22C and 23C side of the tool body 21 in the pair of corner portions 143A and 143B (143C and 143D) (positioned on the inner circumferential surface S side of workpiece W) toward the other corner portion 143B (143D) which is positioned on the other side surfaces 22D and 23D side of the tool body 21 rather than on the one corner portion 143A (143C) (positioned on a side opposite to the inner circumferential surface S). As shown in a front view of the tool body 21 of FIG. 37, the axis line C2 of the traverse direction of the cutting insert 130 is gradually inclined toward the front of the rotational direction WT of the workpiece W moving toward the first traverse direction C2A.

That is, the cutting insert 130 is gradually inclined toward the back of the rotational direction WT of the workpiece W as the front cutting edge 141 in the one cutting edge 132A goes toward the first traverse direction C2A. Specifically, as shown in FIG. 33, the cutting insert 130 is gradually inclined toward the back of the rotational direction WT (toward the upper surface 23A of the tool body 21) as the front cutting edge 141 of the cutting edge 132A goes from the one side surface 23C of the tool body 21 toward the other side surface 23D side. Moreover, according to this, in the one cutting edge 132A, the corner portion 143B which is positioned on the first traverse direction C2A in the pair of corner portions 143A and 143B is disposed on the back of the rotational direction WT of the workpiece W with respect to the corner portion 143A.

In the present embodiment, the front cutting edge 141 of the cutting edge 132A is gradually inclined toward the back of the rotational direction WT of the workpiece W as being separated from the inner circumferential surface S toward the rotation axis line WO. Here, one indicated by the reference numeral VS3 in FIGS. 32, 33 and, 37 represents a virtual plane of the tool which includes the corner portion 143A of the cutting edge 132A and the rotation axis line WO. In FIG. 37, the angle θ2 between the front cutting edge 141 of the cutting edge 132A and the virtual plane of the tool VS3 is more than 0° to 7° or less. In addition, in the present embodiment, for example, θ2 is about 3°. Moreover, since the axis line C2 of the traverse direction is parallel to the front cutting edge 141, θ2 can also be an angle between the axis line C2 of the traverse direction and the virtual plane of the tool VS3. In addition, in the present embodiment, the virtual plane of the tool VS3 is disposed within the X-Y horizontal plane.

Moreover, the direction indicated by the reference numeral C1A in FIGS. 31 and 32 shows the first longitudinal direction which is one longitudinal direction in the longitudinal directions (directions of the axis line C1 of the longitudinal direction) of the insert body 131. The first longitudinal direction C1A is the direction which is from the other cutting edge 132B toward the one cutting edge 132A in the pair of cutting edges 132A and 132B. As shown in FIG. 32, when viewed from the one side surface 23C side of the tool body 21, the axis line C1 of the longitudinal direction of the cutting insert 130 is inclined so as to gradually approach the virtual plane of the tool VS3 moving toward the first longitudinal direction C1A.

Specifically, in the side surface view of FIG. 32, the axis line C1 of the longitudinal direction extends so as to gradually approach the virtual plane of the tool VS3 from the lower surface of the insert body 131 toward the upper surface side (upward in the Z direction in FIG. 32) moving toward the first longitudinal direction C1A. That is, the axis line C1 of the longitudinal direction gradually extends from the lower surface 23B of the tool body 21 toward the upper surface 23A side moving toward the first longitudinal direction C1A. Moreover, according to this, the front cutting edge 141 of the cutting edge 132B is separated toward the lower surface side of the insert body 131 (lower surface 23B side of tool body 21) with respect to the virtual plane of the tool VS3. Moreover, in the FIG. 32, the angle θ3 between the axis line C1 of the longitudinal direction and the virtual plane of the tool VS3 is more than 0° and less than 10°. In the present embodiment, for example, θ3 is about 3°.

As shown in FIG. 32, the cutting insert 130 mounted on the tool body 21 is disposed so as to be gradually inclined toward the upper surface 23A of the tool body 21 moving from the other side at which the cutting edge 132B is disposed toward the one side at which the cutting edge 132A is disposed and the first longitudinal direction C1A.

Moreover, FIGS. 31 and 35 are top views of the cutting insert 130 when viewed from a direction perpendicular to the virtual plane of the tool VS3, in the top view, the angle θ1 between the axis line C2 of the traverse direction and the rotation axis line WO is 90° or more and 90.5° or less. The cutting insert 130 is mounted on the insert mounting seat 24 so that the angle θ1 is in the above-described range. In the present embodiment, θ1 is about 90°. Thereby, in the top view, the angle between the extension line of the front cutting edge 141 of the cutting edge 132A parallel to the axis line C2 of the traverse direction and the rotation axis line WO also is θ1 (=90°). Moreover, in FIG. 35, the angle θ4 between the axis line C1 of the longitudinal direction and the rotation axis line WO is more than 0° to less than 1°. In the present embodiment, θ4 is about 0.2°. Specifically, the relationship between θ4 and θ1 is 1°>θ4>θ1−90°. In the present embodiment, since θ1 is 90°, in the top view of the tool body 21 shown in FIG. 35, the axis line C2 of the traverse direction which is projected to the virtual plane of the tool VS3 and the rotation axis line WO are perpendicular to each other. On the other hand, the axis line C2 of the traverse direction which is projected to the virtual plane of the tool VS3 and the axis line C1 of the longitudinal direction are not perpendicular to each other. That is, the axis line C1 of the longitudinal direction which is projected to the virtual plane of the tool VS3 and the rotation axis line WO are not parallel to each other.

Figure 36:
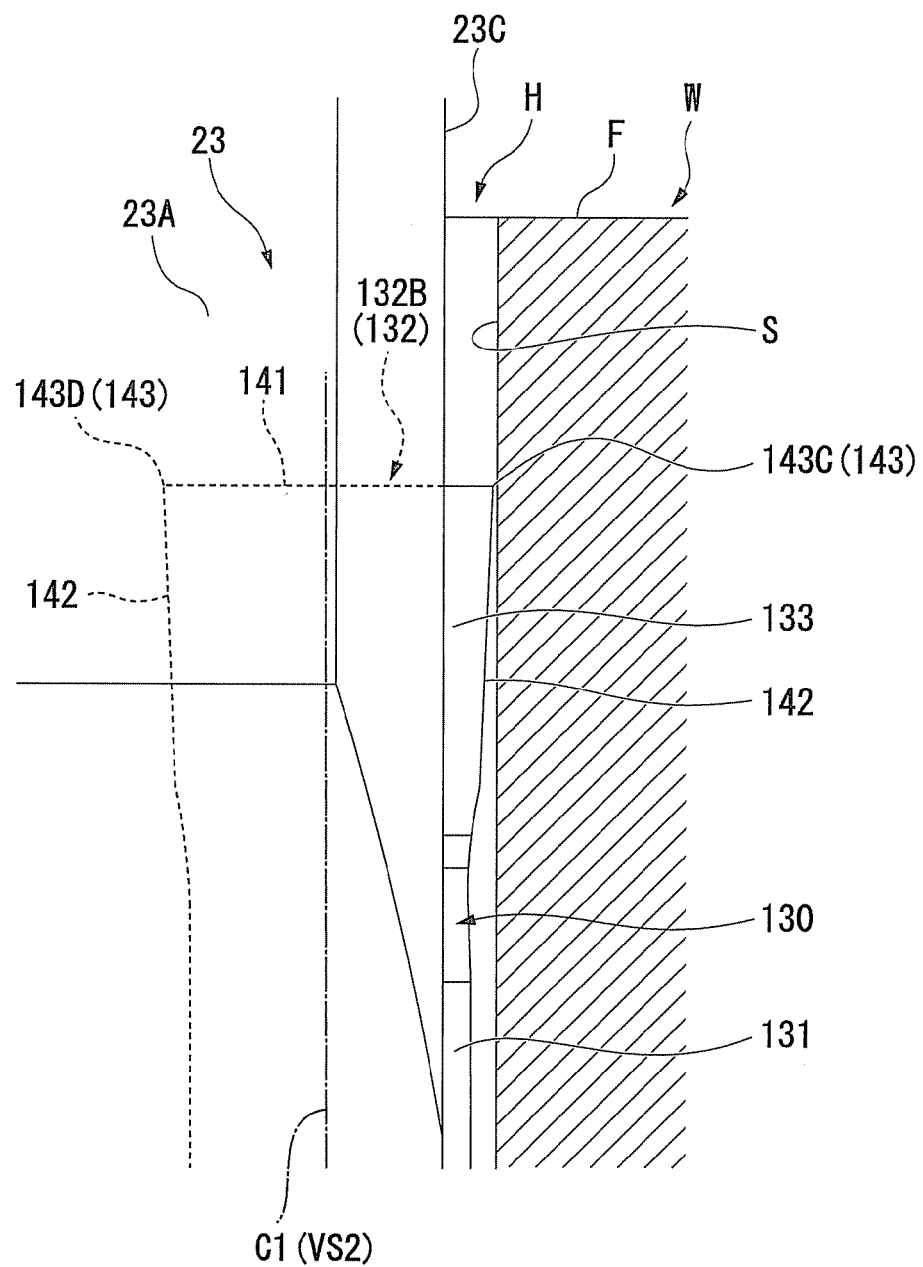
FIG. 36 is an enlarged view of the other cutting edge 132B of the cutting insert in FIG. 35.

Moreover, as shown in FIGS. 35 and 36, when viewed from the direction perpendicular to the virtual plane of the tool VS3 (opposite to the rake face 133), in the cutting insert 130, the corner portion 143C which is positioned on the side opposite to the first traverse direction C2A in the other cutting edge 132B is disposed further toward the first traverse direction C2A than the corner portion 143A which is positioned on the opposite side in the one cutting edge 132A. That is, the corner portion 143A which is positioned on the one side surface 23C side of the tool body 21 (left side in FIG. 35) in the one cutting edge 132A is disposed further toward the one side surface 23C side (side opposite to the first traverse direction C2A) than the corner portion 143C which is positioned on the one side surface 23C side in the other cutting edge 132B. In the present embodiment, the corner portion 143C which is positioned on the inner circumferential surface S side in the cutting edge 132B is separated from the inner circumferential surface S with respect to the corner portion 143A which is positioned on the inner circumferential surface S side in the cutting edge 132A.

Figure 38:
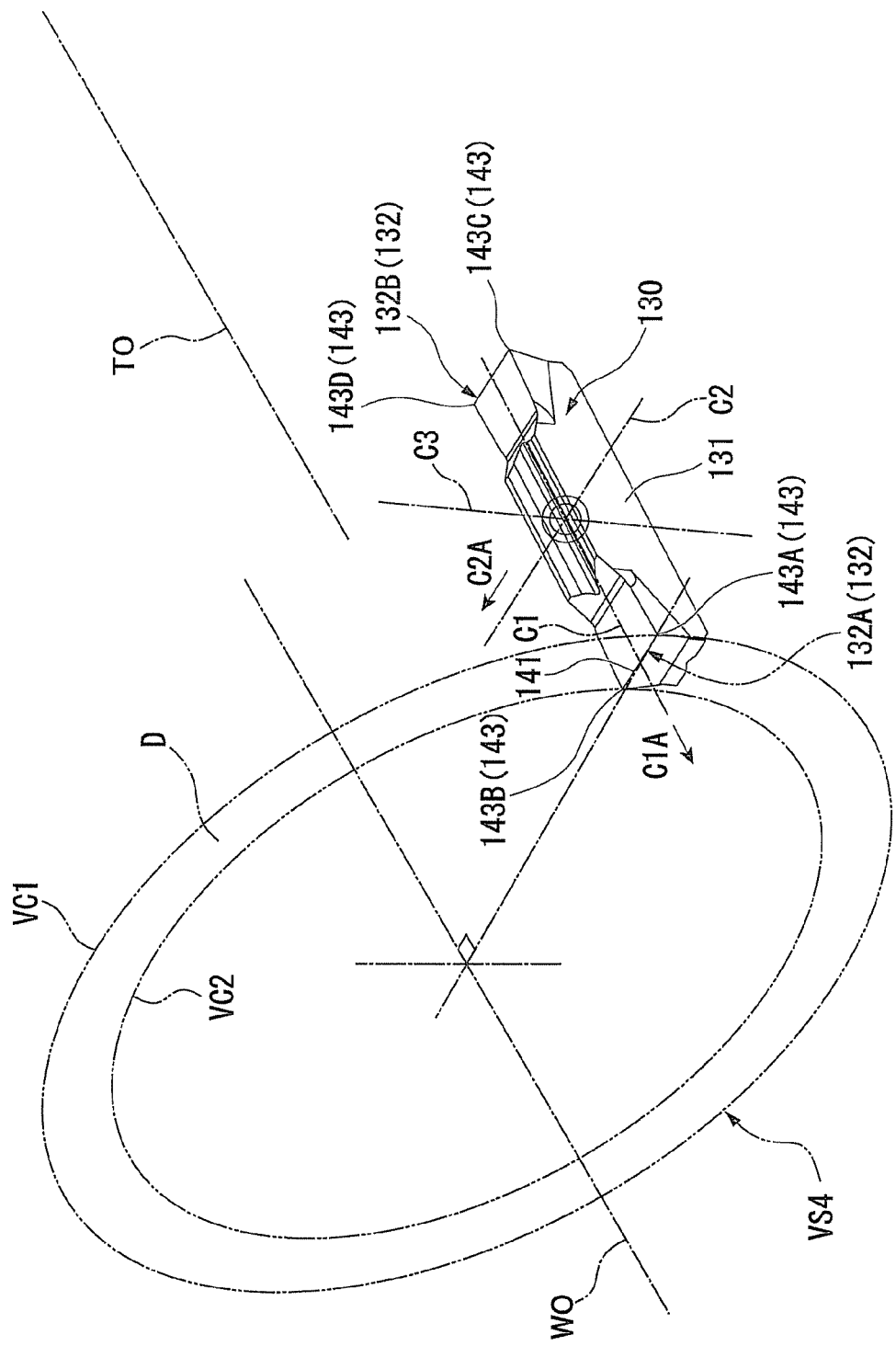
FIG. 38 is a view showing a mounting posture of the cutting insert 130, the virtual circle VC1 around which the corner portion 143A is rotated around the rotation axis line WO, and the virtual circle VC2 around which the corner portion 143B is rotated around the rotation axis line WO.
Figure 39:
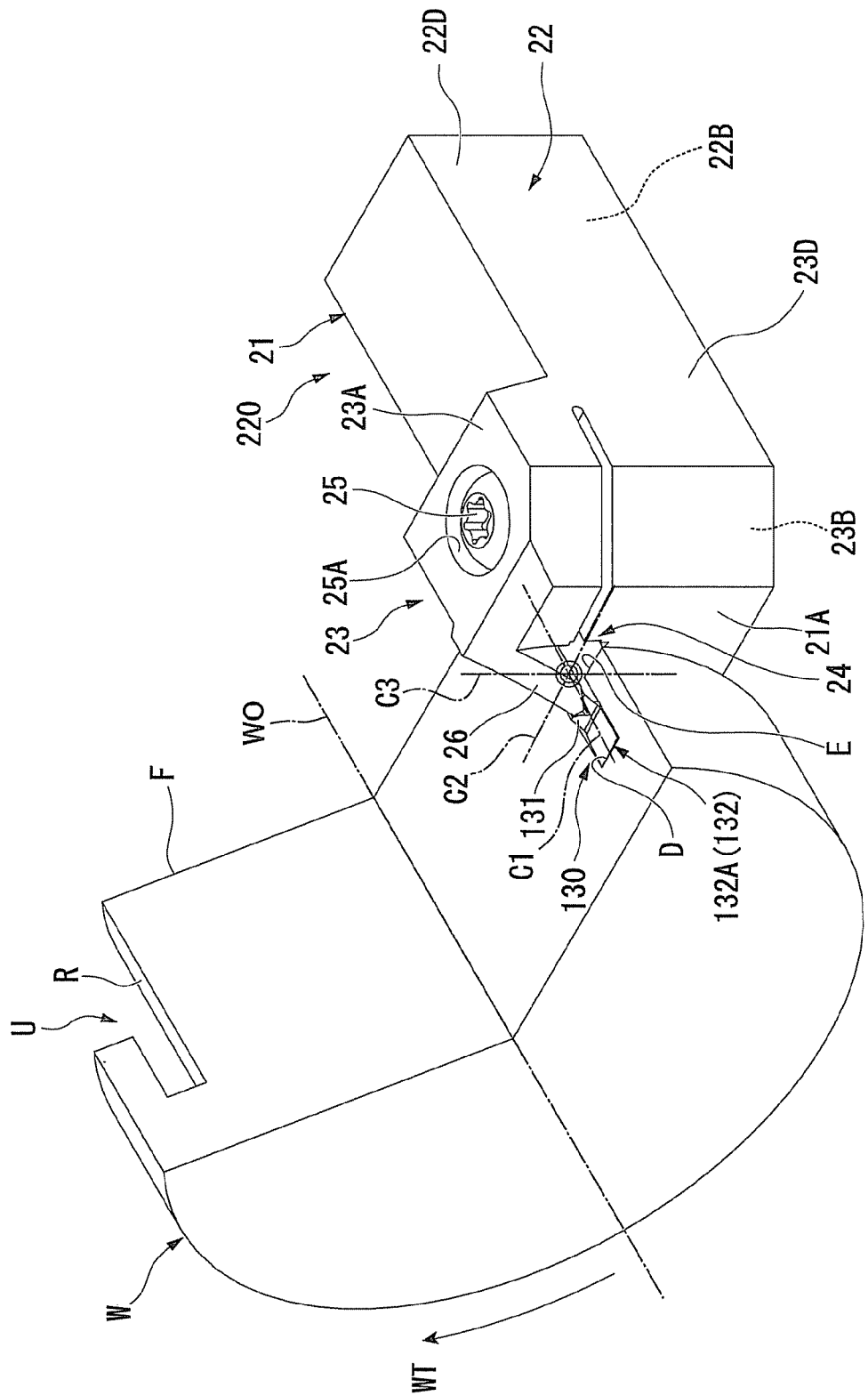
FIG. 39 is a schematic perspective view showing an insert-replaceable grooving tool of a fourth embodiment of the present invention and a workpiece to which a grooving is performed using the insert-replaceable grooving tool.

Moreover, by adjusting the above-described θ1 to θ4, as shown in FIGS. 35 and 38, the pair of corner portions 143A and 143B in the one cutting edge 132A can be disposed on the same workpiece virtual plane VS4 perpendicular to the rotation axis line WO. In the present embodiment, the angles θ2 and θ3 are adjusted and the angle θ1=90° is satisfied, and therefore, the pair of corner portions 143A and 143B is disposed on the workpiece virtual plane VS4. Specifically, as shown in FIG. 38, in the cutting edge 132A, the virtual circle VC1 which is obtained by rotating the corner portion 143A around the rotation axis line WO and the virtual circle VC2 which is obtained by rotating the corner portion 143B around the rotation axis line WO are contained within the workpiece virtual plane VS4. In addition, the outer circumference (trajectory) of the virtual circle VC1 coincides with the outer circumferential edge portion in the groove bottom D of the groove which is formed in the workpiece W and the outer circumference of the virtual circle VC2 coincides with the inner circumferential edge portion of the groove bottom D. Moreover, the front cutting edge 141 of the cutting edge 132A is disposed on the workpiece virtual plane VS4 at any portion which is positioned between the corner portion 143A and the corner portion 143B.

In the present embodiment, in a state where the corner portion 143A of the one cutting edge 132A is closely disposed so as to abut the inner circumferential surface S of the workpiece W, the cutting insert 130 of the tool body 21 having the above-described configuration moves in the grooving direction XA toward the direction of the rotation axis line WO of the workpiece W along the inner circumferential surface S. Moreover, the cutting edge 132A performs the grooving with respect to the inner face B facing the base end side of the tool body 21.

As describe above, according to the insert-replaceable grooving tool 210 of the present embodiment and the end face grooving method using this, the front cutting edge 141 in the one cutting edge 132A of the cutting insert 130 protruding toward the inner face B of the workpiece W from the tip 23 of the tool body 21 is parallel to the axis line C2 of the traverse direction and is gradually inclined toward the front of the rotational direction WT around which the workpiece W rotates moving toward the first traverse direction C2A. Therefore, the cutting resistance is decreased when the tool body 21 is transversely fed in approximately perpendicular to the central axis line TO along the Y direction.

That is, in the case where the end face grooving of the inner diameter side like the present embodiment is performed, generally, the tool body 21 moves from the inner circumferential surface S of the workpiece W toward the rotation axis line WO when the tool body 21 is transversely fed. At this time, since the other side corner portion 143B and the side surface cutting edge 142, which are positioned at the front of the movement direction in the one cutting edge 132A of the cutting insert 130, sharply cut into with respect to the work-piece W, the cutting resistance is decreased. In addition, as shown in FIG. 33, in the end face grooving of the inner diameter side of the present embodiment, since a component F2 of the cutting resistance generated when the grooving is performed is operated from the one side surface 23C in which the cutting insert 130 is disposed in the tool body 21 toward the central axis line TO side of the tool body 21, the cutting is stabilized, and the machining accuracy is secured.

In addition, the axis line C1 of the longitudinal direction of the cutting insert 130 is inclined so as to gradually approach the virtual plane of the tool VS3 moving toward the first longitudinal direction C1A and extends toward the upper surface side (upper surface 23A side of tool body 21) of the insert body 131. That is, since the other cutting edge 132B is separated toward the lower surface side of the insert body 131 (lower surface 23B side of tool body 21) with respect to the virtual plane of the tool VS3, the one cutting edge 132A sharply cuts into the inner face B of the workpiece W, and sharpness can be sufficiently enhanced.

In addition, the one corner portion 143C, which is positioned on the side opposite to the first traverse direction C2A in the other cutting edge 132B, is positioned in the first traverse direction C2A with respect to the one corner portion 143A positioned on the opposite side in the one cutting edge 132A. Thereby, like the present embodiment, in the case where the grooving (end face grooving of inner diameter side) is performed to the inner face B of the machined hole H along the inner circumferential surface S of the machined hole H having a cylindrical hole shape which is formed with the rotation axis line WO of the workpiece W as the center, the effects described below can be obtained.

That is, when the one corner portion 143A in the one cutting edge 132A of the cutting insert 130 is closely disposed so as to abut the inner circumferential surface S of the workpiece W, the cutting insert 130 moves in the grooving direction XA along the inner circumferential surface S, and the grooving is performed, the one corner portion 143C in the other cutting edge 132B is separated from the inner circumferential surface S, and therefore, the corner portion 143C contacting the inner circumferential surface S and being damaged is reliably prevented. Moreover, damaging of the unused other cutting edge 132B because of the contacting is prevented.

In addition, the one corner portion 143C of the other cutting edge 132B is separated from the inner circumferential surface S of the workpiece W regardless of the depth d1 of the inner face B of the workpiece W shown in FIG. 31. Therefore, damaging of the inner circumferential surface S by the contacting of the corner portion 143C is reliably prevented.

Moreover, if attention is focused on the groove bottom D of the workpiece W which is cut by the one cutting edge 132A, the axis line C2 of the traverse direction of the cutting insert 130 is gradually inclined toward the back of the rotational direction WT around which the workpiece W rotates moving toward the first traverse direction C2A, the axis line C1 of the longitudinal direction is inclined toward the upper surface side of the insert body 131 so as to approach toward the first longitudinal direction C1A with respect to the virtual plane of the tool VS3 moving, and the one corner portion 143C in the other cutting edge 132B is disposed further toward the first traverse direction C2A than the one corner portion 143A in the one cutting edge 132A. Therefore, the groove bottom D is formed so as to include an inclination close to perpendicularity with respect to the rotation axis line WO of the workpiece W. That is, the angle α of the groove bottom D in FIG. 28 is significantly decreased, and the machining accuracy of the groove which is cut in the workpiece W can be enhanced.

Moreover, the pair of side surface cutting edges 142 and 142 which is included for each of the cutting edges 132A and 132B is formed to be inclined to gradually narrow the mutual gap moving from the outer end edge in the longitudinal direction of the insert body 131 toward the center, and therefore, machining accuracy of the groove wall in the machined groove is secured. That is, even though the mounting posture with respect to the tool body 21 of the cutting insert 130 is set as described above, the side surface cutting edge 142 which is disposed on the side opposite to the inner circumferential surface S of the workpiece W in the one cutting edge 132A (that is, the first traverse direction C2A) does not contact the opening end edge of the groove wall of the opposite side of the groove formed in the workpiece W.

In addition, when the cutting insert 130 is viewed from the direction perpendicular to the virtual plane of the tool VS3, the angle θ1 between the axis line C2 of the traverse direction along the traverse direction of the insert body 131 and the rotation axis line WO of the workpiece W is 90° or more and 90.5° or less. According to this, in FIG. 35, the angle θ4, in which the axis line C1 of the longitudinal direction along the longitudinal direction of the insert body 131 is inclined with respect to the rotation axis line WO of the workpiece W, becomes a value which is approximated to and slightly greater than a value (that is, θ1−90) of 90° subtracted from the angle θ1. In the present embodiment, the inner circumferential surface S of the workpiece W is formed so as to be parallel to the rotation axis line WO, the cutting insert 130 is mounted on the tool body 21 so as to be approximately parallel even though the axis line C1 of the longitudinal direction is slightly inclined with respect to the inner circumferential surface S of the workpiece W. Thereby, as described above, the one corner portion 143C of the other cutting edge 132B is reliably separated from the inner circumferential surface S. Therefore, the machining accuracy of the groove bottom D in the groove formed on the inner face B of the workpiece W can be secured while the machining accuracy of the inner circumferential surface S is secured. Specifically, since the angle θ1 is set within the above-described range, the groove bottom D of the workpiece W which is subjected to the grooving is formed so as to approximately perpendicular to the rotation axis line WO, and therefore, the machining accuracy of the groove bottom D is enhanced.

In addition, like the present embodiment, in the case where the pair of corner portions 143A and 143B in the one cutting edge 132A are disposed on the same workpiece virtual plane VS4 perpendicular to the rotation axis line WO of the workpiece W, the groove bottom D of the workpiece W cut by the one cutting edge 132A can be formed to be reliably perpendicular to the rotation axis line WO. Therefore, the groove of the workpiece W is finished with accuracy sufficiently.

As explained above, in the end face grooving of the inner diameter side using the above-described insert-replaceable grooving 210, the inner diameter side can be grooved with a high precision even though the insert is located adjacent to the inner face B of the machined hole H, which is formed in the workpiece W and has a cylindrical hole shape, and the inner circumferential surface S parallel to the rotation axis line WO is formed, regardless of the location of the inner face B to be grooved.

Fourth Embodiment

Next, an insert-replaceable grooving tool 220 of a fourth embodiment of the present invention will be described with reference to FIGS. 16, 39 to 46. The same reference numerals are attached to the same members as in the above-described embodiment, and descriptions thereof are omitted here.

The insert-replaceable grooving tool 220 of the present embodiment performs an end face grooving of an outer diameter side with respect to the workpiece W having an approximately cylindrical shape. Specifically, the workpiece W is formed in a multistage cylindrical shape and includes the step portion U between the large diameter portion and the small diameter portion. The end face E having an annular surface which is adjacent to an outer circumferential surface R of the small diameter portion and which is perpendicular to the rotation axis line WO is formed in the step portion U of the workpiece W.

The insert-replaceable grooving tool 220 is formed in a shaft shape, and includes the tool body 21 which has an approximately rectangular cross-section, and includes the above-described cutting insert 130 which is detachably mounted to the tip 23 of the tool body 21 and in which the cutting edge 132A protrudes from the tip end face 21A of the tool body 21 toward the grooving direction XA of the tip side. In the insert-replaceable grooving tool 220, the longitudinal direction (the X direction shown in the drawings) of the tool body 21 is disposed so as to be substantially parallel with respect to the rotation axis line WO of the workpiece W. In this state, the cutting edge 132A moves so as to be along the outer circumferential surface R in the small diameter portion of the step portion U toward the tip 23 of the tool body 21 in the step portion U of the workpiece W which is rotated in a rotational direction WT about the rotation axis line WO, and the end face E is cut.

Figure 40:
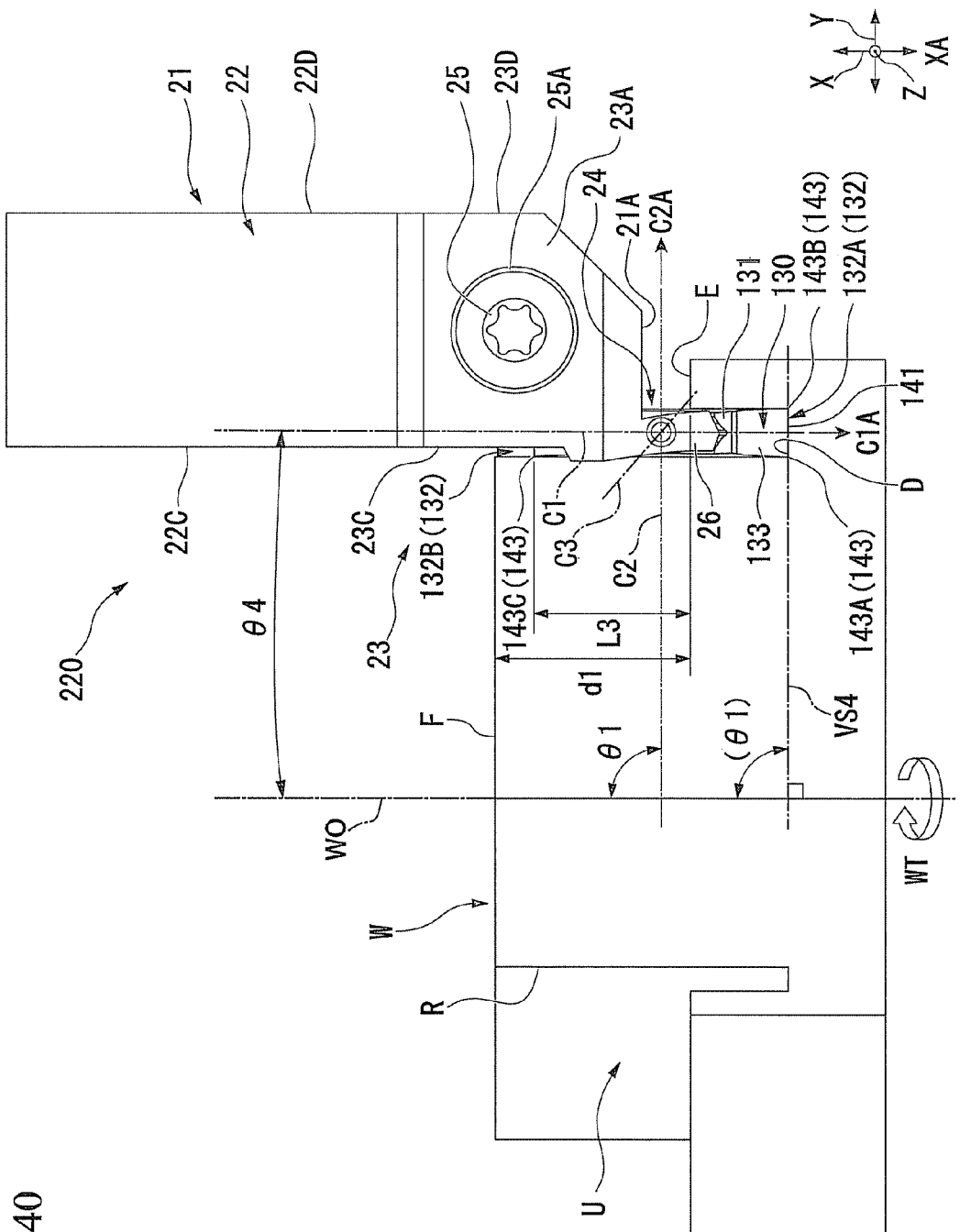
FIG. 40 is a plan view of the insert-replaceable grooving tool of the fourth embodiment of the present invention and the workpiece when viewed from a direction opposite to a rake face of a cutting insert, and a view when viewed from the upper surface of the cutting insert.

Similar to the insert-replaceable grooving tool 210, in the insert-replaceable grooving tool 220, the axis line C1 of the longitudinal direction of the cutting insert 130 extends so as to be along the longitudinal direction of the tool body 21. Moreover, on the other hand, as shown in FIG. 40, in the insert-replaceable grooving tool 220, the mutual disposition of the one side surface 23C (22C) and the other side surface 23D (22D) in both side surfaces facing the side (Y direction) of the tool body 21 is different from that of the above-described insert-replaceable grooving tool 210.

In the tool body 21 of the insert-replaceable grooving tool 220, the center portion and the base end other than the tip 23 are formed in an approximately rectangular parallelepiped shape and become a shank portion 22. The one side surface 22C and the other side surface 22D of the shank portion 22 are formed in a planar rectangle respectively. The rotation of the shank portion 22 is held in a state of being stopped, and therefore, the insert-replaceable grooving tool 220 is fixed and supported to a machine tool M shown by a two-dot chain line in FIG. 42. Specifically, the insert-replaceable grooving tool 220 is supported to the machine tool M in a state where at least the lower surface 22B and the other side surface 22D in the shank portion 22 of the tool body 21 abut a mounting concave portion m of the machine tool M.

Figure 42:
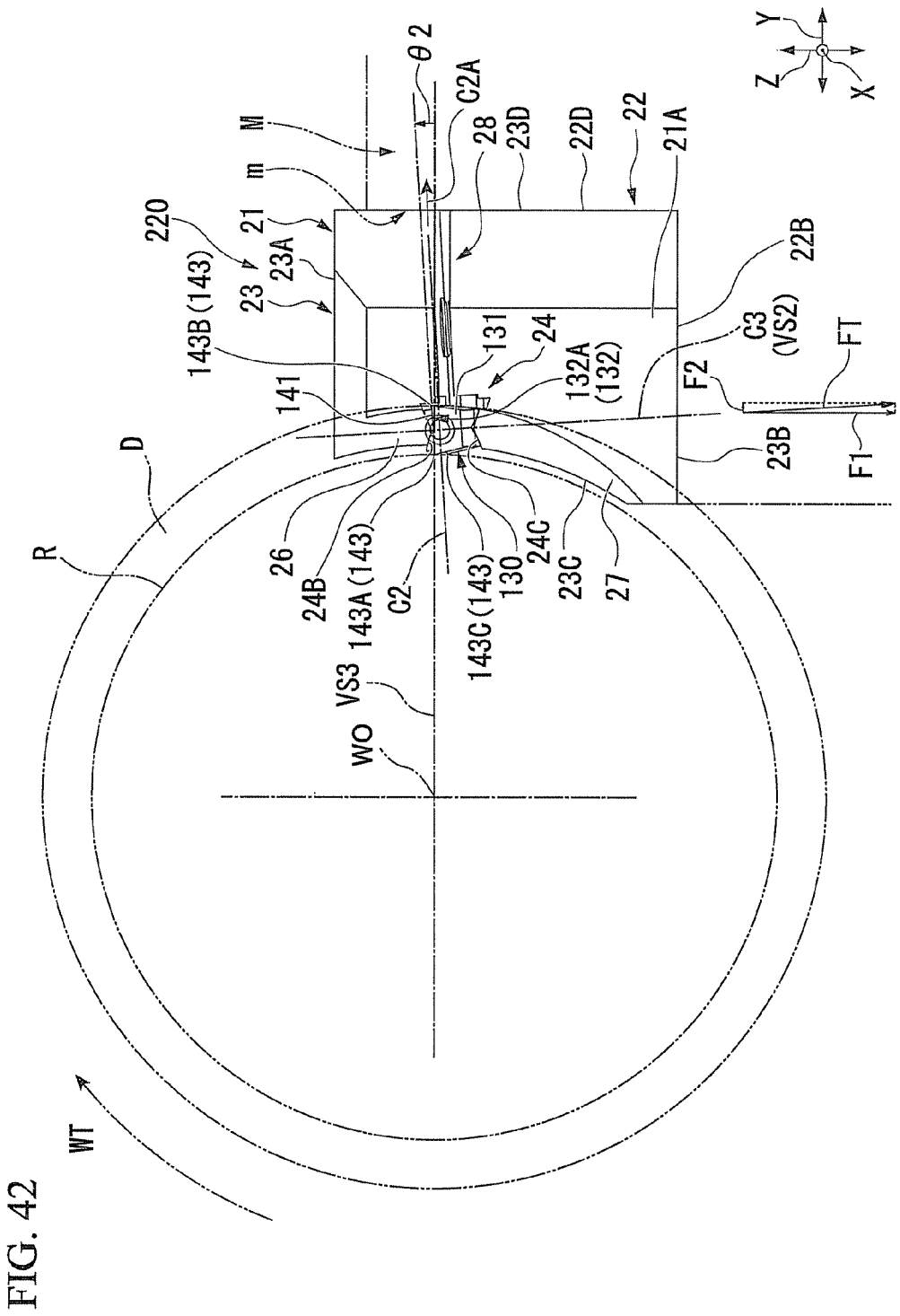
FIG. 42 is a front view of the insert-replaceable grooving tool of the first embodiment of the present invention when viewed from a tip of a tool body.
Figure 43:
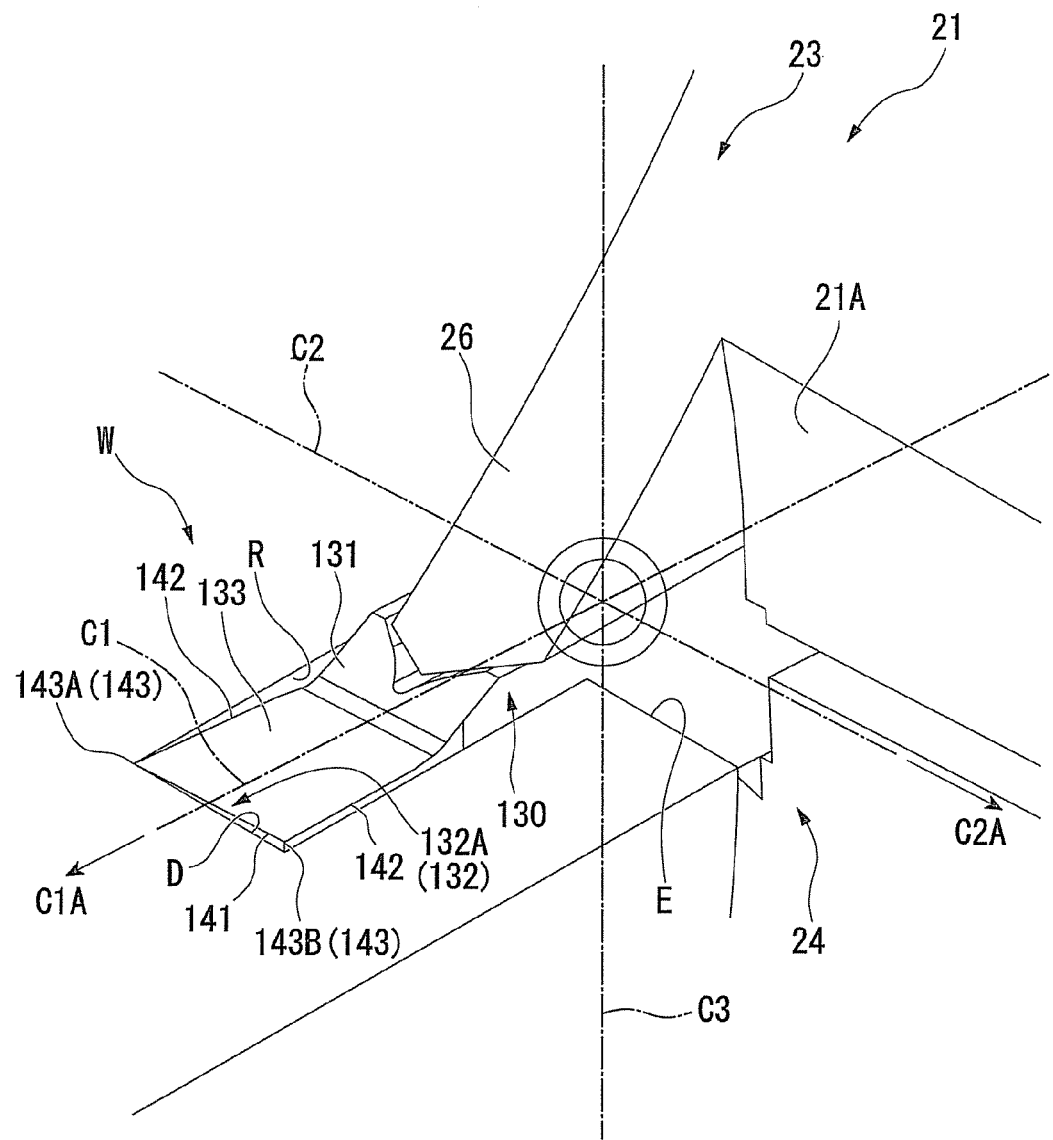
FIG. 43 is an enlarged view of the one cutting edge 132A of the cutting insert in FIG. 39.

In addition, as shown in FIG. 42, the portion corresponding to the upper jaw portion 26 in the one side surface 23C of the tip 23 is formed to be curved in a curved concave shaped cross-section to be gradually toward the other side surface 23D side (right side of the Y direction in FIG. 42) moving from the upper surface 23A toward the lower surface 23B. In addition, the side surface facing the other side surface 23D side in the upper jaw portion 26 is formed to be curved in a curved concave shaped cross-section to be gradually toward the other side surface 23D side moving from the upper surface 23A toward the lower surface 23B. Moreover, the portion corresponding to the lower jaw portion 27 in the one side surface 23C of the tip 23 is formed to be curved in a curved concave shaped cross-section to be gradually toward the one side surface 23C side (left side of the Y direction in FIG. 42) moving from the upper surface 23A toward the lower surface 23B. In addition, the side surface facing the other side surface 23D side in the lower jaw portion 27 is formed to be curved in a curved concave shaped cross-section to be gradually toward the one side surface 23C side moving from the upper surface 23A toward the lower surface 23B. In the front view of the tool body 21 shown in FIG. 42, the entire of the upper jaw portion 26 and the lower jaw portion 27 is formed in an approximately arch shape.

Moreover, the cutting insert 130 is disposed so as to be along the one side surface 23C in the tip 23 of the tool body 21. In addition, as shown in FIGS. 16, 40 and, 44, the one corner portion 143A (143C) of the cutting insert 130 is positioned on the one side surfaces 22C and 23C side of the tool body 21 and is disposed so as to be opposite to the outer circumferential surface R of the small diameter portion of the workpiece W. In the insert-replaceable grooving tool 220, the first traverse direction C2A from the one corner portion 143A (143C) toward the other corner portion 143B (143D) is toward the opposite of the above-described insert-replaceable grooving tool 210.

Figure 45:
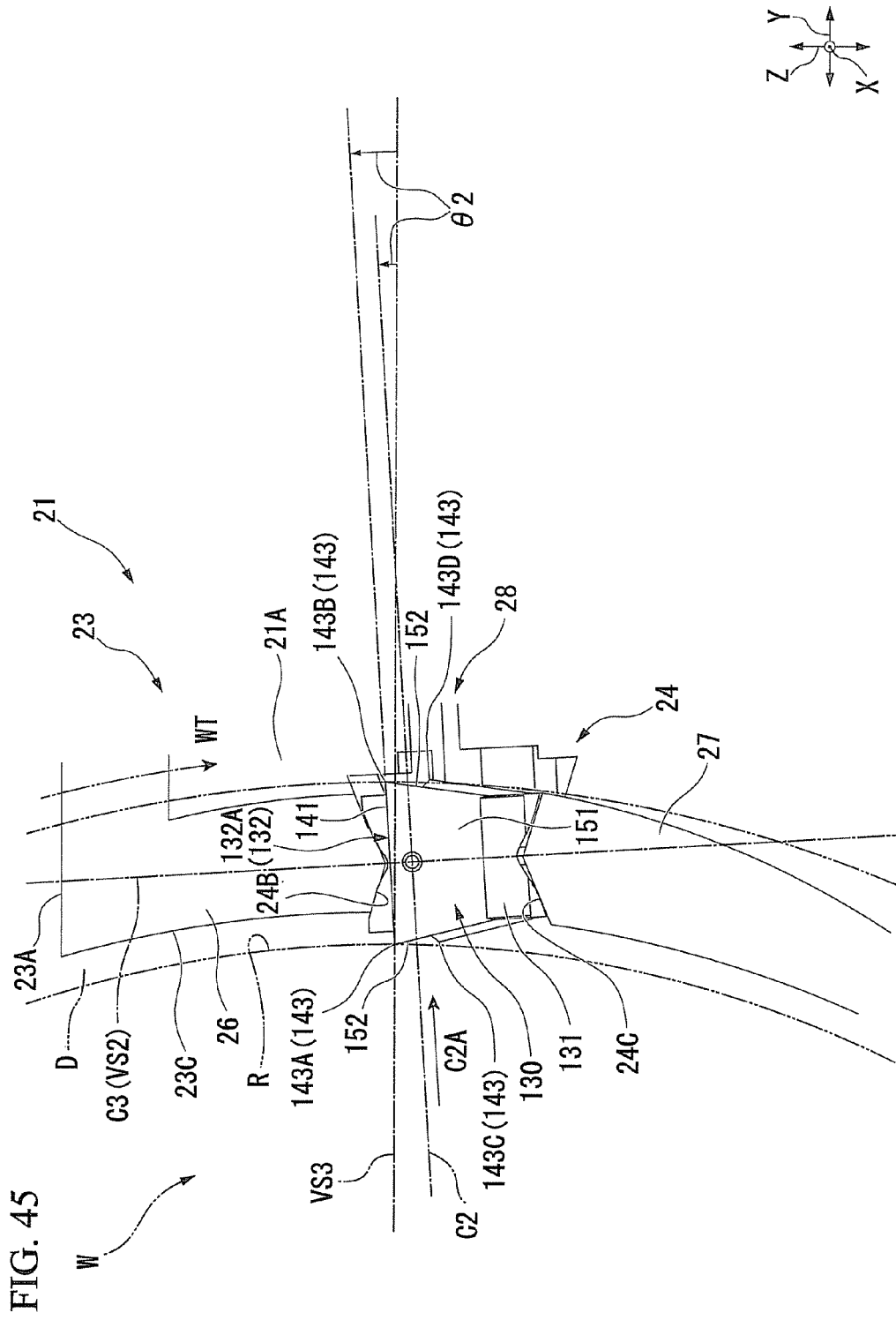
FIG. 45 is an enlarged view of the vicinity of the cutting insert 130 in FIG. 42.

Moreover, in a front view of the tool body 21 shown in FIG. 45, the front cutting edge 141 of the one cutting edge 132A is gradually inclined toward the front of the rotational direction WT of the workpiece W moving toward the first traverse direction C2A. Moreover, according to this, in the one cutting edge 132A, the corner portion 143B which is positioned on the first traverse direction C2A in the pair of corner portions 143A and 143B is disposed on the back of the rotational direction WT of the workpiece W with respect to the corner portion 143A.

In the present embodiment, the front cutting edge 141 of the cutting edge 132A is gradually inclined toward the back of the rotational direction WT of the workpiece W as being separated from the outer circumferential surface R of the small diameter portion toward the side opposite to the rotation axis line WO. In addition, the virtual plane of the tool VS3 includes the corner portion 143A of the cutting edge 132A and the rotation axis line WO. In FIGS. 42 and 45, the angle θ2 between the front cutting edge 141 of the cutting edge 132A and the virtual plane of the tool VS3 is more than 0° to 7° or less. In addition, in the present embodiment, for example, θ2 is about 3.4°. Moreover, since the axis line C2 of the traverse direction is parallel with respect to the front cutting edge 141, θ2 can also be an angle between the axis line C2 of the traverse direction and the virtual plane of the tool VS3.

Figure 41:
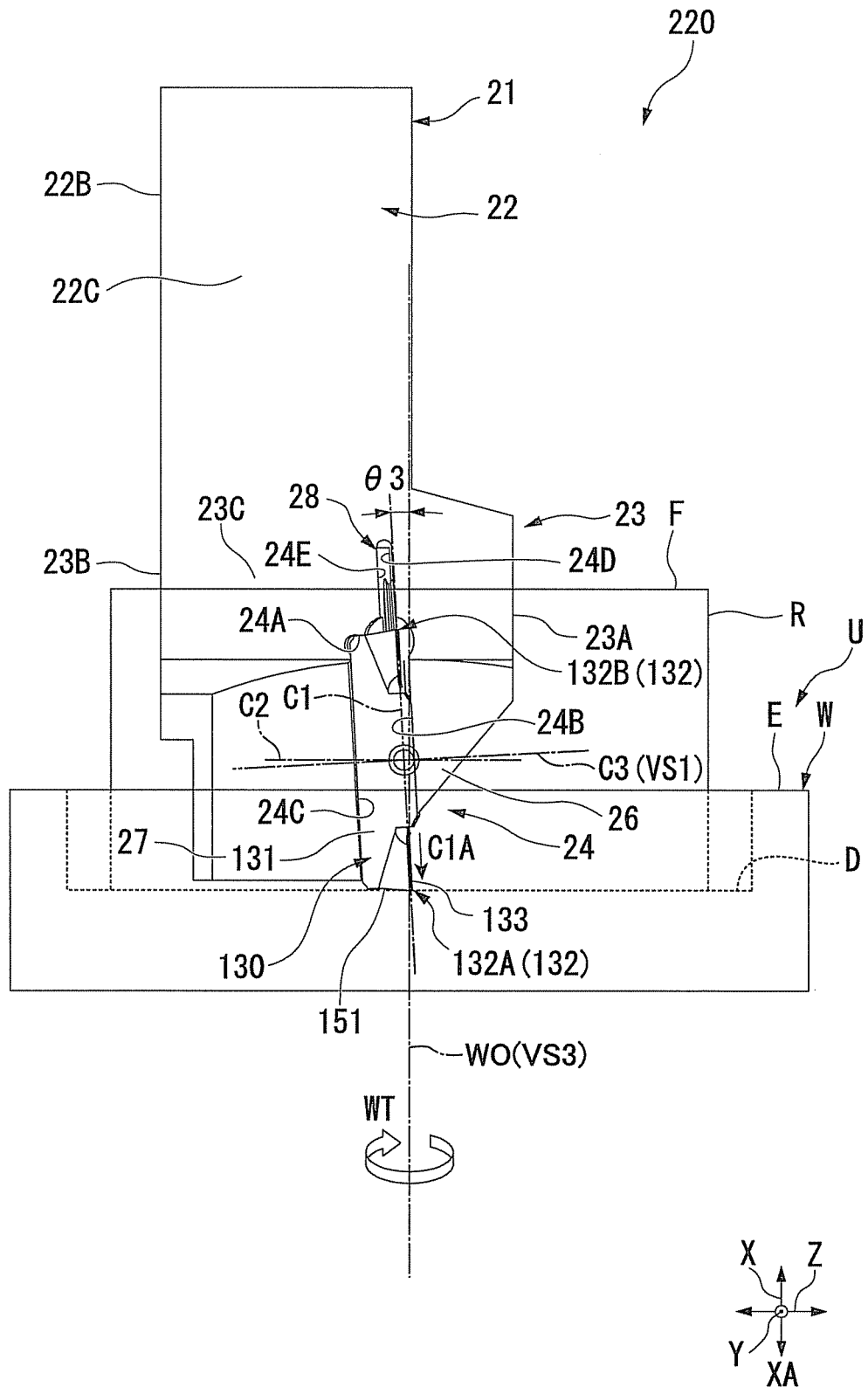
FIG. 41 is a schematic side view showing the insert-replaceable grooving tool of the fourth embodiment of the present invention and the workpiece.

In addition, as shown in FIG. 41, when viewed from the one side surface 23C side of the tool body 21, the axis line C1 of the longitudinal direction of the cutting insert 130 is inclined so as to gradually approach the virtual plane of the tool VS3 moving toward the first longitudinal direction C1A.

Specifically, in the side surface view of the tool body 21 shown in FIG. 41, the axis line C1 of the longitudinal direction extends so as to gradually approach the virtual plane of the tool VS3 from the lower surface of the insert body 131 toward the upper surface side (the right side of the Z direction in FIG. 41) moving toward the first longitudinal direction C1A. That is, the axis line C1 of the longitudinal direction gradually extends from the lower surface 23B of the tool body 21 toward the upper surface 23A side moving toward the first longitudinal direction C1A. Moreover, according to this, the front cutting edge 141 of the cutting edge 132B is separated toward the lower surface side of the insert body 131 (lower surface 23B side of tool body 21) with respect to the virtual plane of the tool VS3. Moreover, in the FIG. 41, the angle θ3 between the axis line C1 of the longitudinal direction and the virtual plane of the tool VS3 is more than 0° and less than 10°. In the present embodiment, for example, θ3 is about 3°.

Moreover, FIG. 40 is a top view of the cutting insert 130 when viewed from a direction perpendicular to the virtual plane of the tool VS3, in the top view, the angle θ1 between the axis line C2 of the traverse direction and the rotation axis line WO is 90° or more and 90.5° or less. The cutting insert 130 is mounted on the insert mounting seat 24 so that the angle θ1 is in the above-described range. In the present embodiment, θ1 is about 90°. Thereby, in the top view, the angle between the extension line of the front cutting edge 141 of the cutting edge 132A parallel to the axis line C2 of the traverse direction and the rotation axis line WO also is θ1 (=90°). Moreover, in FIG. 40, the angle θ4 between the axis line C1 of the longitudinal direction and the rotation axis line WO is more than 0° and less than 1°. In the present embodiment, θ4 is about 0.2°. Specifically, the relationship between θ4 and θ1 is 1°>θ4>θ1−90°. In the present embodiment, since θ1 is 90°, in the top view of the tool body 21 shown in FIG. 40, the axis line C2 of the traverse direction which is projected to the virtual plane of the tool VS3 and the rotation axis line WO are perpendicular to each other. On the other hand, the axis line C2 of the traverse direction which is projected to the virtual plane of the tool VS3 and the axis line C1 of the longitudinal direction are not perpendicular to each other. That is, the axis line C1 of the longitudinal direction which is projected to the virtual plane of the tool VS3 and the rotation axis line WO are not parallel to each other.

Figure 44:
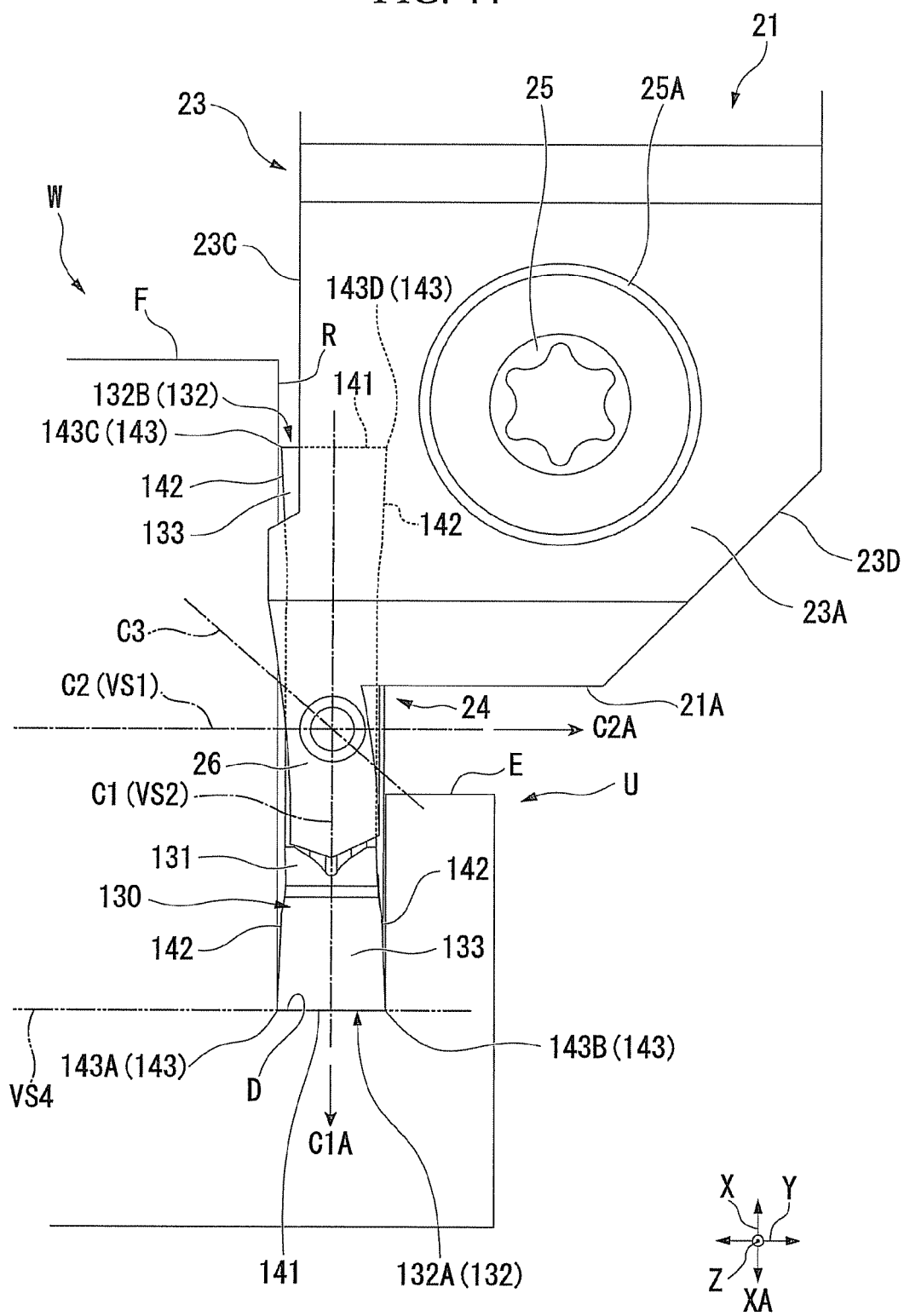
FIG. 44 is an enlarged view of the vicinity of the cutting insert 130 in FIG. 40.

Moreover, as shown in FIG. 44, when viewed from the direction perpendicular to the virtual plane of the tool VS3 (opposite to the rake face 133), in the cutting insert 130, the corner portion 143C which is positioned on the side opposite to the first traverse direction C2A in the other cutting edge 132B is disposed further toward the first traverse direction C2A than the corner portion 143A which is positioned on the opposite side in the one cutting edge 132A. That is, the corner portion 143A which is positioned on the one side surface 23C side of the tool body 21 (left side in FIG. 44) in the one cutting edge 132A is disposed further toward the one side surface 23C side (side opposite to the first traverse direction C2A) than the corner portion 143C which is positioned on the one side surface 23C side in the other cutting edge 132B. In the present embodiment, the corner portion 143C which is positioned on the outer circumferential surface R side in the cutting edge 132B is separated from the outer circumferential surface R with respect to the corner portion 143A which is positioned on the outer circumferential surface R side in the cutting edge 132A.

Figure 46:
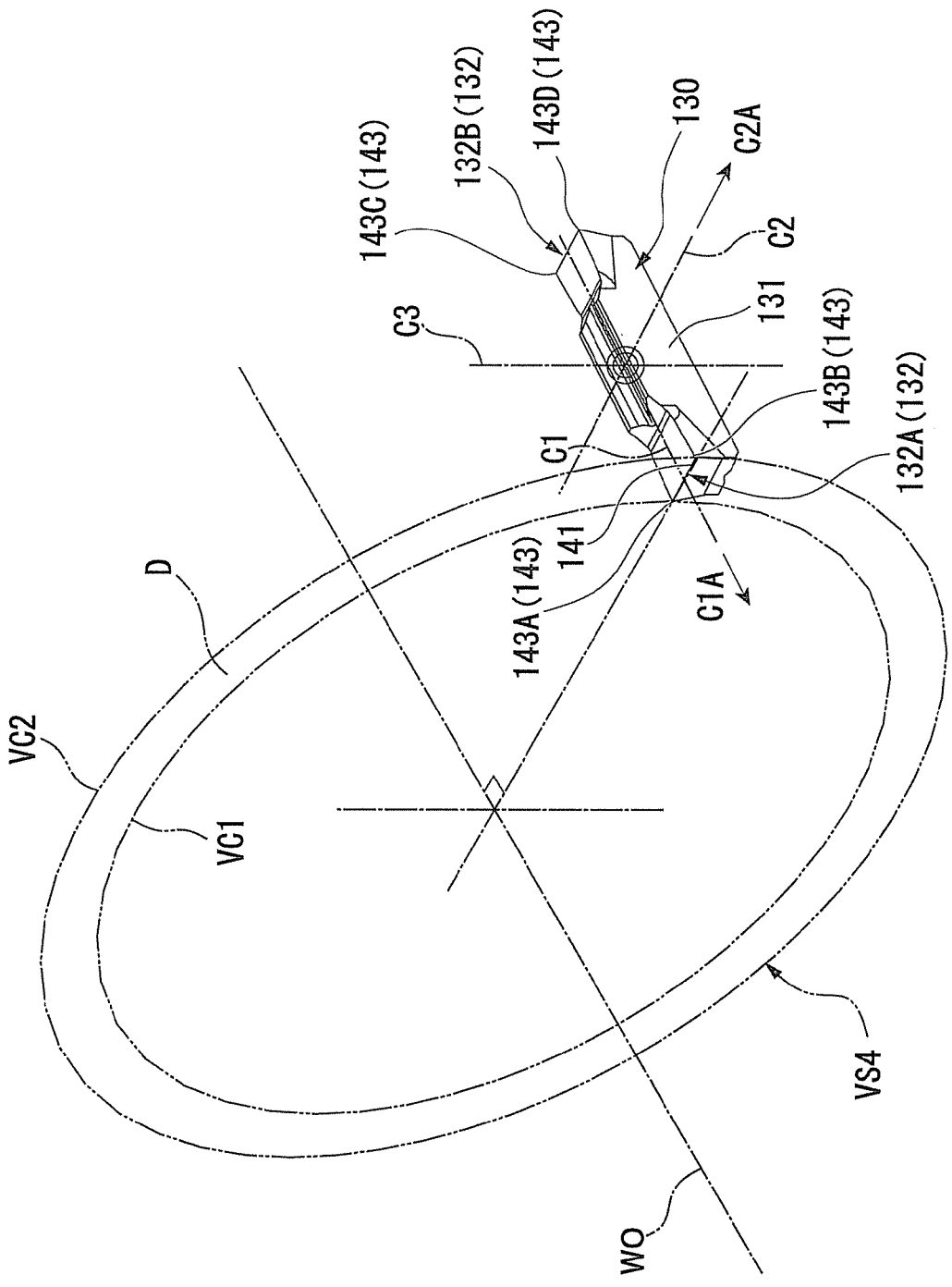
FIG. 46 is a view showing a mounting posture of the cutting insert 130, the virtual circle VC1 around which the corner portion 143A is rotated around the rotation axis line WO, and the virtual circle VC2 around which the corner portion 143B is rotated around the rotation axis line WO.

Moreover, by adjusting the above-described θ1 to θ4, as shown in FIGS. 44 and 46, the pair of corner portions 143A and 143B in the one cutting edge 132A can be disposed on the same workpiece virtual plane VS4 perpendicular to the rotation axis line WO. In the present embodiment, the angles θ2 and θ3 are adjusted and the angle θ1 is equal to 90°, and therefore, the pair of corner portions 143A and 143B is disposed on the workpiece virtual plane VS4. Specifically, as shown in FIG. 46, in the cutting edge 132A, the virtual circle VC1 which is obtained by rotating the corner portion 143A around the rotation axis line WO and the virtual circle VC2 which is obtained by rotating the corner portion 143B around the rotation axis line WO are contained within the workpiece virtual plane VS4. In addition, the outer circumference of the virtual circle VC1 coincides with the inner circumferential edge portion in the groove bottom D of the groove which is formed in the workpiece W and the outer circumference of the virtual circle VC2 coincides with the outer circumferential edge portion of the groove bottom D.

In the present embodiment, in the state where the corner portion 143A of the one cutting edge 132A is closely disposed so as to abut the outer circumferential surface R of the small diameter portion of the workpiece W, the cutting insert 130 of the tool body 21 having the above-described configuration moves in the grooving direction XA toward the rotation axis line WO direction of the workpiece W along the outer circumferential surface R. Moreover, the cutting edge 132A performs the grooving with respect to the end face E facing the base end side of the tool body 21.

According to the insert-replaceable grooving tool 220 of the present embodiment, in the step portion U of the workpiece W having a multistage cylindrical shape, in the case where the grooving (the end face grooving of the outer diameter side) is performed to the end face E of the workpiece W along the small diameter portion having the outer circumferential surface R parallel to the rotation axis line WO, effects similar to those of the above-described embodiment are presented. That is, regardless of the position of the end face E of the workpiece W which is subjected to the grooving by the cutting edge 132A of the cutting insert 130, the corner portion 143C of the cutting edge 132B is separated from the outer circumferential surface R, and, the corner portion 143C contacting the outer circumferential surface R and being damaged is reliably prevented. Therefore, the end face grooving of the outer diameter side having high accuracy can be performed.

In addition, the front cutting edge 141 in the one cutting edge 132A of the cutting insert 130 protruding toward the end face E of the workpiece W from the tip 23 of the tool body 21 is parallel to the axis line C2 of the traverse direction and is gradually inclined toward the back of the rotational direction WT around which the workpiece W rotates moving toward the first traverse direction C2A. Therefore, the cutting resistance is decreased when the tool body 21 is transversely fed along the Y direction.

That is, in the case where the end face grooving of the outer diameter side like the present embodiment is performed, generally, the tool body 21 moves from the outer circumferential surface R of the workpiece W toward the side opposite to the rotation axis line WO when the tool body 21 is transversely fed. At this time, since the other side corner portion 143B and the side surface cutting edge 142, which are positioned at the front of the movement direction in the one cutting edge 132A of the cutting insert 130, sharply cut into the workpiece W, the cutting resistance is decreased.

In addition, the insert-replaceable grooving tool 220 is supported in the state where the lower surface 22B and the other side surface 22D of the shank portion 22 of the tool body 21 abut the mounting concave portion m of the machine tool M. Since the front cutting edge 141 in the cutting edge 132A of the cutting insert 130 is inclined as described above, as shown in FIG. 42, an external force (cutting resistance) FT which the one cutting edge 132A receives from the workpiece W at the time of the grooving is generated from the upper portion toward the lower portion along the axis line C3 of the height direction perpendicular to the front cutting edge 141 of the cutting edge 132A. The cutting resistance FT includes a component F1 in the Z direction and a component F2 in the Y direction, the component F1 is operated so as to press the lower surface 22B of the tool body 21 on the machine tool M, and the component F2 is operated so as to press the other side surface 22D of the tool body 21 on the machine tool M. Thereby, the position of the insert-replaceable grooving tool 220 with respect to the machine tool M is stabilized at the time of the cutting, and the cutting having high accuracy can be stably performed.

In addition, the present invention is not limited to the above-described embodiments, and various modifications can be applied within the scope which does not depart from the gist of the present invention. For example, in the above-described third and fourth embodiments, the insert mounting seat 24 is formed on the tip 23 of the tool body 21. However, the present invention is not limited to this. That is, a head portion which is detachably mounted on the tip 23 is mounted, and the insert mounting seat 24 may be formed on the head portion. In this case, the insert mounting seat 24 is formed so as to be opened to the one side surface of the head portion, and the cutting insert 130 is disposed so as to be along the one side surface. Moreover, the shape of the above-described tool body 21 is not limited to those which are described in the above-described embodiments.

Figure 47:
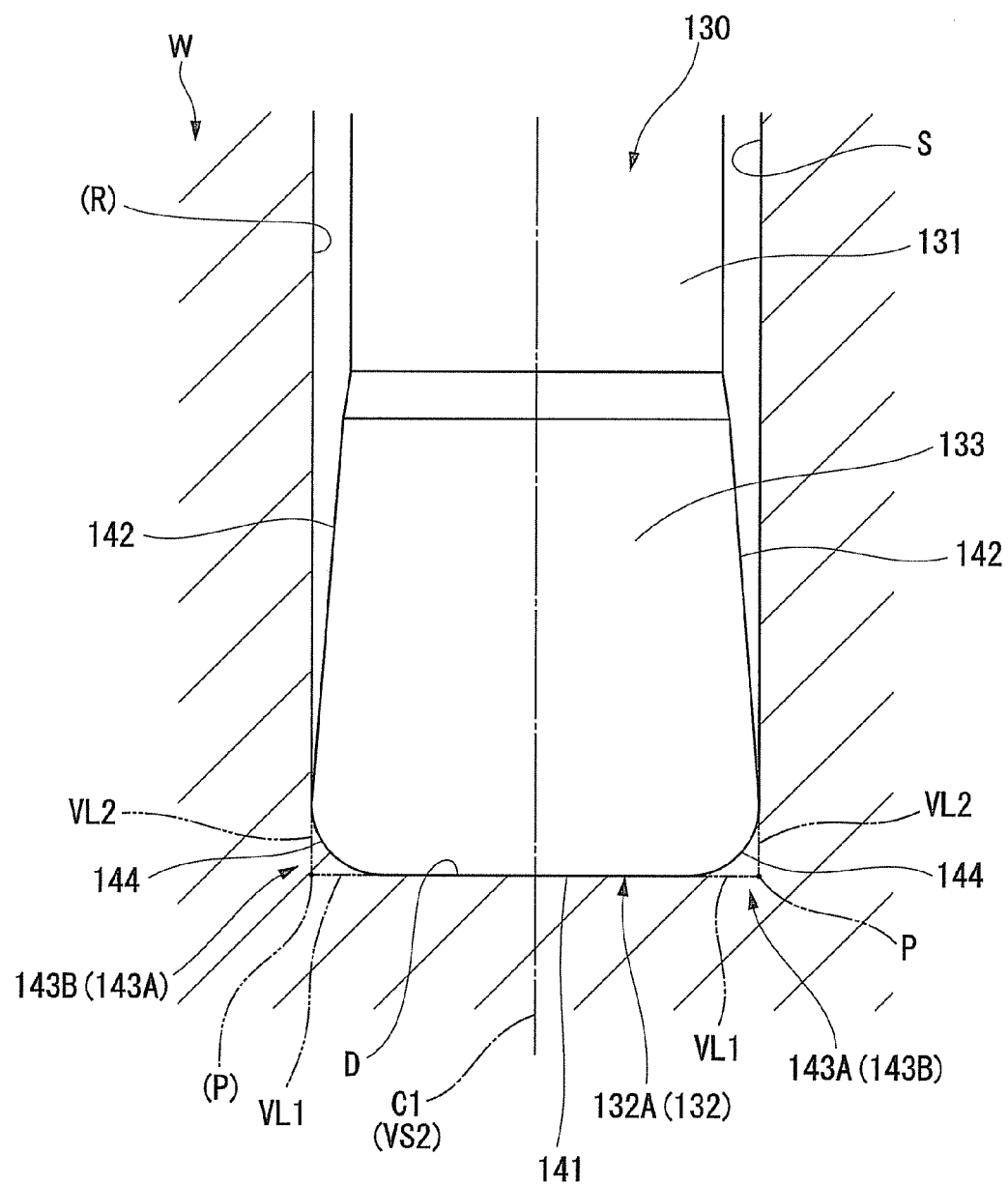
FIG. 47 is a modification of the corner portion in the cutting edge of the cutting insert.
Figure 48:
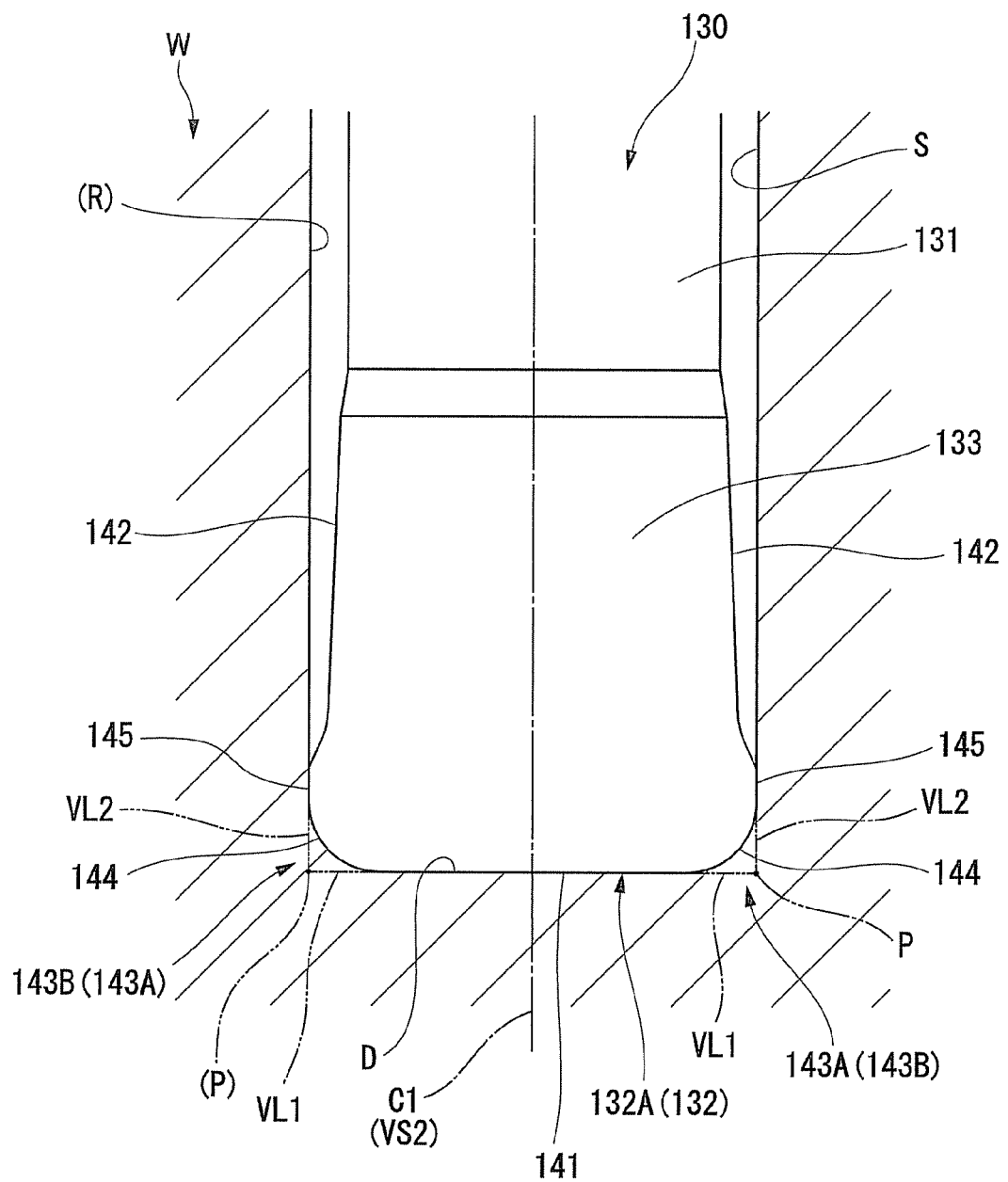
FIG. 48 is a modification of the corner portion in the cutting edge of the cutting insert.

Moreover, the pair of corner portions 143 of the cutting edge 132 is not limited to the shapes explained in the above-described third and fourth embodiments. FIGS. 47 and 48 show a modification of the corner portion 143. In FIG. 47, the corner portion 143 has a convex curved line shape and includes the first corner edge 144 which smoothly connects the front cutting edge 141 and the side surface cutting edge 142. In addition, in the corner portion 143A of the one cutting edge 132A, the intersection point P of the extension line VL1 of the front cutting edge 141 which is adjacent to the corner portion 143A and the vertical line VL2 which extends from the outer edge portion of the traverse direction of the insert body 131 in the first corner edge 144 toward the extension line VL1 is disposed on the virtual plane of the tool VS3. In this case, damage of the cutting edge or the like in each of the corner portions 143 is prevented.

Moreover, in FIG. 48, the corner portion 143 includes the first corner edge 144 and the second linear corner edge 145 which connects an end of the center side (the upper portion in FIG. 48) along the longitudinal direction of the insert body 131 in the first corner edge 144 and the side surface cutting edge 142. When the cutting insert 130 is viewed from the direction perpendicular to the virtual plane of the tool VS3, the second corner edge 145 extends so as to be parallel with respect to the rotation axis line WO of the workpiece W and is formed so as to extend to be parallel with respect to the inner circumferential surface S (outer circumferential surface R). In this case, the second corner edge 145 dredges the groove wall of the workpiece W which is cut by the front cutting edge 141 and the first corner edge 144 of the one cutting edge 132A, and the finished accuracy of the groove wall can be enhanced.

Moreover, in the above-described third and fourth embodiments, the cutting edge 132A of the cutting insert 130 performs the grooving with respect to the end faces B and E along the circumferential surfaces S and R of the workpiece W. However, the present invention is not limited to this. For example, the cutting edge 132A may perform the grooving with respect to the end faces B and E which are separated from the circumferential surfaces S and R of the workpiece W. According to the embodiments of the present invention, even in the case where the grooving is performed to any of the end faces B and E which are adjacent to the circumferential surfaces S and R of the workpiece W and the end faces B and E which are separated from the circumferential surfaces S and R of the workpiece W, the cutting processing having high accuracy can be performed.

REFERENCE SIGNS LIST 11, 21: tool body
11A, 21A: tip end face 12C, 13C, 22C, 23C: one side surface
13, 23: tip
110, 120, 210, 220: insert-replaceable grooving tool
130: cutting insert
131: insert body
132: cutting edge
132A: one cutting edge
132B: the other cutting edge
141: front cutting edge
142: side surface cutting edge
143: corner portion
143A: one corner portion which is positioned on the side opposite to the first traverse direction C2A in one cutting edge
143B: the other corner portion which is positioned on the first traverse direction C2A in one cutting edge
143C: one corner portion which is positioned on the side opposite to the first traverse direction C2A in the other cutting edge
143D: the other corner portion which is positioned on the first traverse direction C2A in the other cutting edge
144: first corner edge
145: second corner edge
B: inner face (end face)
C1: axis line of the longitudinal direction (longitudinal direction of insert body)
C1A: first longitudinal direction which is a direction from the other cutting edge toward the one cutting edge in the longitudinal direction of insert body
C2: axis line of the traverse direction (traverse direction of insert body)
C2A: first longitudinal direction which is a direction from the one corner portion toward the other corner portion in the traverse direction of insert body
C3: axis line of height direction (height direction of insert body)
E: end face
H: machined hole
P: intersection point of extension line VL1 and vertical line VL2
R: outer circumferential surface (circumferential surface) of workpiece
S: inner circumferential surface (circumferential surface)
U: step portion
VL1: extension line of front cutting edge
VL2: vertical line which extends from outer edge portion of first corner edge toward extension line VL1
VS1: insert virtual plane
VS3: tool virtual plane
VS4: workpiece virtual plane
W: workpiece
WO: rotational axis line of workpiece
WT: rotational direction of workpiece
XA: grooving direction
θ1: angle between axis line of the traverse direction and rotational axis line of the workpiece in top view of the tool body

The invention claimed is:

1. An insert-replaceable grooving tool for grooving on an end face of a workpiece with an insert, comprising:
a cutting insert, a cutting edge of which protrudes toward the end face of the workpiece rotating around a rotation axis line, and
a tool body which has a shaft shape, the cutting insert being detachably mounted on an end portion of the tool body,
wherein the cutting insert includes:
an insert body which has a bar shape; and
a pair of cutting edges which is formed on an upper surface of the insert body in both ends of a longitudinal direction of the insert body,
wherein the cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing the center, at the centers, and the cutting insert is formed so as to be planarly symmetric with respect to a virtual plane of the insert which includes the axis line of the height direction and is perpendicular to the longitudinal direction,
wherein the cutting edge includes:
a front cutting edge which is formed on an end edge in the longitudinal direction of the insert body and extends along the traverse direction;
a pair of corner portions which is disposed on both ends of the front cutting edge and is formed so as to protrude in the traverse direction; and
a pair of side surface cutting edges which extends so as to gradually narrow the mutual gap moving from the corner portions toward the centers along the longitudinal direction,
wherein the cutting insert is disposed along one side surface of the tool body,
one cutting edge in the pair of cutting edges protrudes toward a grooving direction from an end face of the end portion,
the axis line of the traverse direction is gradually inclined toward the front of a rotational direction around which the workpiece rotates moving toward a first traverse direction which is a direction from one corner portion positioned on the one side surface side of the tool body in the pair of corner portions toward the other corner portion in the traverse direction,
the axis line of the longitudinal direction is inclined with respect to a virtual plane of the tool including the other corner portion of the one cutting edge and the rotation axis line, and extends toward a lower surface side of the insert body so as to gradually approach the virtual plane of the tool moving toward a first longitudinal direction which is a direction from the other cutting edge toward the one cutting edge of the pair of cutting edges in the longitudinal direction, and
the one corner portion in the other cutting edge is disposed further toward the first traverse direction than the one corner portion in the one cutting edge.

2. The insert-replaceable grooving tool according to claim 1,
wherein θ1 between the axis line of the traverse direction and the rotation axis line when the cutting insert is viewed from a direction perpendicular to the virtual plane of the tool is 90° or more and 90.5° or less.

3. The insert-replaceable grooving tool according to claim 1,
wherein the end face is an inner face facing a base end side of the tool body in a machined hole formed in the workpiece, and
the one cutting edge performs an end face grooving of an inner diameter side with respect to the inner face.

4. The insert-replaceable grooving tool according to claim 1, wherein the end face is an end face facing a base end side of the tool body in a step portion formed in an outer circumferential surface of the workpiece, and the one cutting edge performs an end face grooving of an outer diameter side with respect to the end face.

5. The insert-replaceable grooving tool according to,
wherein the pair of corner portions in the one cutting edge is disposed on a workpiece virtual plane perpendicular to the rotation axis line.

6. The insert-replaceable grooving tool according to claim 1,
wherein the corner portions include a first corner edge having a convex curved line shape, and
in the other corner portion of the one cutting edge, an intersection point of an extension line of the front cutting edge which is adjacent to the other corner portion and a vertical line which extends from the outer edge portion of the traverse direction in the first corner edge toward the extension line is disposed on the virtual plane of the tool.

7. The insert-replaceable grooving tool according to claim 6,
wherein the corner portions include a second linear corner edge which connects an end of the center side in the first corner edge and the side surface cutting edge, and
the second corner edge extends so as to be parallel with respect to the rotation axis line of the workpiece when the cutting insert is viewed from the direction perpendicular to the virtual plane of the tool.

8. An end face grooving method for grooving on an end face of a workpiece with an insert of an insert-replaceable grooving tool including a cutting insert, a cutting edge of which protrudes toward the end face of the workpiece rotating around a rotation axis line, and a tool body which has a shaft shape, the cutting insert being detachably mounted on an end portion of the tool body,
wherein the cutting insert includes:
an insert body which has a bar shape, and
a pair of cutting edges which is formed on an upper surface of the insert body in both ends of a longitudinal direction of the insert body,
wherein the cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing through the centers, at the centers, and the cutting insert is formed so as to be planarly symmetric with respect to a virtual plane of the insert which includes the axis line of the height direction and is perpendicular to the longitudinal direction,
wherein the cutting edge includes:
a front cutting edge which is formed on an end edge in the longitudinal direction of the insert body and extends along the traverse direction,
a pair of corner portions which is disposed on both ends of the front cutting edge and is formed so as to protrude in the traverse direction, and
a pair of side surface cutting edges which extends so as to gradually narrow the mutual gap moving from the corner portions toward the centers along the longitudinal direction,
wherein when performing a grooving with respect to the end face by disposing the cutting insert along one side surface of the tool body, protruding one cutting edge in the pair of cutting edges in a grooving direction from an end face of the end portion, and moving the one cutting edge in the grooving direction,
the end face grooving method comprises: the steps of:
gradually inclining the axis line of the traverse direction toward the front of a rotational direction around which the workpiece rotates moving toward a first traverse direction which is a direction from one corner portion positioned on the one side surface side of the tool body in the pair of corner portions toward the other corner portion in the traverse direction;
inclining the axis line of the longitudinal direction with respect to a virtual plane of the tool including the other corner portion of the one cutting edge and the rotation axis line, and extending the axis line of the longitudinal direction toward a lower surface side of the insert body so as to gradually approach the virtual plane of the tool moving toward a first longitudinal direction which is a direction from the other cutting edge toward the one cutting edge of the pair of cutting edges in the longitudinal direction; and
disposing the one corner portion in the other cutting edge further toward the first traverse direction than the one corner portion in the one cutting edge.

9. An insert-replaceable grooving tool for grooving on an end face of a workpiece with an insert, comprising:
a cutting insert, a cutting edge of which protrudes toward the end face of the workpiece rotating around a rotation axis line, and
a tool body which has a shaft shape, the cutting insert being detachably mounted on an end portion of the tool body,
wherein the cutting insert includes:
an insert body which has a bar shape; and
a pair of cutting edges which is formed on an upper surface of the insert body in both ends of a longitudinal direction of the insert body,
wherein the cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing through the centers, at the centers, and the cutting insert is formed so as to be planarly symmetric with respect to a virtual plane of the insert which includes the axis line of the height direction and is perpendicular to the longitudinal direction,
wherein the cutting edge includes:
a front cutting edge which is formed on an end edge in the longitudinal direction of the insert body and extends along the traverse direction;
a pair of corner portions which is disposed on both ends of the front cutting edge and is formed so as to protrude in the traverse direction; and
a pair of side surface cutting edges which extends so as to gradually narrow the mutual gap moving from the corner portions toward the centers along the longitudinal direction,
wherein the cutting insert is disposed along one side surface of the tool body,
one cutting edge in the pair of cutting edges protrudes toward a grooving direction from an end face of the end portion, the axis line of the traverse direction is gradually inclined toward the back of a rotational direction around which the workpiece rotates moving toward a first traverse direction which is a direction from one corner portion positioned on the one side surface side of the tool body in the pair of corner portions toward the other corner portion in the traverse direction, the axis line of the longitudinal direction is inclined with respect to a virtual plane of the tool including the one corner portion and the rotation axis line of the one cutting edge, and extends toward an upper surface side of the insert body so as to gradually approach the virtual plane of the tool moving toward a first longitudinal direction which is a direction from the other cutting edge toward the one cutting edge of the pair of cutting edges in the longitudinal direction, and the one corner portion in the other cutting edge is disposed further toward the first traverse direction than the one corner portion in the one cutting edge.

10. The insert-replaceable grooving tool according to claim 9,
wherein θ1 between the axis line of the traverse direction and the rotation axis line when the cutting insert is viewed from a direction perpendicular to the virtual plane of the tool is 90° or more and 90.5° or less.

11. The insert-replaceable grooving tool according to claim 9,
wherein the end face is an inner face facing a base end side of the tool body in a machined hole formed in the workpiece, and
the one cutting edge performs an end face grooving of an inner diameter side with respect to the inner face.

12. The insert-replaceable grooving tool according to claim 9,
wherein the end face is an end face facing a base end side of the tool body in a step portion formed in an outer circumferential surface of the workpiece, and
the one cutting edge performs an end face grooving of an outer diameter side with respect to the end face.

13. The insert-replaceable grooving tool according to claim 9,
wherein the pair of corner portions in the one cutting edge is disposed on a workpiece virtual plane perpendicular to the rotation axis line.

14. The insert-replaceable grooving tool according to claim 9,
wherein the corner portions include a first corner edge having a convex curved line shape, and
in the other corner portion of the one cutting edge, an intersection point of an extension line of the front cutting edge which is adjacent to the other corner portion and a vertical line which extends from the outer edge portion of the traverse direction in the first corner edge toward the extension line is disposed on the virtual plane of the tool.

15. The insert-replaceable grooving tool according to claim 14,
wherein the corner portions include a second linear corner edge which connects an end of the center side in the first corner edge and the side surface cutting edge, and
the second corner edge extends so as to be parallel with respect to the rotation axis line of the workpiece when the cutting insert is viewed from the direction perpendicular to the virtual plane of the tool.

16. An end face grooving method for grooving on an end face of a workpiece with an insert of an insert-replaceable grooving tool including a cutting insert, a cutting edge of which protrudes toward the end face of the workpiece rotating around a rotation axis line, and a tool body which has a shaft shape, the cutting insert being detachably mounted on an end portion of the tool body,
wherein the cutting insert includes:
an insert body which has a bar shape; and
a pair of cutting edges which is formed on an upper surface of the insert body in both ends of a longitudinal direction of the insert body,
wherein the cutting insert is formed so as to be rotationally symmetric with respect to an axis line of a height direction, which is perpendicular with respect to an axis line of the longitudinal direction passing through the center of the pair of cutting edges and extending in the longitudinal direction, and with respect to an axis line of a traverse direction extending in the traverse direction perpendicular to the longitudinal direction and passing through the centers, at the centers, and the cutting insert is formed so as to be planarly symmetric with respect to a virtual plane of the insert which includes the axis line of the height direction and is perpendicular to the longitudinal direction,
wherein the cutting edge includes:
a front cutting edge which is formed on an end edge in the longitudinal direction of the insert body and extends along the traverse direction;
a pair of corner portions which is disposed on both ends of the front cutting edge and is formed so as to protrude in the traverse direction; and
a pair of side surface cutting edges which extends so as to gradually narrow the mutual gap moving from the corner portions toward the centers along the longitudinal direction,
wherein when performing a grooving with respect to the end face by disposing the cutting insert along one side surface of the tool body, protruding one cutting edge in the pair of cutting edges in a grooving direction from an end face of the end portion, and moving the one cutting edge in the grooving direction,
the end face grooving method comprises:
gradually inclining the axis line of the traverse direction toward the back of a rotational direction around which the workpiece rotates moving toward a first traverse direction which is a direction from one corner portion positioned on the one side surface side of the tool body in the pair of corner portions toward the other corner portion in the traverse direction;
inclining the axis line of the longitudinal direction with respect to a virtual plane of the tool including the one corner portion and the rotation axis line in the one cutting edge, and extending the axis line of the longitudinal direction toward an upper surface side of the insert body so as to gradually approach the virtual plane of the tool moving toward a first longitudinal direction which is a direction from the other cutting edge toward the one cutting edge of the pair of cutting edges in the longitudinal direction; and
disposing the one corner portion in the other cutting edge further toward the first traverse direction than the one corner portion in the one cutting edge.

17. The insert-replaceable grooving tool according to claim 2,
wherein the end face is an inner face facing a base end side of the tool body in a machined hole formed in the workpiece, and
the one cutting edge performs an end face grooving of an inner diameter side with respect to the inner face.

18. The insert-replaceable grooving tool according to claim 2,
wherein the end face is an end face facing a base end side of the tool body in a step portion formed in an outer circumferential surface of the workpiece, and
the one cutting edge performs an end face grooving of an outer diameter side with respect to the end face.

19. The insert-replaceable grooving tool according to claim 2,
wherein the pair of corner portions in the one cutting edge is disposed on a workpiece virtual plane perpendicular to the rotation axis line.

20. The insert-replaceable grooving tool according to claim 2,
wherein the corner portions include a first corner edge having a convex curved line shape, and
in the other corner portion of the one cutting edge, an intersection point of an extension line of the front cutting edge which is adjacent to the other corner portion and a vertical line which extends from the outer edge portion of the traverse direction in the first corner edge toward the extension line is disposed on the virtual plane of the tool.

21. The insert-replaceable grooving tool according to claim 10,
wherein the end face is an inner face facing a base end side of the tool body in a machined hole formed in the workpiece, and
the one cutting edge performs an end face grooving of an inner diameter side with respect to the inner face.

22. The insert-replaceable grooving tool according to claim 10,
wherein the end face is an end face facing a base end side of the tool body in a step portion formed in an outer circumferential surface of the workpiece, and
the one cutting edge performs an end face grooving of an outer diameter side with respect to the end face.

23. The insert-replaceable grooving tool according to claim 10,
wherein the pair of corner portions in the one cutting edge is disposed on a workpiece virtual plane perpendicular to the rotation axis line.

24. The insert-replaceable grooving tool according to claim 10,
wherein the corner portions include a first corner edge having a convex curved line shape, and
in the other corner portion of the one cutting edge, an intersection point of an extension line of the front cutting edge which is adjacent to the other corner portion and a vertical line which extends from the outer edge portion of the traverse direction in the first corner edge toward the extension line is disposed on the virtual plane of the tool.

* * * * *